United States Patent [19]

Kato

[11] Patent Number: 5,615,749
[45] Date of Patent: Apr. 1, 1997

[54] VEHICLE PEDAL DEVICE HAVING MECHANISM FOR DISPLACING PEDAL PAD AWAY FROM STEERING DEVICE UPON APPLICATION OF EXTERNAL FORCE TO THE VEHICLE

[75] Inventor: Yoshihisa Kato, Aichi-ken, Japan

[73] Assignee: Toyota Jidosha Kabushiki Kaisha, Toyota, Japan

[21] Appl. No.: 578,839

[22] Filed: Dec. 26, 1995

[30] Foreign Application Priority Data

Dec. 28, 1994 [JP] Japan .................................. 6-326551

[51] Int. Cl.⁶ ............................. B60K 28/10; B60T 7/12
[52] U.S. Cl. ........................................ 180/274; 180/275
[58] Field of Search ...................................... 180/274, 275

[56] References Cited

U.S. PATENT DOCUMENTS

| | | | |
|---|---|---|---|
| 3,744,588 | 7/1973 | Nave, Sr. | 180/275 |
| 3,945,672 | 3/1976 | Wong | 180/275 |
| 4,826,209 | 5/1989 | Farris | 180/274 |
| 4,964,485 | 10/1990 | Miele | 180/275 |

FOREIGN PATENT DOCUMENTS

| | | |
|---|---|---|
| 4305290 | 9/1873 | Germany . |
| 2242262 | 3/1974 | Germany . |
| 4340633 | 6/1994 | Germany . |
| 56-163973 | 12/1981 | Japan . |
| 58-112641 | 8/1983 | Japan . |
| 1-73464 | 5/1989 | Japan . |
| 1-240383 | 9/1989 | Japan . |
| 01-161874 | 11/1989 | Japan . |

*Primary Examiner*—Kenneth R. Rice
*Attorney, Agent, or Firm*—Oliff & Berridge

[57] ABSTRACT

A pedal device disposed within a passenger compartment of a vehicle, including a pedal bracket attached to a vehicle body, and a pedal pivotally supported by the pedal bracket and having at a lower end thereof a pedal pad to be depressed by a foot of an operator of the vehicle, wherein a mechanism is provided for permitting, upon application of an external force to the vehicle, displacement of the pedal pad such that an operator's leg whose foot is depressing the pedal pad is moved in a direction away from a steering device disposed within the passenger compartment.

16 Claims, 36 Drawing Sheets

FIG. 47 (a)
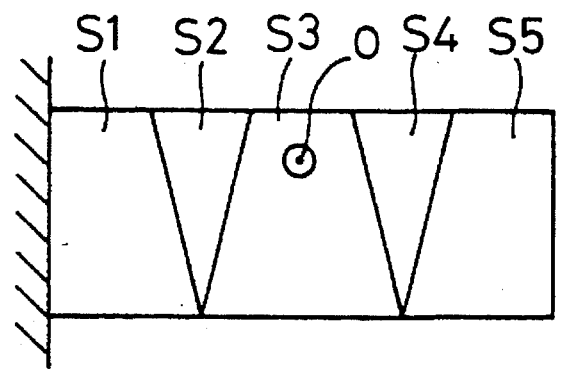
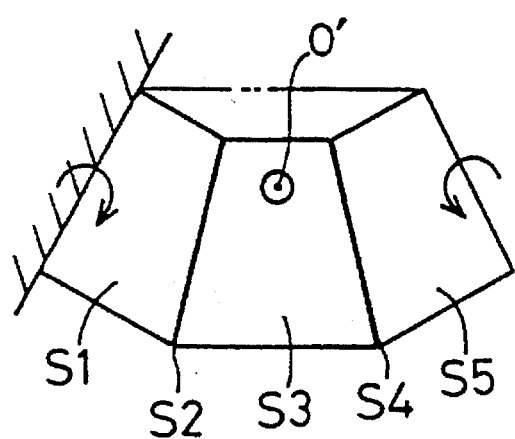
FIG. 47 (b)

VEHICLE PEDAL DEVICE HAVING MECHANISM FOR DISPLACING PEDAL PAD AWAY FROM STEERING DEVICE UPON APPLICATION OF EXTERNAL FORCE TO THE VEHICLE

BACKGROUND OF THE INVENTION

1. Field of the Invention

The present invention relates to a pedal device provided on a vehicle such that a pedal operated by the vehicle operator is pivotably supported. More particularly, this invention is concerned with a technique for minimizing a degree of contact of an operator's leg with a steering device of the vehicle upon application of an external force to the vehicle while the operator's foot is placed on or near the pedal.

2. Discussion of the Prior Art

In a passenger compartment of a motor vehicle, there is disposed a steering device in front of the vehicle operator. The steering device is a device for operating a steering mechanism. Upon application of an external force to the vehicle in a direction from the vehicle front to the rear, the operator is moved forward due to an inertia, with a result of forward movements of the operator's legs toward the steering device, leading to a possibility of the leg or legs contacting the steering device.

There have been proposed some measures to minimize the degree of contact of the operator's legs with the steering device. One proposed measure is to hold the vehicle operator with a seat belt for thereby restricting the forward movement of the operator. Another proposed measure is to provide the steering device with a knee protector for directly reducing the degree of contact of the operator's knees with the steering device. An example of such a knee protector is disclosed in JP-U-1-73464 (laid-open Publication of Japanese Utility Model Application published in 1989).

As a result of a research in an effort to minimize the degree of contact of the operator's legs with the steering device, the inventor of the present invention found that for minimizing the degree of contact of an operator's leg, it was also effective to control the path taken by the operator's leg upon application of an external force to the vehicle such that the path is away from the steering device. The inventor also found that controlling the path of the leg in such a manner was possible by utilizing a pedal device provided on the vehicle.

SUMMARY OF THE INVENTION

It is therefore an object of the present invention to provide a pedal device provided in a vehicle, which pedal device permits a path of a vehicle operator's leg to be suitably controlled by utilization of a pedal, for minimizing a degree of contact of the operator's leg with a steering device also provided on the vehicle.

The above object may be achieved according to the principle of the present invention, which provides a pedal device for a vehicle having a body, a passenger compartment and a steering device disposed within the passenger compartment, the pedal device being disposed within the passenger compartment and including (a) a pedal bracket attached to the body, and (b) a pedal pivotally supported by the pedal bracket and having at a lower end thereof a pedal pad to be depressed by a foot of an operator of the vehicle, wherein the improvement comprises a pedal pad displacing mechanism for permitting, upon application of an external force to the vehicle, the pedal pad to be displaced such that a leg of the operator whose foot is depressing the pedal pad is moved in a direction away from the steering device.

In one form of the pedal device, the pedal bracket is fixed directly to a dash panel of the vehicle body which separates an engine room and the passenger compartment from each other.

In another form of the pedal device, the pedal bracket is fixed to a suitable member attached to the vehicle body, for example, fixed to a cowl top attached to the dash panel.

In a further form of the pedal device, the pedal bracket is fixed indirectly to the dash panel via a housing of a brake booster which is directly attached to the dash panel.

The pedal of the pedal device may be a brake pedal or clutch pedal which is operated by the vehicle operator.

When an external force is applied to the vehicle, the operator is usually depressing only the brake pedal or both the brake pedal and the clutch pedal simultaneously. In other words, the application of the external force to the vehicle usually takes place in a condition in which the operator's foot may receive a force from the pedal pad. In view of this fact regarding a force acting between the pedal pad and the operator's foot, the inventors found it possible to minimize the degree of contact of the operator's leg with the steering device upon application of an external force to the vehicle, by displacing the pedal pad so as to apply to the operator's leg a force or moment which is effective to displace the operator's leg in a direction away from the steering device.

According to the pedal device constructed according to the present invention, the pedal pad displacing mechanism is adapted to permit the displacement of the pedal pad upon application of the external force to the vehicle, so as to apply to the operator's foot depressing the pedal pad a suitable force or moment so that the operator's knee is moved in a suitable direction away from the steering device.

Thus, the pedal device constructed according to the principle of the present invention incorporates a suitable measure for minimizing the degree of contact of the operator's leg (including the foot, shank, knee and thigh) with the steering device. If this measure is employed together the conventional measures, the degree of contact of the operator's leg or legs with the steering device and the surrounding structure can be more effectively reduced, leading to further improvement in the safety of operation of the vehicle.

In a first preferred form of the invention, the pedal bracket contacts or engages two members of the vehicle body at least upon application of the external force to the vehicle. These two members are moved relative to each other due to the external force applied to the vehicle. In this form of the invention, the pedal pad displacing mechanism is adapted to displace the pedal as a whole by means of deformation of the pedal bracket due to a relative movement of the two members upon application of the external force to the vehicle.

In the above preferred form of the invention, the pedal bracket is adapted to contact the two members of the vehicle body at least when the external force is applied to the vehicle, and the pedal pad is deformed due to the relative displacement of the two members due to the external force applied to the vehicle, whereby the pedal is displaced as a whole, with a result of the displacement of the pedal pad to minimize the degree of contact of the operator's leg with the steering device. In the present pedal device, the pedal bracket is suitably constructed to be deformed due to the external force applied to the vehicle, for displacing the entirety of the pedal as needed.

The present pedal device wherein the pedal pad is displaced by deformation of the pedal bracket is relatively economical to manufacture.

According to one advantageous arrangement of the above preferred form of the invention, the pedal bracket extends in a longitudinal direction of the vehicle, and includes a front end portion fixed to one of the two members of the vehicle body which is displaced in a backward direction of the vehicle due to the external force, and a rear end portion which contacts or engages the other of the two members at least when the external force is applied to the vehicle and whose amount of backward displacement due to the external force is smaller than an amount of backward displacement of the above-indicated one of the two members.

The member (hereinafter referred to as "displaceable member") which is displaced in the backward direction due to the external force may be a dash panel of the vehicle body, or a displaceable cowl top which is attached to the upper end portion of the dash panel and which is displaced almost together with the dash panel upon application of the external force to the vehicle. Alternatively, the displaceable member may be a housing of the brake booster which is attached to the dash panel and which is displaced together with the dash panel upon application of the external force to the vehicle.

The member (hereinafter referred to as "stationary member") whose amount of backward displacement due to the external force is smaller than that of the displaceable member may be a substantially stationary cowl top which is attached to the upper end portion of the dash panel and which undergoes substantially no displacement due to the external force applied to the vehicle. Alternatively, the stationary member may be an instrument panel reinforcement member or a steering column support member which extends in the transverse (right and left) direction of the vehicle and which is supported at its opposite ends by the substantially stationary cowl top indicated above. Further alternatively, the stationary member may be a bracket which is attached to the substantially stationary cowl top or the reinforcement member and which supports the steering column of the steering device.

The pedal bracket may be either held fixed at its rear end portion to the stationary member of the vehicle body, or may be arranged such that the rear end portion of the pedal bracket is normally spaced apart from and opposed to the stationary member, and may be brought into contact with the stationary member when the pedal bracket is displaced in the backward direction of the vehicle upon application of the external force to the vehicle.

According to another advantageous arrangement of the above preferred form of the invention, the pedal pad displacing mechanism includes means for reducing a bending strength of a local portion of the pedal bracket, and thereby facilitating deformation of the local portion upon application of the external force to the vehicle.

In a second preferred form of the present invention, the pedal pad displacing mechanism includes means for permitting a rotary movement of the pedal pad upon application of the external force to the vehicle. The rotary movement of the pedal pad causes a force or moment to act on the operator's foot depressing the pedal pad, so that the operator's knee is moved away from the steering device.

According to one advantageous arrangement of the above second preferred form of the invention, the pedal pad displacing mechanism includes means for permitting, upon application of the external force to the vehicle, a pivotal movement of the pedal as a whole about a substantially vertical straight line passing a point of the pedal bracket at which the pedal is pivotally supported by the pedal bracket, so that the pivotal movement causes an operating surface of the pedal pad to be rotated so as to face in a direction away from the steering device. Accordingly, a suitable moment is applied to the operator's foot depressing the pedal pad, so that the operator's leg is displaced away from the other leg, and the knee is moved in a direction away from the steering device.

According to another advantageous arrangement of the second preferred form of the invention, the pedal pad displacing mechanism includes means for permitting, upon application of the external force to the vehicle, a pivotal movement of the pedal as a whole about a substantially vertical straight line passing a center point of an operating surface of the pedal pad, so that the pivotal movement causes the operating surface to be rotated so as to face in a direction away from the steering device. This arrangement provides substantially the same advantage as the above arrangement. In these two arrangements, the pedal pad is pivoted about a substantially vertical axis, in a substantially horizontal plane.

According to a further advantageous arrangement of the second preferred form of the invention, the pedal pad displacing mechanism includes means for permitting, upon application of the external force to the vehicle, a pivotal movement of the pedal as a whole about a straight line substantially parallel to a straight line normal to an operating surface of the pedal pad, so that the pivotal movement causes a toe of the foot depressing the operating surface to point in a direction away from the steering device. In this arrangement, too, a suitable moment is applied to the operator's foot so that the operator's knee is moved in a direction away from the steering device.

In a third preferred form of this invention, the pedal pad displacing mechanism includes means for permitting a linear displacement of the pedal pad upon application of the external force to the vehicle. The linear movement of the pedal pad causes a force or moment to act on the operator's foot so that the operator's knee is displaced away from the steering device.

According to one advantageous arrangement of the above third preferred form of the invention, the above-indicated means for permitting a linear displacement of the pedal pad permits the pedal pad to be displaced in one of rightward and leftward directions of the vehicle which causes the pedal pad to be moved away from the steering device.

According to another advantageous arrangement of the third preferred form of the invention, the above-indicated means for permitting a linear displacement of the pedal pad permits the pedal pad to be displaced in a forward direction of the vehicle.

According to a further advantageous arrangement of the third preferred form of the invention, the above-indicated means for permitting a linear displacement of the pedal pad permits the pedal pad to be displaced in a downward direction of the vehicle.

In a fourth preferred form of the invention, the pedal includes a lever portion pivotally connected at one end thereof to the pedal bracket, and is connected to the other end of the lever portion such that the pedal pad is displaceable relative to the lever portion, and the pedal pad displacing mechanism includes an external force sensor for detecting the external force applied to the vehicle, a drive device for displacing the pedal pad relative to the lever portion, and a controller for activating the drive device to displace the pedal pad relative to the lever portion.

According to the first preferred form of the invention, the pedal device is adapted such that the pedal pad is displaced by a physical phenomenon, that is, mechanical deformation of the pedal bracket caused by the external force applied to the vehicle through the vehicle body. In this form of the pedal device, it is comparatively difficult to determine the timing between the moment of application of the external force to the vehicle and the moment at which the pedal pad is displaced by means of deformation of the pedal bracket. In view of this drawback, the pedal device according to this fourth preferred form of the invention is constructed such that only the pedal pad is displaced relative to the lever portion of the pedal, by the drive device activated by the controller when the external force applied to the vehicle is detected by the external force sensor. Thus, the displacement of the pedal pad does not require mechanical deformation of the pedal bracket, and the moment of the displacement of the pedal pad can be controlled as needed to assure effective reduction of the degree of contact of the operator's leg with the steering device upon application of the external force to the vehicle.

The external force sensor may be a sensor (e.g., cantilever type, ball type or roller type) adapted to detect the deceleration value of the vehicle to thereby detect the external force applied to the vehicle.

According to one advantageous arrangement of the above fourth preferred form of the invention, the drive device may be of an inflating type which includes: an ignition device (e.g., filament, igniting material) activated by the controller; a gas generating source ignited by the ignition device to generate a gas (e.g., nitrogen gas); an actuator (e.g., air motor) operated by the gas; and a transmission mechanism for transmitting a motion of the actuator to the pedal pad.

According to another advantageous arrangement of the above fourth preferred form of the invention, the drive device may be of an electrically controlled type including an electric motor activated by the controller, and a transmission mechanism for transmitting a motion of the electric motor to the pedal pad.

BRIEF DESCRIPTION OF THE DRAWINGS

The above and optional objects, features, advantages and technical significance of the present invention will be better understood by reading the following detailed description of presently preferred embodiments of the invention, when considered in connection with the accompanying drawings, in which:

FIGS. 47(a) and 47(b) are side elevational views for schematically explaining deformation of the pedal brackets of the embodiments of FIGS. 45 and 46 upon application of an external force to the vehicle;

DETAILED DESCRIPTION OF THE PREFERRED EMBODIMENTS

Figure 1:
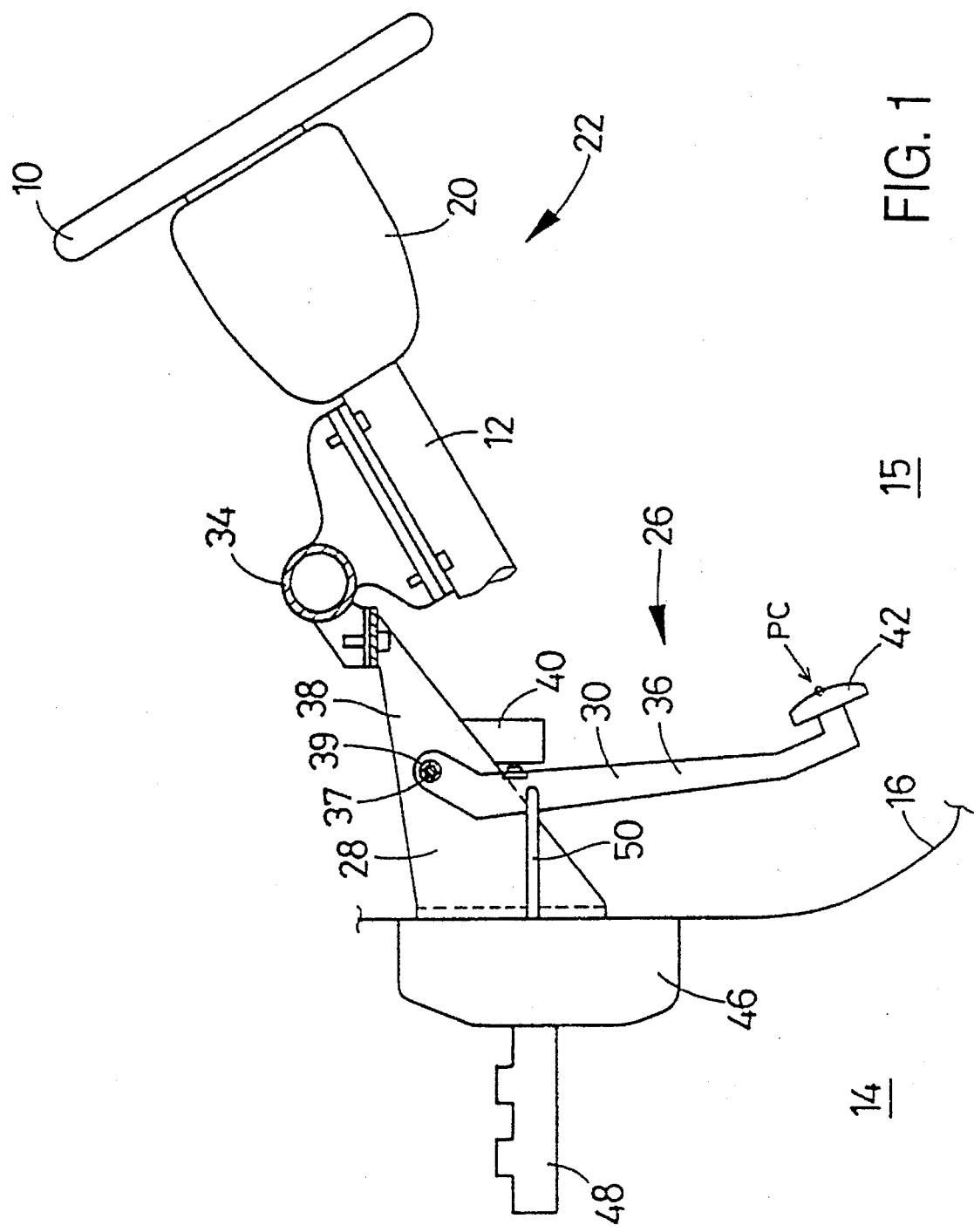
FIG. 1 is a side elevational view of one embodiment of a vehicle brake pedal device of this invention and environmental structures surrounding the pedal device.

Referring first to FIG. 1, there is shown a pedal device for a motor vehicle constructed according to one embodiment of this invention, wherein a pedal pad is rotated or pivoted in the horizontal plane by utilization or by means of of deformation of a pedal bracket upon application of an external force to the motor vehicle.

In FIG. 1, reference numeral 10 denotes a steering wheel which is rotated by the operator or driver of the motor vehicle. The steering wheel 10 is connected by a steering column 12 to a steering mechanism (not shown) disposed within an engine room 14. The steering column 12 includes a steering shaft rotated with the steering wheel 10, and a stationary or non-rotatable member in the form of a sleeve through which the steering shaft extends. The steering column 12 extends from the engine room 14 in a rear upward direction of the vehicle, through a dash panel 16 into a passenger compartment 15, more precisely, to a position almost above the operator's seat. The dash panel 16 separates the engine room 14 and the passenger compartment 15 from each other. an upper end portion of the steering column 12 at which the column 12 is connected to the steering wheel 10 is covered by a steering column cover 20. The steering wheel 10, steering column 12 and cover 20 constitute a steering device for operating the steering mechanism for steering the vehicle.

In a portion of the passenger compartment 15 which is near the lower portion of the steering column 12, there is disposed the above-indicated vehicle pedal device in the form of a brake pedal device 26. The brake pedal device 26 includes a pedal bracket 28, and a brake pedal 30 which is pivotably supported by the pedal bracket 28. The pedal bracket 28 is shaped so as to extend generally in the longitudinal direction or running direction of the motor vehicle, and is fixed at its front end portion to the dash panel 16. To the upper end of the dash panel 16, there is attached a cowl top (not shown) such that the cowl top extends in the transverse direction of the vehicle. The cowl top is a hollow member. An instrument panel reinforcement member 34 in the form of a pipe is secured at its opposite ends to the opposite end portions of the cowl top, such that the reinforcement member 34 also extends in the transverse direction of the vehicle. The pedal bracket 28 is fixed at its rear end portion to an intermediate portion of the reinforcement member 34. Upon application of an external force to the motor vehicle, the dash panel 16 is more or less displaced in the backward direction of the vehicle, while the reinforcement member 34 undergoes substantially no displacement. In the present embodiment, the pedal bracket 28 is fixed at its front and rear ends to a displaceable member in the form of the dash panel 16 and a stationary member in the form of the instrument panel reinforcement member 34.

In the present embodiment wherein the pedal bracket 28 is fixed at its rear end portion to the reinforcement member 34, the reinforcement member 34 is attached to the dash panel 16 through the pedal bracket 28. This arrangement assures higher rigidity and stability of the reinforcement member 34 (which supports the steering device 22 at the upper portion of the steering column 12), than an arrangement in which the rear end portion of the pedal bracket 28 is directly fixed to the cowl top and not fixed to the reinforcement member 34. Accordingly, the present arrangement permits increased resonance frequency of the steering device 22, and reduced size of the reinforcement member 34, elimination of separate reinforcement stays and/or elimination of a steering shake damper, leading to reduced weight and cost of manufacture of the vehicle.

The brake pedal 30 has a lever portion 36 which includes a boss 37 formed at its proximal end. The boss 37 has a through-hole formed so as to extend in the transverse direction of the vehicle. A stepped bolt 39 is inserted through this through-hole and a pair of side plates 38 of the pedal bracket 28 which sandwiches the boss 37 in the transverse direction of the vehicle. The stepped bolt 39 is rotatable relative to the boss 37 through a synthetic resin sleeve (not shown) accommodated in the through-hole of the boss 37. Thus, the brake pedal 30 is pivotally supported by the pedal bracket 28. The brake pedal 30 is normally held in its non-operated position defined by a stop 40 fixed to the pedal bracket 28, under a biasing action of a return spring (not shown) connecting the brake pedal 30 and the pedal bracket 28.

Figure 3:
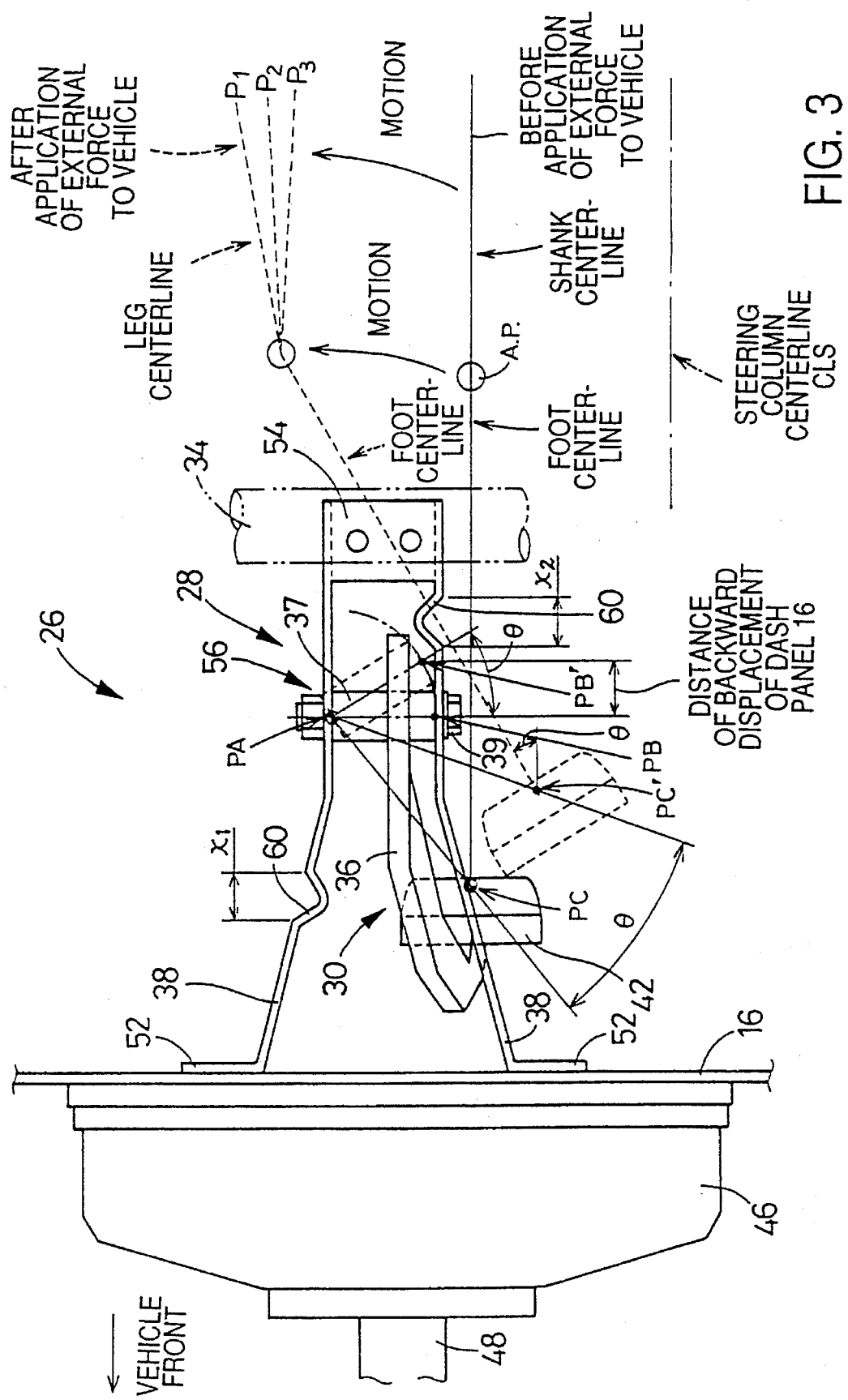
FIG. 3 is a plan view of the brake pedal device in the above embodiment.

The brake pedal 30 further has a pedal pad 42 provided at the distal end of the lever portion 36, so that the brake pedal 30 is operated with the operating surface of the pedal pad 42 being depressed by an operator's foot. the brake pedal 30 and the steering column 12 are positioned relative to each other such that a straight line which passes a center point PC on the operating surface of the pedal pad 42 and which is parallel to the longitudinal direction of the vehicle is offset from a centerline CLS of the steering column 12 by a suitable distance to the right as viewed by the vehicle operator, as indicated in FIG. 3.

When the pedal pad 42 is depressed, the brake pedal 30 is pivoted or rotated in the clockwise direction as seen in FIG. 1, against the biasing force of the return spring. Within the engine room 14, a brake booster 46 is fixed to the dash panel 16 such that the brake booster 46 is opposed to the brake pedal 30. A master cylinder 48 is attached to the front end portion of the brake booster 46, and a push rod 50 extends from the rear end portion of the brake booster 46. The push rod 50 is connected to a force output point of the brake pedal 30, which is intermediate between the pivot point or proximal end of the brake pedal 30 and a force input point or pedal pad 42 of the brake pedal 30. An operating force or depression force acting on the brake pedal 30 is boosted at a boosting ratio (leverage ratio γ) of the brake pedal 30 per se, and the thus boosted force is further boosted by the brake booster 46 and inputted to the master cylinder 48. As a result, the master cylinder 46 mechanically produces equal fluid pressures within two mutually independent pressure chambers.

Figure 2:
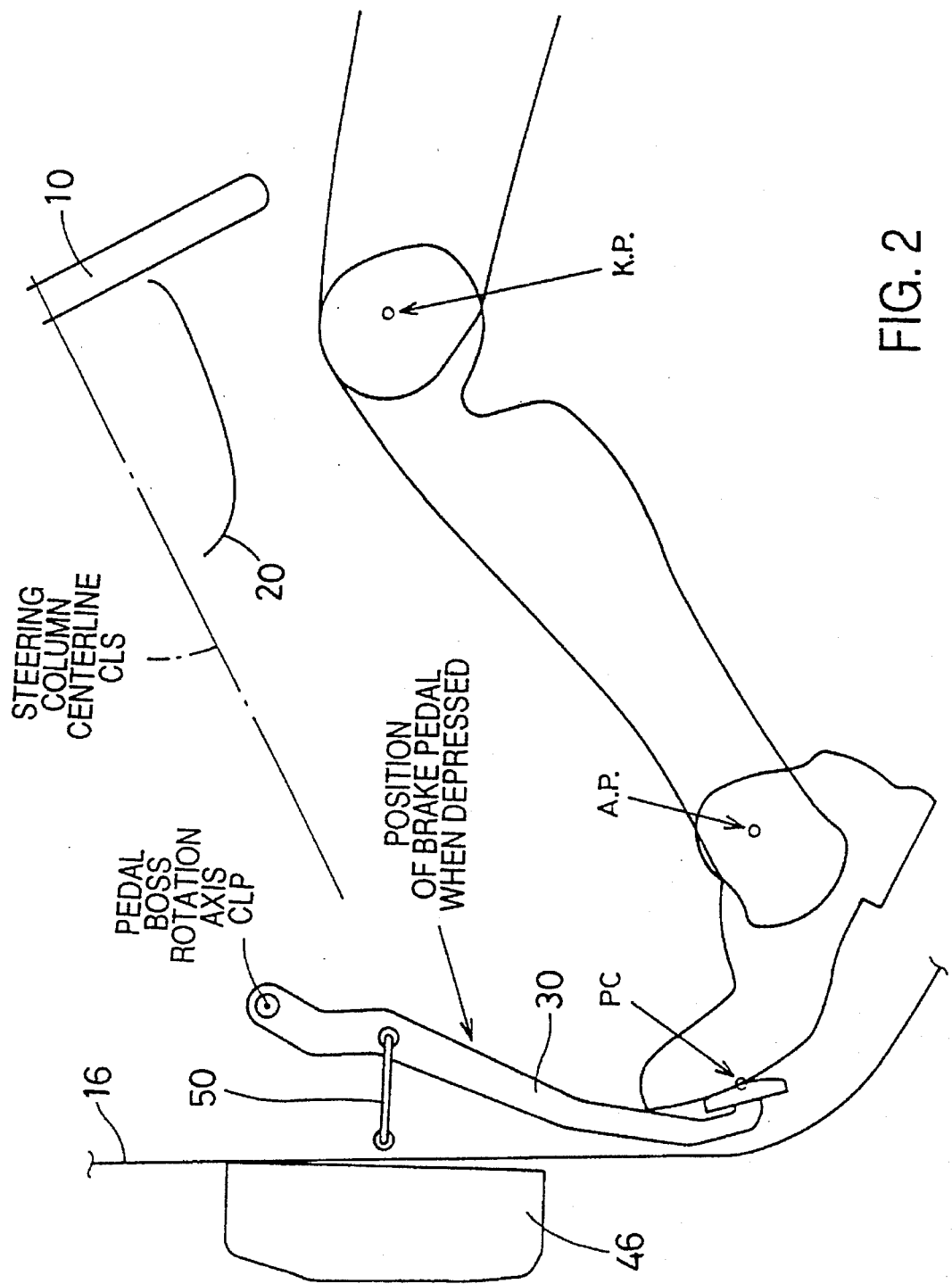
FIG. 2 is a side elevational view indicating relative positions of three members within a passenger compartment of the vehicle, namely, a brake pedal, an operator's leg depressing the brake pedal, and a steering device.

Referring next to FIG. 2, there is indicated a positional relationship in the side elevation of the vehicle, among the brake pedal 30, an operator's leg with its foot depressing the brake pedal 30 and the steering device 22. As is apparent from FIG. 2, the vehicle operator is seated such that the appropriate leg of the operator is located near the steering wheel 10 and the steering column cover 20.

The brake pedal device 26 according to the present embodiment is arranged so that upon application of an external force to the vehicle, the brake pedal 30 is rotated in its entirety about its pivot point in the horizontal plane by means of deformation of the pedal bracket 28 by the input external force such that the operating surface of the pedal pad 42 (hereinafter referred to simply as "pedal pad surface") of the pivoted pedal 30 faces in a direction away from the steering device 22. As a result, the operator's leg whose foot depresses the pedal pad 42 is moved away from the steering wheel 10 and its environmental structure.

To permit such rotating movement of the brake pedal 30 in the horizontal plane, the pedal bracket 28 of the brake pedal device 26 of this embodiment is constructed and shaped as described below.

As shown in the plan view of FIG. 3, the pedal bracket 28 includes the pair of side plates 38 indicated above, which extend in the longitudinal or running direction of the motor vehicle and which cooperates to pivotally support the boss 37 of the brake pedal 30 as described above. The pair of side plates 38 has a front fixing portion 52 fixed to the dash panel 16, and a rear fixing portion 54 fixed to the reinforcement member 37. The pedal bracket 28 includes a connecting portion connecting the side plates 38 at the rear fixing portion 54. The side plates 38 and the connecting portion at the rear fixing portion 54 are formed as a one-piece body from a steel plate.

One of the side plates 28 which is remote from the steering column centerline CLS has a low-strength portion in the form of a bead 60 formed between the front fixing portion 38 and a pedal attaching portion 56 at which the brake pedal 30 is pivotably attached to the pedal bracket 28. The other side plate 28 which is nearer to the steering column centerline CLS also has a low-strength portion in the form of another bead 60 formed between the pedal attaching portion 56 and the rear fixing portion 54. The term "low-strength portion" means a local portion of each side plate 38 which has a comparatively low bending strength when the side plate 38 is bent in a vertical parallel to the longitudinal direction of the vehicle. The term "bead" means a portion which is not straight or flat as seen in the horizontal plane of FIG. 3. The bead 60 provided on the side plate 38 remote from the centerline CLS and the bead 60 provided on the side plate 38 nearer to the centerline CLS are both formed so as to extend in the vertical direction, that is, in a direction substantially perpendicular to the direction in which the external force applied to the vehicle acts on the side plates 38.

Upon application of the external force to the vehicle, the side plate 38 remote from the steering column centerline CLS is relatively less likely to buckle at a portion thereof between the pedal attaching portion 56 and the rear fixing portion 54 but is relatively more likely to buckle at a portion thereof between the pedal attaching portion 56 and the front fixing portion 52, while the side plate 38 nearer to the steering column centerline CLS is relatively more likely to buckle at a portion thereof between the pedal attaching portion 56 and the rear fixing portion 54 but is relatively less likely to buckle at a portion thereof between the pedal attaching portion 56 and the front fixing portion 52.

In the present brake pedal device 26 wherein the pedal bracket 28 is shaped as described above, a backward movement of the dash panel 16 toward the almost stationary reinforcement member 34 due to the external force applied to the vehicle will not cause the side plate 38 remote from the centerline CLS to buckle at the portion between the pedal attaching portion 56 and the rear fixing portion 54, and will not cause a backward displacement of a pedal attaching point PA of the pedal attaching portion 56 at which the boss portion 37 of the brake pedal 30 is attached to that side plate 38. However, the backward movement of the dash panel 16 will cause the other side panel 38 nearer to the centerline CLS to buckle at the portion between the pedal attaching portion 56 and the rear fixing portion 54 in the presence of the bead 60 provided therebetween, whereby a pedal attaching point PB of the pedal attaching portion 56 at which the boss portion 37 is attached to that side plate 38 is displaced toward the reinforcement member 34 in the horizontal plane. Thus, the pedal attaching portion 56 is pivoted about the pedal attaching point PA in the counterclockwise direction as seen in FIG. 3 when the dash panel 16 is displaced backward. As a result, the pedal attaching point PB is moved to a point PB' as indicated in FIG. 3. Therefore, the asymmetric arrangement of the two beads 60 on the pedal bracket 28 will cause a pivotal movement of the brake pedal 30 in the horizontal plane. As a result, the center point PC of the pedal pad surface is moved to a point PC', and at the same time the pedal pad surface is pivoted such that the line which is normal to the pedal pad surface and which extends from the point PC' is inclined by a rotating angle θ with respect to a straight line which passes the point PC' and extends in the longitudinal direction of the vehicle.

In the present embodiment, a width ×1 of the bead 60 on the side plate 38 remote from the centerline CLS is equal to a width ×2 of the bead 60 on the side plate 38 nearer to the centerline CLS, whereby the dash panel 16 is displaced in the backward direction of the vehicle while contracting the two side plates 38 by almost the same length due to buckling thereof, whereby the displaced dash panel 16 remains parallel to the transverse direction of the vehicle.

The pivotal movement of the brake pedal 30 in the horizontal plane will cause backward and leftward displacements of the pedal pad 42, which tend to move the operator's foot depressing the pedal pad 42, toward the steering wheel 10, for example.

However, the pivotal movement of the brake pedal 30 in the horizontal plane will also cause rotation of the pedal pad 42 about a vertical line which passes the center point PC of the pedal pad surface. This rotation of the pedal pad 42 will contribute a movement of the operator's knee away from the steering device 22, for the reason which will be explained in detail by reference to FIGS. 4 and 5, in connection with a relationship between the displacement of the pedal pad 42 and a behavior or movement of the operator's leg.

FIG. 4(a), 4(b) and 4(c) are a plan view, a side elevational view and a rear, respectively, of the steering device 22, the brake pedal device 26 and the related structure.

Figure 4:
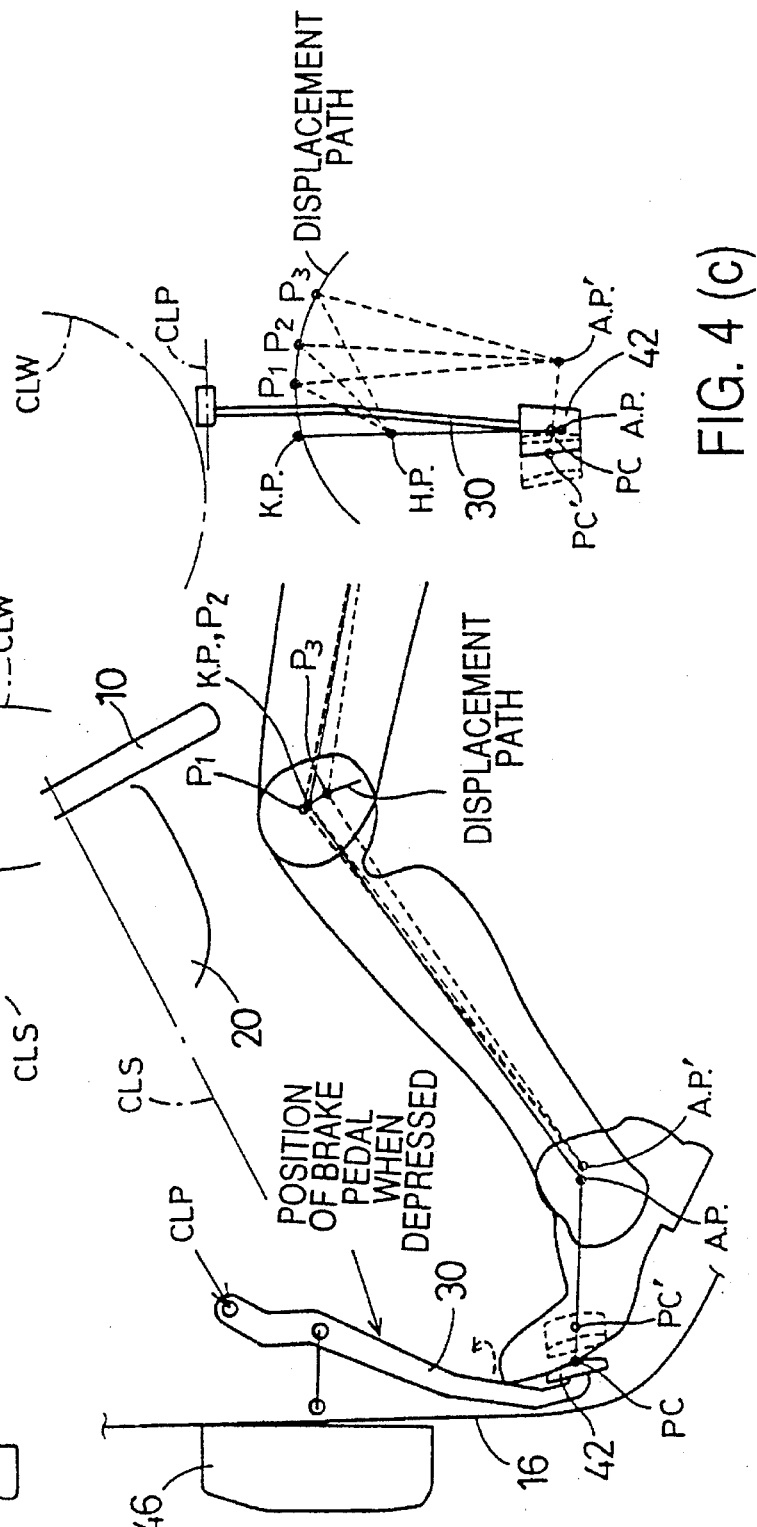
FIGS. 4(a), 4(b) and 4(c) are a plan view, a side elevational view and a rear view, respectively, for explaining optimization of a path of displacement of the operator's leg in the above embodiment.
Figure 5:
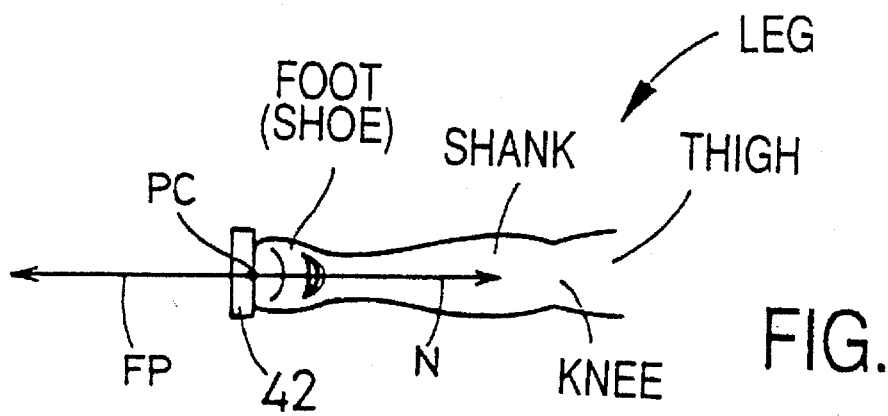
FIGS. 5(a), 5(b) and 5(c) are plan views for explaining a principle of control of the displacement path of the operator's leg in the above embodiment.
Figure 5:
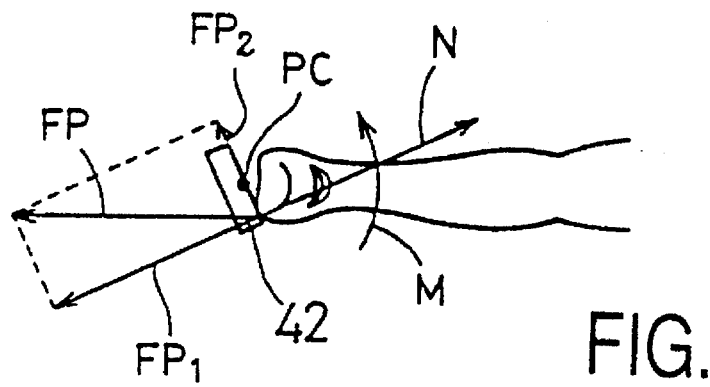
Figure 5:
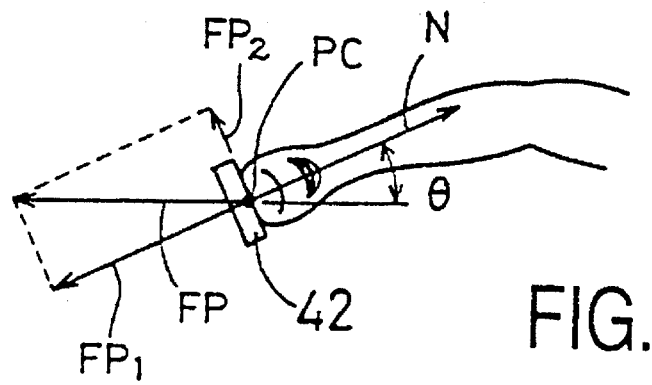

In FIGS. 4, the following characters have the following meanings:

CLW: Closed loop defined by center points in radial cross sectional planes of the steering wheel 10 which pass the center of the wheel
CLS: Centerline of the steering column 12
CLP: Axis of rotation of the boss portion 37 of the pedal 30
PC: Center point of the operating surface of the pedal pad 42 before application of an external force to the vehicle (PC' representing the center point after application of the external force: The prime sign (') with the other characters has a similar meaning.)
A.P.: Ankle joint center of the operator's leg
K.P.: Knee joint center of the operator's leg
P1–P3: Three examples of the knee joint center K.P.' after application of the external force to the vehicle
H.P.: Hip joint center of the operator In FIGS. 5(a), 5(b) and 5(c), FP represents a depression force acting on the pedal pad 42, and FP1 and FP2 represent a component of the depression force in the direction parallel to the line normal to the pedal pad surface, and a component of the depression force in the direction parallel to the line tangent to the pedal pad surface, respectively.

When the operating surface of the pedal pad 42 is rotated about the vertical axis passing the center point PC, the pedal pad surface is inclined with respect to the bottom face of the operator's foot, as indicated in FIG. 5(b). As a result, a resistance force N acts on the foot at a point of contact of the pedal pad surface with the foot, which point is offset from the center point PC. As a result, a moment M acts on the foot in the direction of rotation of the pedal pad surface about the vertical axis. On the other hand, the bending of the foot and shank of the operator's leg can occur relatively easily in a plane which includes a foot vector connecting the toe of the foot and the ankle joint center A.P. and a shank vector connecting the ankle joint center A.P. and the knee joint center K.P. However, this bending in a plane intersecting the above plane is restricted. Accordingly, the moment M acting on the foot will act on the leg in a direction away from the other foot of the operator, namely, in a direction that causes the knee of the leg depressing the pedal pad 42 to move away from the steering device 22. As a result, the shank vector is moved in a direction away from the steering device 22.

Consequently, the leg depressing the pedal pad 42 is forced out to the right with a small amount of twisting at a part around the ankle, whereby the ankle joint center A.P. is displaced in the rightward direction of the vehicle, to a point A.P.' as indicated in FIGS. 4(a) and 4(c). As a result, the knee joint center K.P. is also displaced in the rightward direction to a point K.P.' as also indicated in FIGS. 4(a) and 4(c), that is, moved away from the steering wheel 10 of the steering device 22. In FIGS. 3, 4(a) and 4(c), three examples of the point K.P.' (point K.P. after the displacement) are indicated at P1, P2 and P3.

Figure 6:
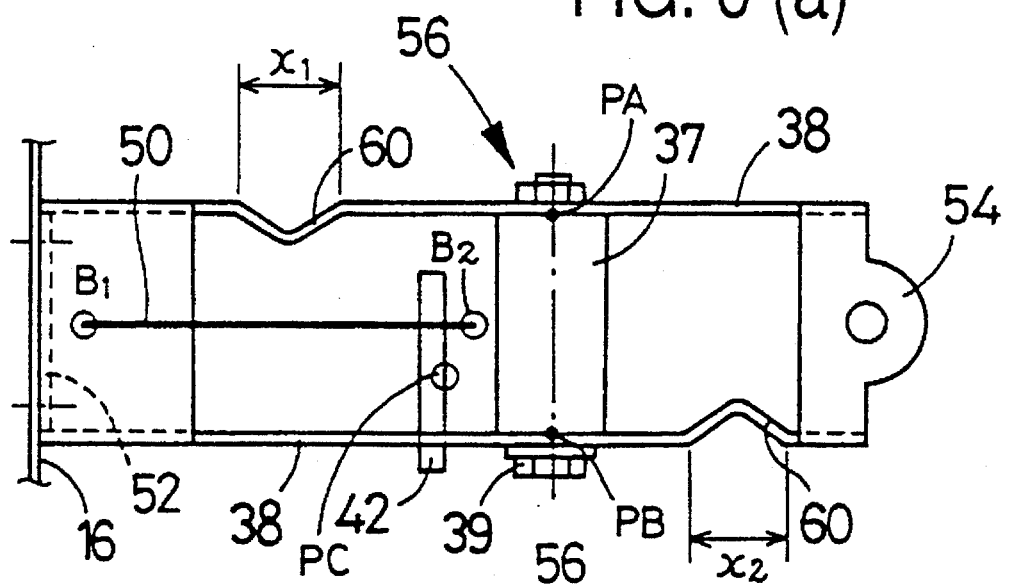
FIGS. 6(a) and 6(b) are plan views of the brake pedal device of the above embodiment, for explaining a change in the shape of a pedal bracket before and after application of an external force to the vehicle.
Figure 6:
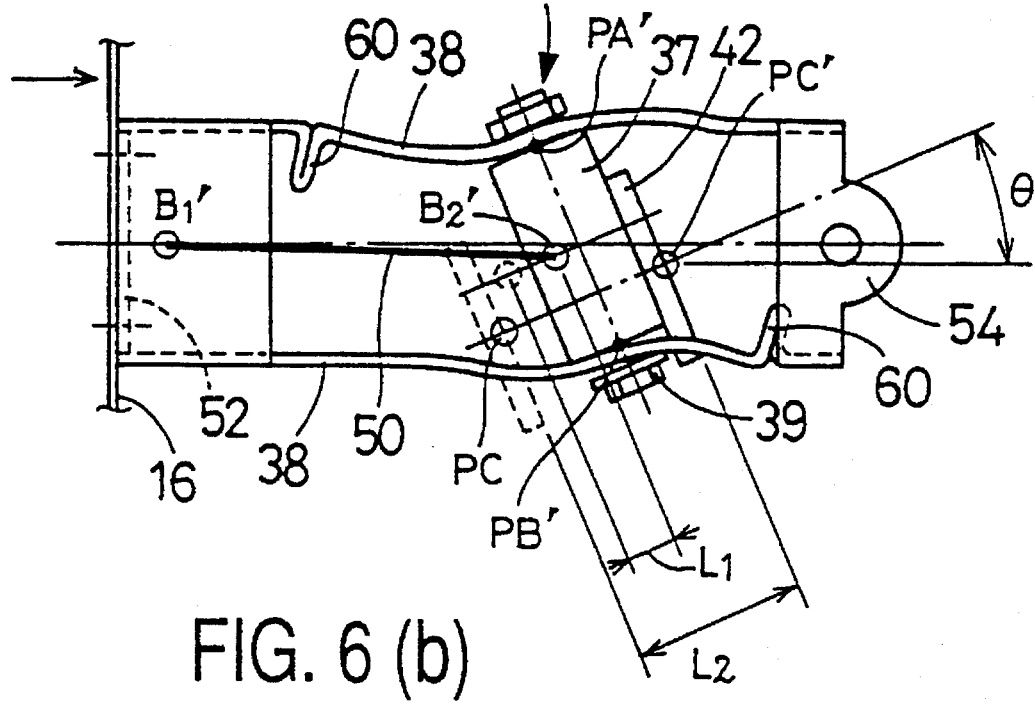

FIG. 6(a) shows a pedal bracket similar to the pedal bracket 28. Upon application of an external force to the vehicle, this pedal bracket is deformed as shown in FIG. 6(b). Although the pedal bracket 28 of FIGS. 1 and 3 is not completely identical in configuration with the pedal bracket of FIG. 6(a), the pedal bracket 28 is deformed almost as shown in FIG. 6(b), since it is basically similar in construction to the pedal bracket of FIG. 6(a).

In the pedal bracket 28 according to the present embodiment, the side plate 38 remote from the steering column centerline CLS is also provided with the low-strength portion in the form of the bead 60, for maximizing the kinetic energy that can be absorbed by the pedal bracket 28 upon application of an external force to the vehicle. However, only the low-strength portion in the side plate 38 nearer to the centerline CLS is essential according to the principle of the present invention which requires rotation or pivotal movement of the brake pedal 30 in the horizontal plane. In this respect, it is noted that the elimination of the bead 60 from the side plate 38 remote from the centerline CLS will cause unfavorable inclination of the dash plate 16 relative to the transverse direction of the vehicle when the dash plate 16 is displaced in the backward direction.

Although the pedal bracket 28 of the type adapted to permit rotation of the brake pedal 30 in the horizontal direction upon application of an external force to the vehicle has been described above by reference to FIGS. 1–7, this type of the pedal bracket may be suitably modified in construction, as described below by way of example.

Figure 7:
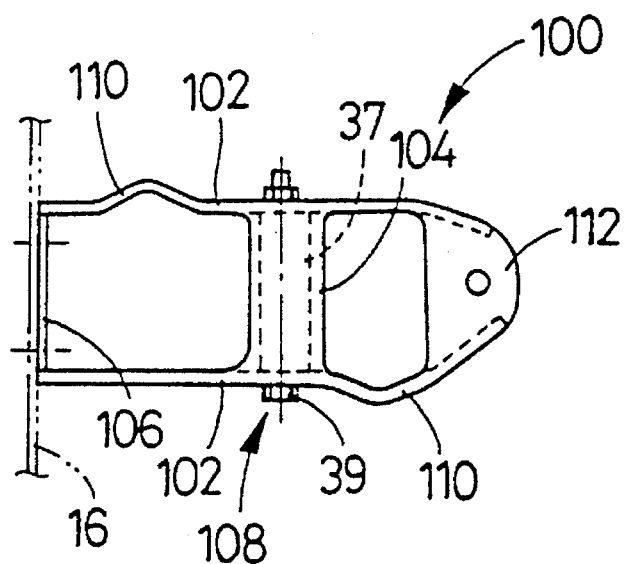
FIG. 7 is a plan view of a brake pedal device according to another embodiment of this invention.

In a pedal bracket 100 shown in FIG. 7, a pair of side plates 102 are connected to each other by an upper plate 104 at only one position corresponding to the boss portion 37 of the brake pedal 30. The side plate 102 (upper side plate as seen in FIG. 7) remote from the steering column centerline CLS is provided with one bead 110 formed between a front fixing portion 106 and a pedal attaching portion 108 thereof. The bead 110 extends in the vertical direction. On the other hand, the side plate 102 (lower side plate as seen in FIG. 7) nearer to the steering column centerline CLS is provided with one vertically extending bead 110 formed between the pedal attaching portion 108 and a rear fixing portion 112 thereof. The two side plates 102 with the front and rear fixing portions 106, 112 and the upper plate 104 are formed as a one-piece body from a single steel plate.

In the embodiment of FIG. 7, the bead 110 provided on each of the side plates 102 functions as the low-strength portion which permits or induces deformation or buckling of the side plates 102. The pedal bracket 100 of FIG. 7 has a higher degree of rigidity at the pedal attaching portion 108 (at which the boss portion 37 is pivotally supported), in the presence of the upper connecting plate 104, than the pedal bracket 28 of FIG. 3.

Figure 8:
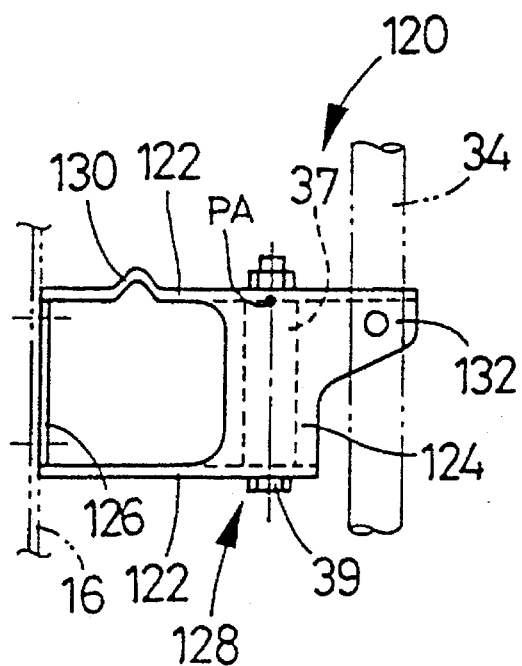
FIG. 8 is a plan view of a brake pedal device according to a further embodiment of the invention.

Like the pedal bracket 100 of FIG. 7, a pedal bracket 120 of FIG. 8 has a pair of side plates 122 and an upper plate 124. The side plate 122 (upper side plate as seen in FIG. 8) remote from the steering column centerline is provided with one vertically extending bead 130 between a first fixing portion 126 and a pedal attaching portion 128 thereof. Unlike the pedal bracket 100 of FIG. 7, the pedal bracket 120 has a rear fixing portion 132 on the side of the upper side plate 122 only, and the side plate 122 (lower side plate as seen in FIG. 8) nearer to the steering column centerline is not directly connected to the reinforcement member 34. In other words, the latter side plate 122 does not extend backward beyond the pedal attaching portion 124, and the absence of this side plate 122 at the reinforcement member 34 reduces the bending strength of the pedal bracket 120 at its rear end fixed to the reinforcement member 34.

Upon application of an external force to the vehicle, the side plate 122 remote from the steering column centerline does not buckle at a portion thereof between the pedal attaching portion 128 and the rear fixing portion 132, but will buckle at a portion thereof between the front fixing portion 126 and the pedal attaching portion 128. On the other hand, the side plate 122 nearer to the steering column centerline does not buckle at a portion thereof between the first fixing portion 126 and the pedal attaching portion 132, but a portion of the upper plate 124 near the rear fixing portion 132 and the rear end of that side plate 122 buckles, whereby the rear end portion of that side plate 122 is moved close to the reinforcement member 34. As a result, the brake pedal 30 is rotated counterclockwise as seen in FIG. 8 in the horizontal plane about the pedal attaching point PA on the side plate 122 remote from the steering column centerline. In this embodiment, too, the dash panel 16 is displaced backward while maintaining its posture parallel to the transverse direction of the vehicle.

In the present embodiment of FIG. 8, the bead 110 serves as the low-strength portion of the side plate remote from the steering column centerline, while the cutout of the rear end portion of the side plate 122 nearer to the steering column centerline can be considered as the low-strength portion of that side plate 122, or means for permitting that side plate 22 to be spaced apart from the reinforcement member 34 before application of an external force to the vehicle and to be displaced backward toward the reinforcement member 34 upon application of the external force. According to the present arrangement, the pedal bracket 120 can be easily made smaller in size than the pedal bracket 28 of FIG. 3.

Figure 9:
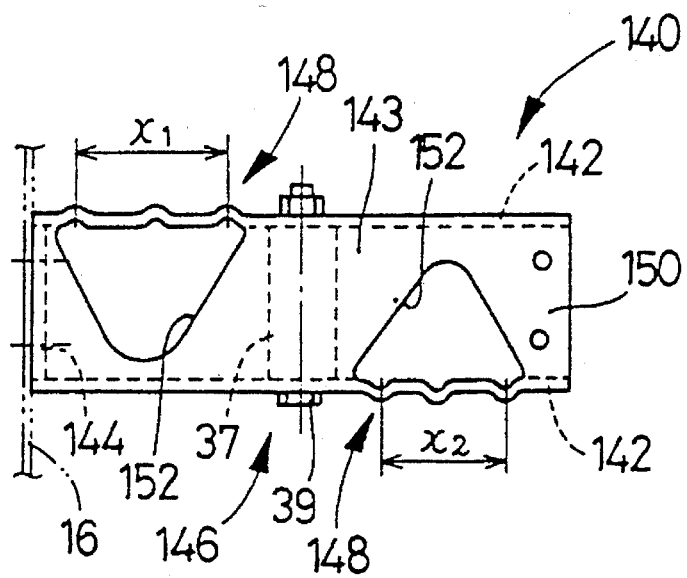
FIG. 9 is a plan view of a brake pedal device; according to a still further embodiment of the invention.

In a pedal bracket 140 shown in FIG. 9, a pair of side plates 142 are connected to each other by an upper plate 143. The side plates 142 and the upper plate 143 are formed as a one-piece body from a single steel plate. The side plate 142 (upper side plate as seen in FIG. 9) remote from the steering column centerline is provided with an array of three beads 148 formed between a front fixing portion 144 and a pedal attaching portion 146. Each bead 148 extends in the vertical direction of the vehicle. The side plate 142 (lower side plate as seen in FIG. 9) nearer to the steering column centerline is provided with an array of vertically extending three beads 148 between the pedal attaching portion 146 and a rear fixing portion 150. The two outermost beads 148 on the side plate 142 remote from the steering column centerline has a distance ×1, while those on the side plate 142 nearer to that centerline has a distance ×2. Upon application of an external force to the vehicle, these side plates 142 are contracted by buckling at the beads 148 by the respective distances ×1 and ×2.

The upper plate 143 has two holes 152 each in the form of a substantially equilateral triangle whose base corresponds to a straight line connecting the two outer beads of the bead array 148 on each side plate 142. These holes 152 facilitate deformation of the upper plate 143 upon deformation of the side plates 142 due to buckling of the beads 148.

In the present embodiment, the array of three beads 148 and the one hole 152 cooperate to provide the low-strength portion of each side plate 142. The present pedal bracket 140 having the upper plate 143 provides a higher strength at the pedal attaching portion 146 and the rear fixing portion 150, than the pedal bracket 28 of FIG. 3, whereby the boss portion 37 of the brake pedal 30 and the steering column 12 can be supported by the pedal bracket 140 with a higher degree of rigidity. The upper plate 104 may be replaced by a lower plate which connects the side plates 142 at their lower edges.

Figure 10:
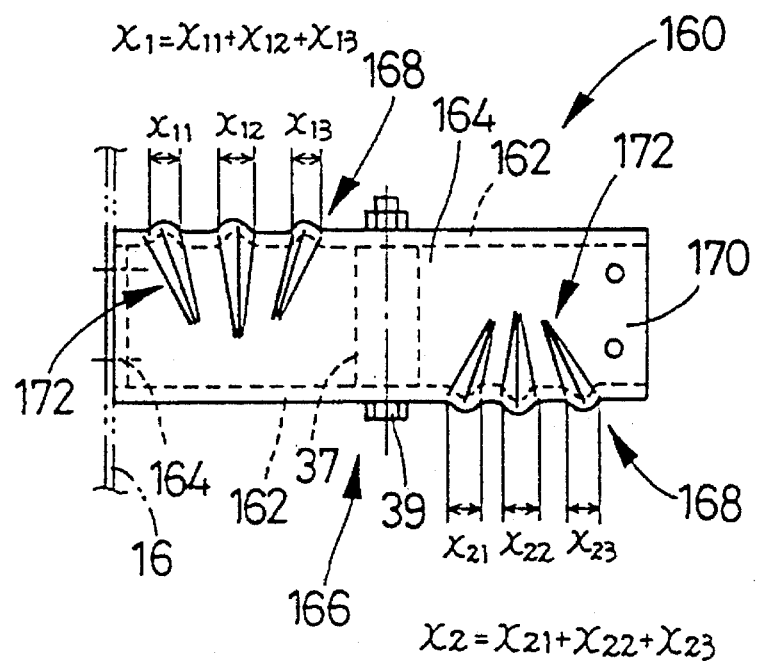
FIG. 10 is a plan view of a brake pedal device according to a yet further embodiment of the invention.

Like the pedal bracket 140 of FIG. 9, a pedal bracket 160 shown in FIG. 10 has a pair of side plates 162 and an upper plate 164. The side plate 162 remote from the steering column centerline (upper side plate as seen in FIG. 10) is provided with an array of three vertically extending beads 168 between a front fixing portion 164 and a pedal attaching portion 166 thereof, while the side plate 162 (lower side plate as seen in FIG. 10) nearer to the steering column centerline is provided with an array of three vertically extending beads 168 between the pedal attaching portion and a rear fixing portion 170 thereof. The three beads 168 on the side plate 162 remote from the steering column centerline have respective width dimensions ×11, ×12 and ×13, while the three beads 168 on the side plate 162 nearer to the steering column centerline have respective width dimensions ×21, ×22 and ×23. A sum of the dimensions ×11, ×12 and ×12 is determined to be equal to the distance ×1 in the embodiment of FIG. 9, while a sum of the dimensions ×21, ×22 and ×23 is determined to be equal to the distance ×2 in FIG. 9. Unlike the upper plate 143 of the pedal bracket 140 of FIG. 9, the upper plate 164 of the present pedal bracket 160 has two arrays of beads 172. Each array consists of three beads 172 which extend radially from the upper ends of the corresponding beads 168 of each side plate 162 toward a point on the upper plate 164. The beads 172 facilitate deformation of the upper plate 164 upon deformation of the side plates 162 due to buckling of the beads 168. Thus, the beads 172 have the same function as the holes 152 provided in the embodiment of FIG. 9.

In the embodiment of FIG. 10, the array of three beads 168 and the corresponding array of three beads 172 cooperate to provide the low-strength portion of each side plate 162. The present pedal bracket 140 has a high degree of strength at the pedal attaching portion 166 and the rear fixing portion 170 than the pedal bracket 140 of FIG. 9, whereby the brake pedal 30 and the steering column 12 can be supported by the present pedal bracket 160 with improved rigidity.

Figure 11:
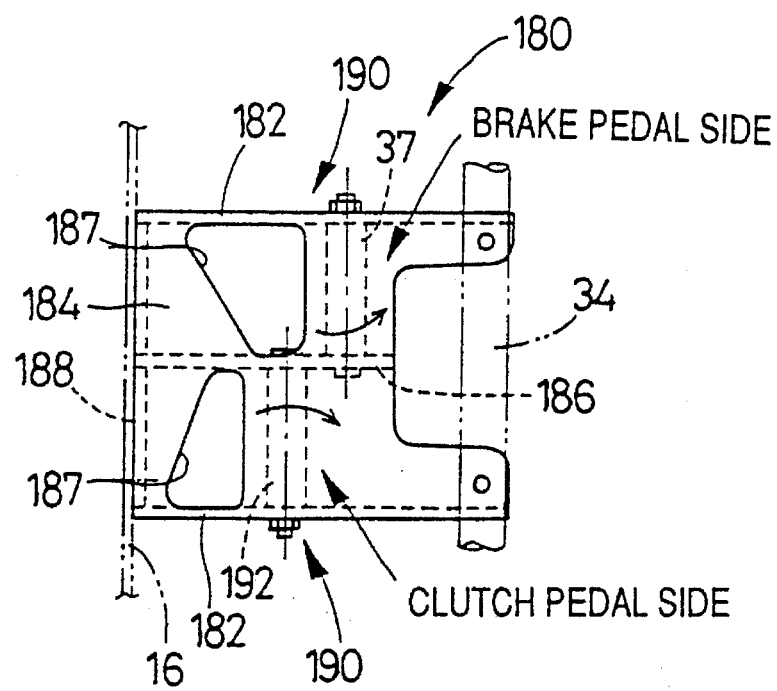
FIG. 11 is a plan view of a brake pedal device according to another embodiment of the invention.
Figure 12:
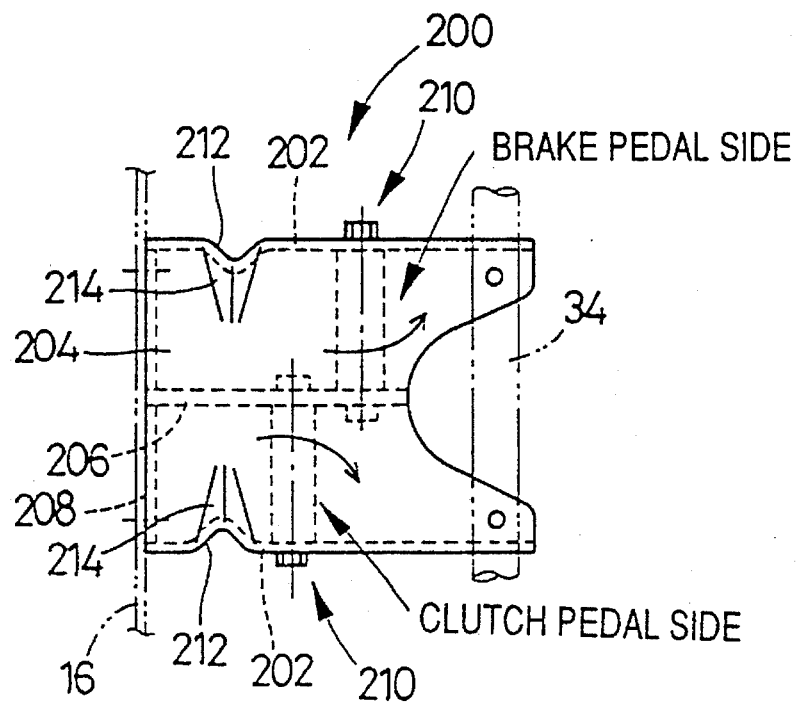
FIG. 12 is a plan view of a brake pedal device according to still another embodiment of the invention.

Pedal brackets 180 and 200 shown in FIGS. 11 and 12 are adapted to be used in a motor vehicle equipped with a manual transmission (hereinafter referred to as "MT vehicle"). In the MT vehicle, the brake pedal is offset to the right of the steering column centerline CLS, and the clutch pedal is offset to the left of this centerline CLS. In the MT vehicle, separate pedal brackets constructed according to the present invention may be used for these brake and clutch pedals, respectively. However, the pedal bracket 180, 200 shown in FIGS. 11 and 12 is constructed to pivotally support both of these two pedals, so that the overall structure for supporting the two pedals is smaller in size and weight in these embodiments of FIGS. 11 and 12 than in the case where the two separate pedal brackets are used for the brake and clutch pedals. The pedal brackets 180, 200 will be described below in detail.

The pedal bracket 180 shown in FIG. 11 can be considered to be equivalent in design concept to a pedal bracket arrangement wherein the two pedal brackets 120 of FIG. 8 are disposed symmetrically with each other with respect to the side plate 122 nearer to the steering column centerline. In the present pedal bracket 180, two side side plates 182 are connected to each other by an upper plate 184, and an intermediate plate 186 extends between and in parallel with the side plates 182 and is fixed to an intermediate portion of the upper plate 184. Upon application of an external force to the vehicle, both of the side plate 182 (upper side plate as seen in FIG. 11) located to the right of the steering column centerline and the side plate 182 (lower side plate as seen in FIG. 11) located to the left of to the steering column centerline buckle at their portions between a first fixing portion 188 and a pedal attaching portion 190, in the presence of holes 187 formed through the upper plate 184 between the front fixing and pedal attaching portions 188, 190. The intermediate plate 186 does not extend beyond the pedal attaching portion 190 in the backward direction and is spaced apart from the reinforcement member 34. Therefore, backward displacement of the intermediate plate 186 is not prevented by the reinforcement member 34. In this arrangement, a backward displacement of the dash panel 16 upon application of the force to the vehicle will cause a counterclockwise pivotal movement (as seen in FIG. 11) of the brake pedal about the point of contact between the boss portion 37 and the side plate 182 located to the right of the steering column centerline, and a clockwise pivotal movement (as seen in FIG. 11) of the clutch pedal about the point of contact between a boss portion 192 of the clutch pedal and the side plate 182 located to the left of the steering column centerline. As a result, the brake pedal and the clutch pedal are both pivoted in the horizontal plane in the directions away from the steering device In the present embodiment of FIG. 11, the holes 187 formed in the upper plate 184 and the spaced-apart relationship of the rear end of the intermediate plate 186 with respect to the reinforcement member 34 (before application of an external force to the vehicle) cooperate to provide means for reducing the strength of the pedal structure at the selected local portions thereof.

Like the pedal bracket 180 of FIG. 11, the pedal bracket 200 shown in FIG. 12 has a pair of side plates 202, an upper plate 204, and an intermediate plate 206 whose read end is spaced apart from the reinforcement member 34 before application of the external force to the vehicle. However, the pedal bracket 200 is different from the pedal bracket 180 in that each side plate 202 has one vertically extending bead 212 between a front fixing portion 208 and a pedal attaching portion 210. Further, the upper plate 204 has beads 214 which extends from the upper ends of the beads 212 of the side plates 202 toward the intermediate plate 206. The beads 214 facilitate deformation of the upper plate 204 upon deformation of the side plates 202 due to buckling of the beads 212.

In the present embodiment of FIG. 12, the beads 212 and 214 and the spaced-apart relationship of the rear end of the intermediate plate 206 with respect to the reinforcement member 34 (before application of an external force to the vehicle) cooperate to provide means for reducing the strength of the pedal structure at the selected local portions thereof.

Referring next to FIGS. 13–17, there will be described various other forms of the pedal bracket of the type adapted to permit a pivotal movement of the brake pedal.

Figure 13:
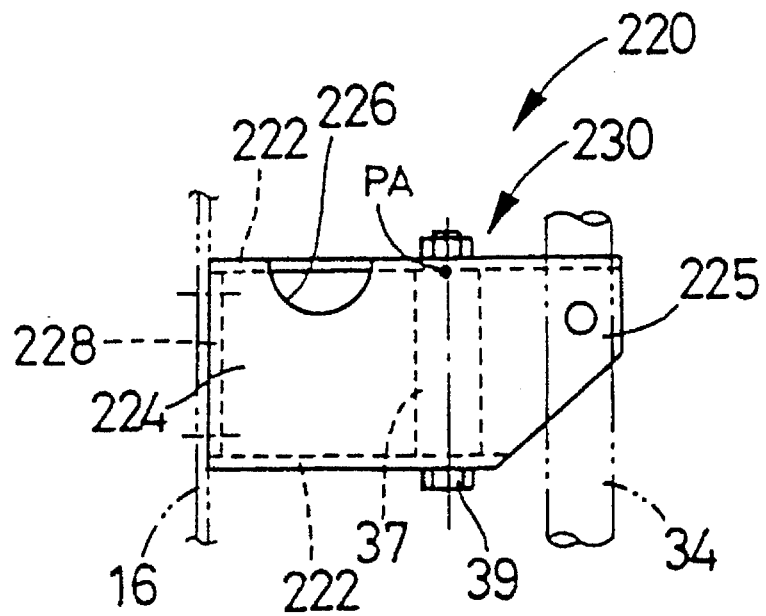
FIG. 13 is a plan view of a brake pedal device according to yet another embodiment of the invention.

A pedal bracket 220 shown in FIG. 13 can be considered to be equivalent in design concept to the pedal bracket 120 of FIG. 8. The pedal bracket 220 has a pair of side plates 222 and an upper plate 224. The upper plate 224 has a rear fixing portion 225 only on the side of the side plate 222 remote from the steering column centerline, and the other side plate 222 nearer to the steering column centerline is not directly fixed to the reinforcement member 34.

Unlike the pedal bracket 120 of FIG. 8, however, the pedal bracket 220 does not have any bead on the side plate 222 remote from the steering column centerline, but the upper plate 224 has a semicircular hole 226 as a low-strength portion. The semicircular hole 226 is formed between a front fixing portion 228 and a pedal attaching portion 230, and is located on the side of the side plate 222 remote from the steering column centerline, such that the straight segment of the semicircle is aligned with that side plate 222. Upon application of an external force to the vehicle, the side plate 222 remote from the steering column centerline buckles between the front fixing portion 228 and the pedal attaching portion 230, in the presence of the semicircular hole 226 in the upper plate 224, and the upper plate 224 is bent due to buckling thereof between the front fixing portion 228 and the pedal attaching portion 230. Further, the rear end portion of the upper plate 224, that is, the rear fixing portion 225 of the pedal bracket 220 buckles and is bent. Therefore, the dash panel 16 is displaced backward while maintaining the parallelism with the reinforcement member 34. With the deformation of the pedal bracket 220, the brake pedal 30 is pivoted in the counterclockwise direction (as seen in FIG. 13) about the pedal attaching point PA or point of contact between the boss portion 37 of the brake pedal 30 and the side plate 222 remote from the steering column centerline.

In the present embodiment of FIG. 13, the semicircular hole 226 formed through the upper plate 224 and the spaced-apart relationship between the reinforcement member 34 and the rear portion of the side plate 222 nearer to the steering column centerline (before application of the force to the vehicle) provide means for reducing the strength of the pedal bracket 220 at the selected local portions.

Figure 14:
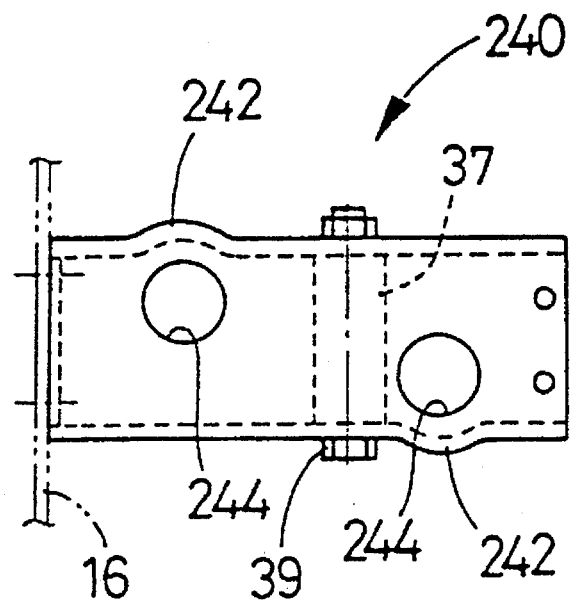
FIG. 14 is a plan view of a brake pedal device according to a further embodiment of the invention.
Figure 15:
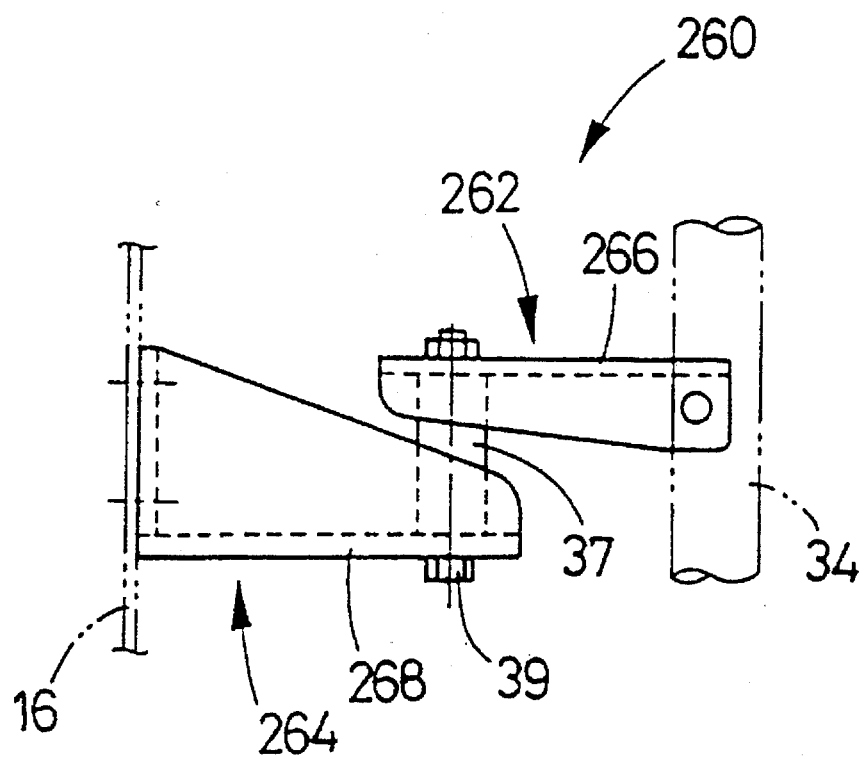
FIG. 15 is a plan view of a brake pedal device according to a further embodiment of the invention.
Figure 16:
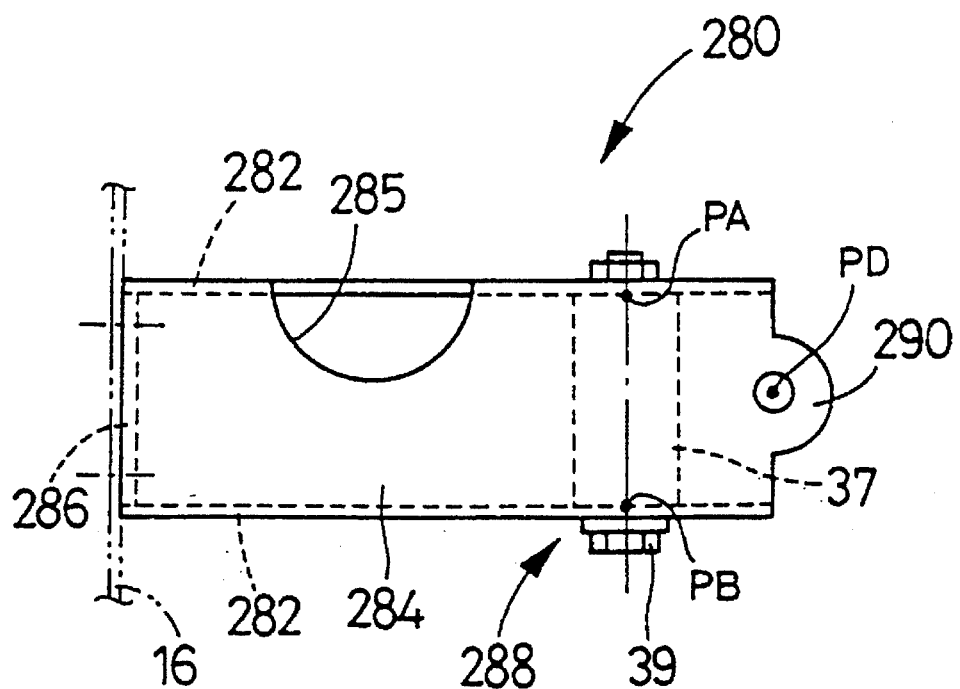
FIGS. 16(a) and 16(b) are plan views of a brake pedal device according to another embodiment of the invention, explaining a change in the shape of a pedal bracket before and after application of an external force to the vehicle.
Figure 16:
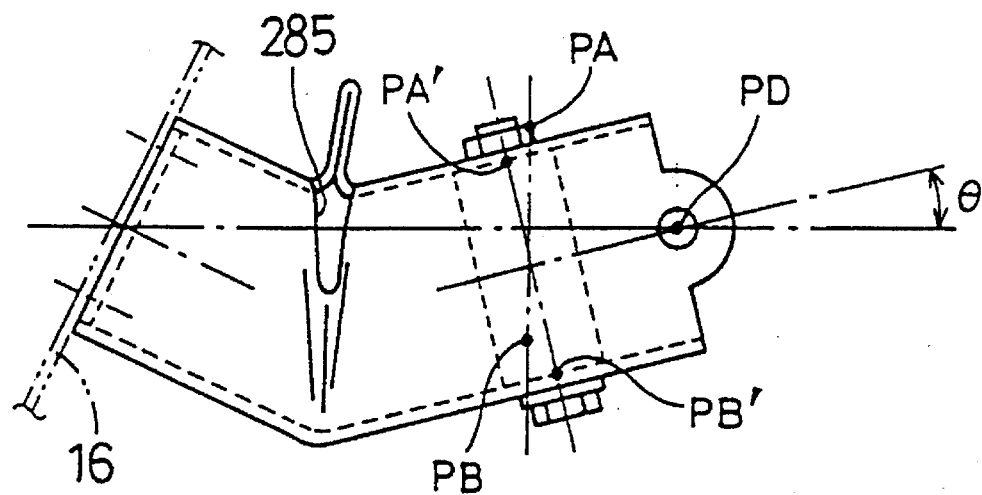

A pedal bracket 240 shown in FIG. 14 can be considered to be equivalent in design concept to the pedal bracket 140 of FIG. 9. In the pedal bracket 240, a single bead 242 having a relatively large outward curvature is provided for each side plate in place of the array of three beads 148, while a circularly hole 244 is provided for each side plate in place of the equilateral triangular hole 152. In the present pedal bracket 240, the beads 242 and the circular holes 244 constitute the low-strength portions.

Unlike the pedal brackets described above, a pedal bracket 260 shown in FIG. 15 have two side plates 266, 268 provided on respective separate first and second members 262, 264. The first member 262 connects the reinforcement member 34 and one of opposite ends of the boss portion 37 which is remote from the steering column centerline, while the second member 264 connects the dash plate 16 and the other end of the boss portion 37 nearer to the steering column centerline. However, the pedal bracket 260 is similar in design concept to the pedal brackets 120, 220 of FIGS. 8 and 13, in that the side plate 268 of the second member 264 is not directly connected to the reinforcement member 34. This spaced-apart relationship of the side plate 268 with respect to the reinforcement member 34 provides means for reducing the strength of the pedal bracket 260 at the selected portion. However, the pedal bracket 260 is different from the pedal brackets 120, 220, in that the side plate 266 of the first member 262 is not directly connected to the dash plate 16. This spaced-apart relationship of the side plate 266 with respect to the dash plate 16 provides another means for reducing the local strength of the pedal bracket 260.

The embodiments which have been described are all adapted so that the brake pedal 30 is pivoted about the pedal attaching point PA on the side plate remote from the steering column centerline. However, the pedal bracket may be constructed to permit the pivotal movement of the brake pedal 30 about a point other than the pedal attaching point PA, as in the following embodiments of the invention which will be described by reference to FIGS. 16–18.

A pedal bracket 280 shown in FIG. 16(a) is similar in configuration to the pedal bracket 220 of FIG. 13. In this pedal bracket 280, a pair of side plates 282 are connected to each other by an upper plate 284, and a semicircular hole 285 is formed in the upper plate 284 such that the straight segment of the semicircle is aligned with the side plate 282 remote from the steering column centerline. The pedal bracket 280 has a front fixing portion 286, a pedal attaching portion 288 and a rear fixing portion 290.

Upon application of an external force to the vehicle, the side plate 282 remote from the steering column centerline buckles at a portion thereof corresponding to the semicircular hole 285, with a result of two-fold bending outwardly of the pedal bracket 280, as shown in FIG. 16(b), such that the length of the outward fold almost equal to the radius of the semicircular hole 285, which is deformed into a narrow generally elongate hole. This narrow hole substantially divides the pedal bracket 280 into the front and rear portions. During deformation of the pedal bracket 280, the rear portion including the rear fixing portion 290 is pivoted in the horizontal plane about a point PD of fixing of the rear fixing portion 290 to the reinforcement member 34. The fixing point PD is located between the two side plates 282. In the present embodiment, therefore, the upper plate 284 buckles near the semicircular hole 285, creating a crease on the side of the side plate 282 nearer to the steering column centerline, and that side plate 282 is bent at a portion corresponding to the hole 285 (which is deformed into the narrow elongate hole), whereby the dash panel 16 is displaced in the backward direction of the vehicle while it is inclined with respect to the transverse direction of the vehicle. Namely, the dash panel 16 is not parallel to the transverse direction after the backward displacement.

In the present embodiment in which the brake pedal 30 is supported by the pedal bracket 280 of FIGS. 16(a) and 16(b), the brake pedal 30 is pivoted counterclockwise as seen in the figures, about the point PD at which the bracket 280 is fixed to the reinforcement member 34, rather than the point PA at which the bracket 280 supports the brake pedal 30.

Figure 17:
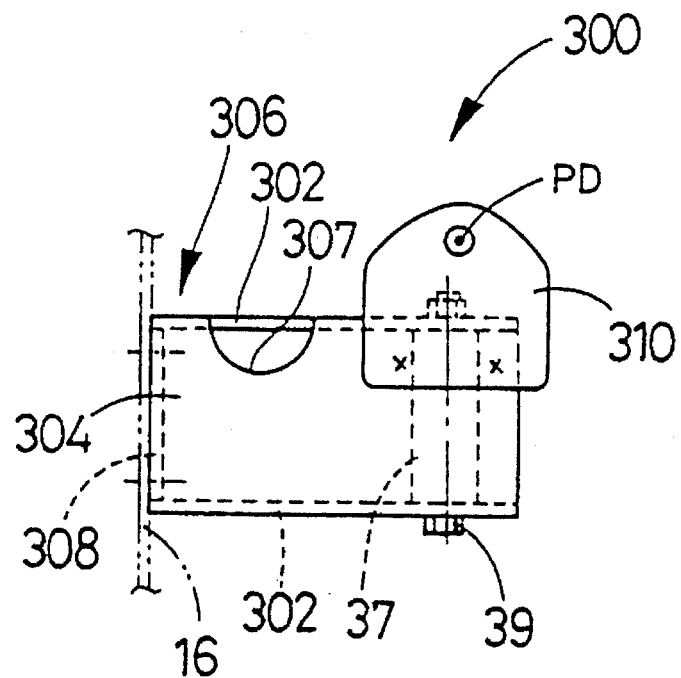
FIG. 17 is a plan view of a brake pedal device according to a further embodiment of the invention.

A pedal bracket 300 shown in FIG. 17 has a main frame 306 which includes a pair of side plates 302 and an upper plate 304 connecting the side plates 302 and which is substantially C-shaped in cross section. The upper plate 304 has a semicircular hole 307 formed such that the straight segment of the semicircle is aligned with the side plate 302 remote from the steering column centerline. A front fixing plate 308 and a rear fixing plate 310 are attached to the front and rear end portions of the main frame 306, respectively. The configuration of the pedal bracket 300 is similar in design concept to that of the pedal bracket 280 of FIG. 16, but is different from the latter in that the rear fixing plate 310 is attached to the main frame 306 such that the rear fixing plate 310 extends in a direction away from the steering column centerline so that the attaching point PD of the fixing plate 310 with respect to the reinforcement member 34 is spaced apart from the side plate 302 which is remote from the steering column centerline.

Upon application of an external force to the vehicle, the main frame 306 as a whole is pivoted counterclockwise about the attaching point PD, and is bent into a substantially L-shaped piece in the presence of the semicircular hole 307. As a result, the brake pedal 30 is pivoted counterclockwise about the attaching point PD, with a backward displacement of the dash panel 16 while maintaining its parallelism with the transverse direction of the vehicle.

Figure 18:
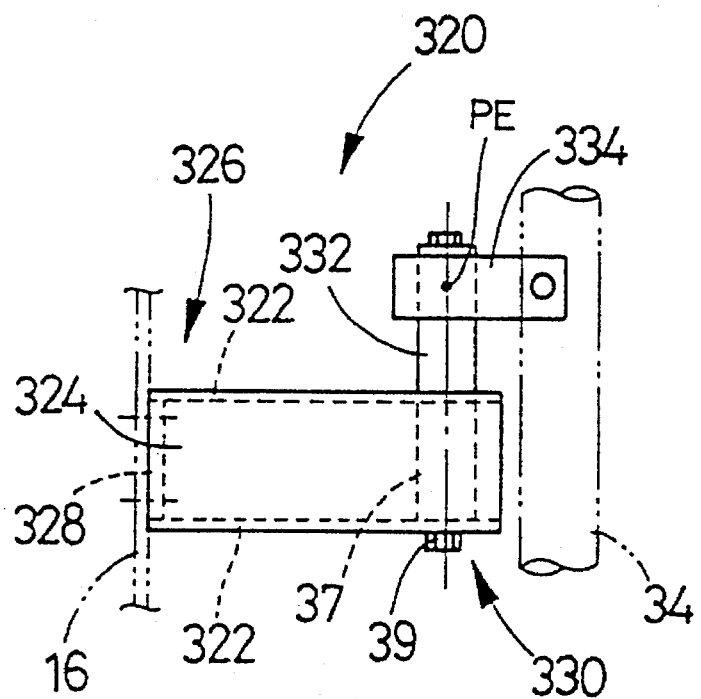
FIG. 18 is a plan view of a brake pedal device according to a still further embodiment of the invention.

A pedal bracket 320 shown in FIG. 18 also has a main frame 326 which includes a pair of side plates 322 and an upper plate 324 connecting the side plates 322 and which is substantially C-shaped in cross section. A front fixing plate 328 is attached to the front end portion of the main frame 326, and a rear fixing plate 328 is provided near the rear end portion of the main frame 326. To the outer surface of the side plate 322 remote from the steering column centerline, there is fixed a connecting sleeve 332 such that the sleeve 332 is coaxial with the boss portion 37 of the brake pedal 30. The boss portion 37 is pivotally attached to the main frame 26 with the steeped bolt 39 inserted through the connecting sleeve 332 as well as the boss portion 37. The connecting sleeve 332 is fixed to the reinforcement member 34 by the rear fixing plate 334.

Upon application of an external force to the vehicle, the main frame 326 itself undergoes substantially no deformation, but is pivoted counterclockwise as seen in FIG. 18, about a point PE of attachment of the rear fixing plate 328 to the connecting sleeve 332. In this embodiment, the dash panel 16 is displaced backward with some inclination thereof with respect to the transverse direction of the vehicle.

The embodiments of the invention which have been described above may be modified as described below. for example, the lever portion 36 of the brake pedal 30 may be bent in the transverse direction of the vehicle so that the center point PC of the pedal pad surface is offset to the right (as seen from the operator) with respect to the boss portion 37 in the direction away from the steering column centerline CLS, more specifically, so that the center point PC is located to the right of the pedal attaching point PA. According to this modification, the pedal center point PC is displaced in the forward direction of the vehicle when the brake pedal 30 is pivoted in the horizontal plane upon application of an external force to the vehicle. Further, the distance of leftward displacement of the pedal center point PC toward the steering column centerline is reduced. Accordingly, the operator's leg depressing the pedal pad 42 of the pivoted brake pedal 30 is more effectively moved away from the steering device.

While there have been described the various embodiments wherein the brake pedal 30 is rotated or pivoted in the horizontal plane upon application of an external force to the vehicle, there will be described some embodiments wherein the brake pedal 30 is pivoted in a vertical plane parallel to the transverse direction of the vehicle upon application of the external force.

Figure 19:
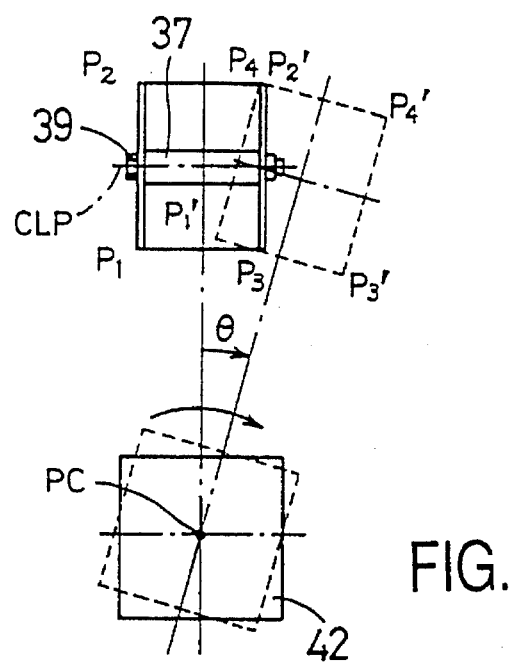
FIG. 19 is a rear view of a brake pedal device according to a yet further embodiment of the invention, as seen from the vehicle operator.
Figure 20:
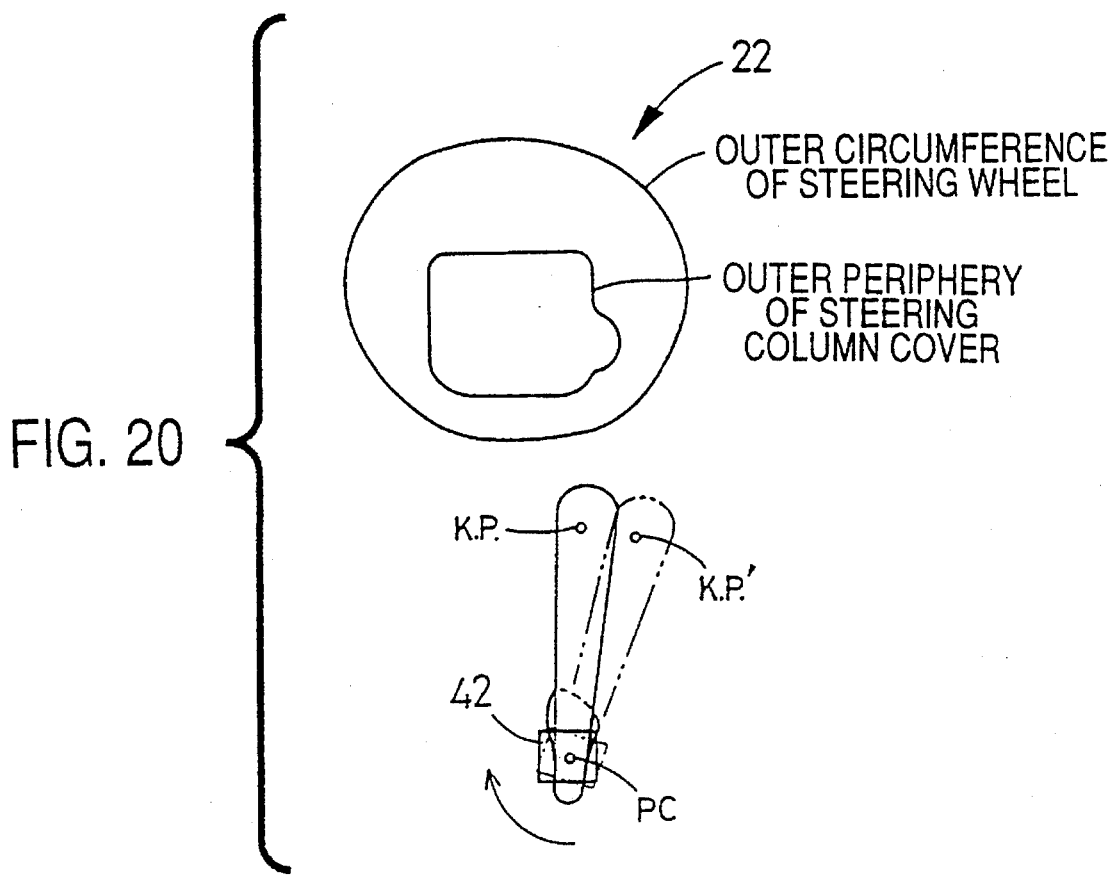
FIG. 20 is a rear view for explaining a principle of control of a displacement path of the operator's leg in the embodiment of FIG. 19.

Reference is first made to FIG. 19 showing the pedal bracket and the brake pedal as seen from the vehicle operator sitting on the operator's seat. Solid lines show the bracket and pedal before the application of an external force to the vehicle, while broken lines show the bracket and pedal after the application. In the present embodiment, the pedal bracket is adapted to cause a clockwise pivotal movement (as seen in FIG. 19) of the brake pedal 30 about the pedal pad center point PC in the vertical plane and a consequent clockwise pivotal movement of the pedal pad 42 about the center point PC, as indicated in FIG. 19, upon application of the force to the vehicle. The clockwise pivoting of the pedal pad 42 about the center point PC results in a clockwise pivotal movement of the operator's foot depressing the pedal pad 42, which in turn results in a displacement of the operator's leg away from the steering device 22. FIG. 20 shows the steering device 22, pedal pad 42, and the foot, shank and knee of the operator's right leg. As is apparent from FIG. 20, the clockwise pivotal movement of the operator's right foot means a movement of the joint center K.P. of the right knee away from the steering device 22.

It is noted that the pivotal movement of the brake pedal 30 in the vertical plane parallel to the vehicle transverse direction will cause a displacement of the point of connection between the brake pedal 30 and the push rod 50 (FIG. 2) away from the point of connection between the push rod 50 and the brake booster 46.

Figure 21:
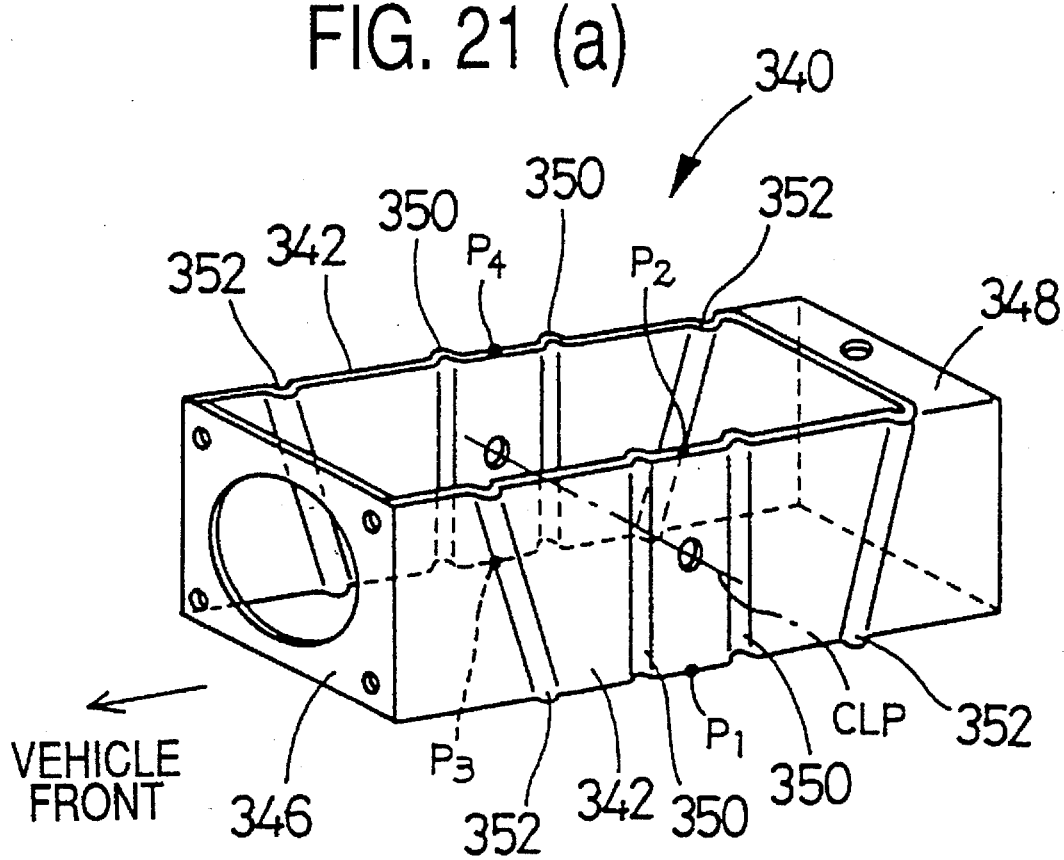
FIGS. 21(a) and 21(b) are perspective views for explaining a change in the shape of a pedal bracket of the brake pedal device of the embodiment of FIG. 19 before and after application of an external force to the vehicle.
Figure 21:
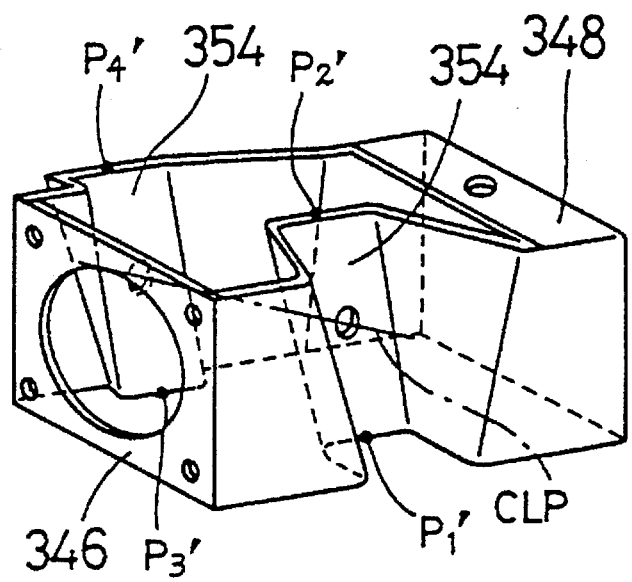

For the brake pedal 30 to be pivoted in the vertical direction upon application of an external force to the vehicle, the pedal bracket which pivotally support the brake pedal 30 may be constructed as shown in FIG. 21(*a*), for example, so that the pedal bracket is deformable as shown in FIG. 21(*b*) upon application of the external force to the vehicle, for example.

The pedal bracket 340 shown in FIG. 21(*a*) has a pair of side plates 342 which extend in parallel in the longitudinal direction of the vehicle. A front fixing plate 346 and a rear fixing plate 348 are attached to the front and rear end portions (left and right end portions as seen in the figure) of the side plates 342, respectively. The front and rear fixing plates 346, 348 are fixed to the dash panel 16 and the reinforcement member 34, respectively. The rear fixing plate 348 extends in the horizontal direction and connects the side plates 342.

Each of the two side plates 342 has two beads 350 formed at a longitudinally intermediate portion thereof so as to extend in the vertical direction, and two beads 352 which are formed on the opposite sides of the pair of intermediate beads 350. The two outer beads 352 are not in parallel with each other and with the beads 350, but are inclined with respect to the vertical such that the distance between the two outer beads 352 gradually decreases in the downward direction. The two intermediate parallel beads 350 on each of the two side plates 342 are formed so as to protrude from the appropriate surface of the side plate 342 in the direction away from the steering column centerline, while the two outer beads 352 are formed so as to protrude in the direction toward the steering column centerline.

Upon application of an external force to the vehicle, each of the two side plates 342 is bent at the four points corresponding to the four beads 350, 352 such that a pedal attaching portion 354 between the two parallel beads 350 is displaced in the direction away from the steering column centerline, while substantially maintaining the original flatness. The dimensional and positional specifications of the parallel beads 350 and the non-parallel beads 352 (e.g., distances and angles of the beads 352 with respect to the beads 352) are suitably determined so that points P1 and P2 as indicated in FIGS. 19 and 21(*a*) of the pedal attaching portion 354 of the side plate 342 nearer to the steering column centerline are displaced to points P1' and P2' as indicated in FIG. 21(*b*), respectively, while points P3 and P4 of FIG. 21(*a*) of the pedal attaching portion 354 of the side plate 342 remote from the steering column centerline are displaced to points P3' and P4' of FIG. 21(*b*), respectively. In FIGS. 19, 21(*a*) and 21(*b*), CLP represents the centerline of the boss portion 37 or the pivot axis of the brake pedal 30.

In the present embodiment of FIGS. 21(*a*) and 21(*b*), the beads 350, 352 constitute means for establishing suitable strength distribution of the pedal bracket 340, for permitting a pivotal movement of the pedal attaching portions 354 of the side plates 342 about the pedal pad center point PC upon application of an external force to the vehicle, for thereby permitting a pivotal movement of the boss portion 37 of the brake pedal 30 in the vertical plane. The beads 350, 352 may be either straight as in the present embodiment, or curved, and may have an arcuate cross sectional shape as in the present embodiment or an angular or any other shape in transverse cross section.

Figure 22:
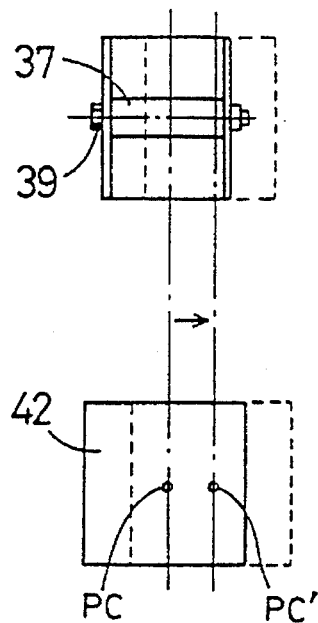
FIG. 22 is a rear view of a brake pedal device according to another embodiment of the invention.
Figure 23:
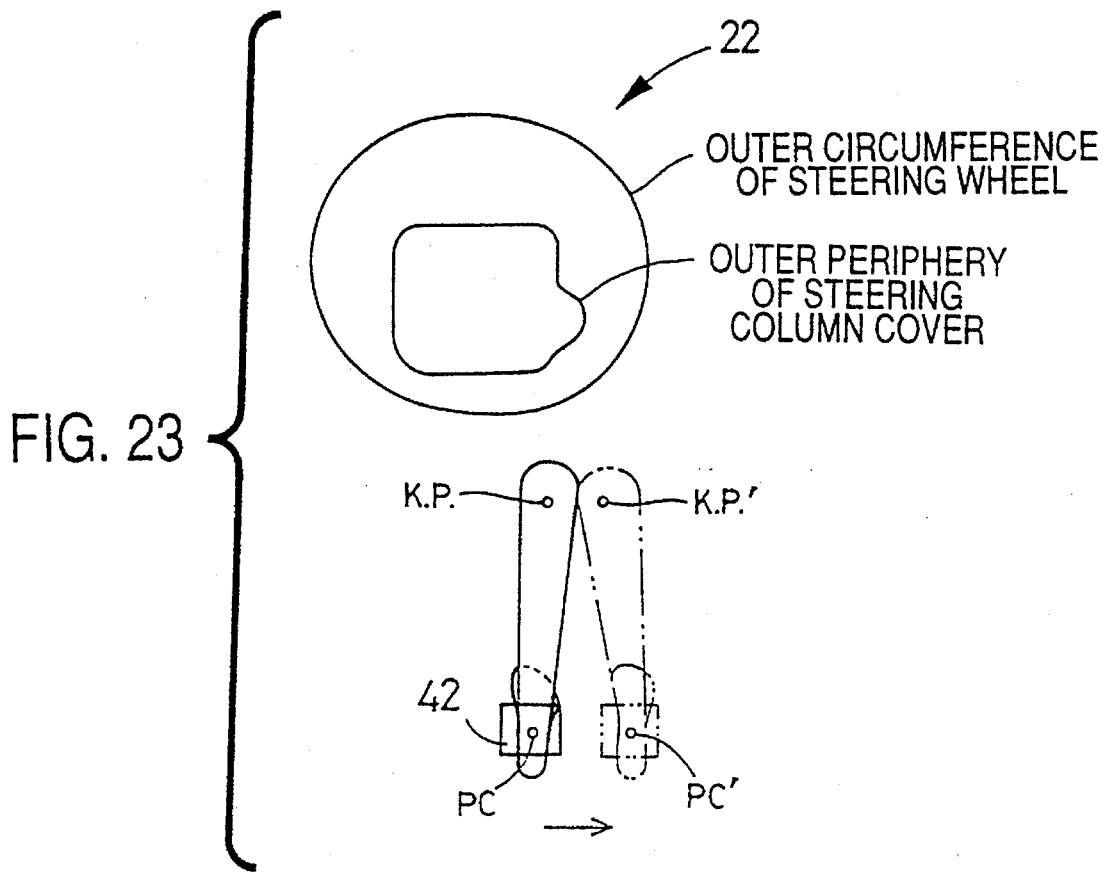
FIG. 23 is a rear view for explaining a principle of control of a displacement path of the operator's leg in the embodiment of FIG. 22.

Reference is then made to FIG. 22 showing the pedal bracket and the brake pedal as seen from the vehicle operator's seat. Solid and broken lines show the bracket and pedal before and after the application of an external force to the vehicle, respectively. In the present embodiment, the pedal bracket is adapted to cause the brake pedal 30 to be translated or linearly displaced as a whole in the rightward direction of the vehicle away from the steering column centerline, and cause the pedal pad 42 to be translated in the rightward direction, upon application of an external force to the vehicle. The translation or linear displacement of the pedal pad 42 in the rightward direction results in a displacement of the operator's foot depressing the pedal pad 42 in the direction away from the steering device 22. FIG. 23 shows the steering device 22, pedal pad 42, and the foot, shank and knee of the operator's right leg. The rightward displacement of the operator's right foot means a movement of the joint center point K.P. of the right knee away from the steering device 22.

It is noted that the rightward displacement of the brake pedal 30 will cause a displacement of the point of connection between the brake pedal 30 and the push rod 50 (FIG. 2) away from the point of connection between the push rod 50 and the brake booster 46.

Figure 24:
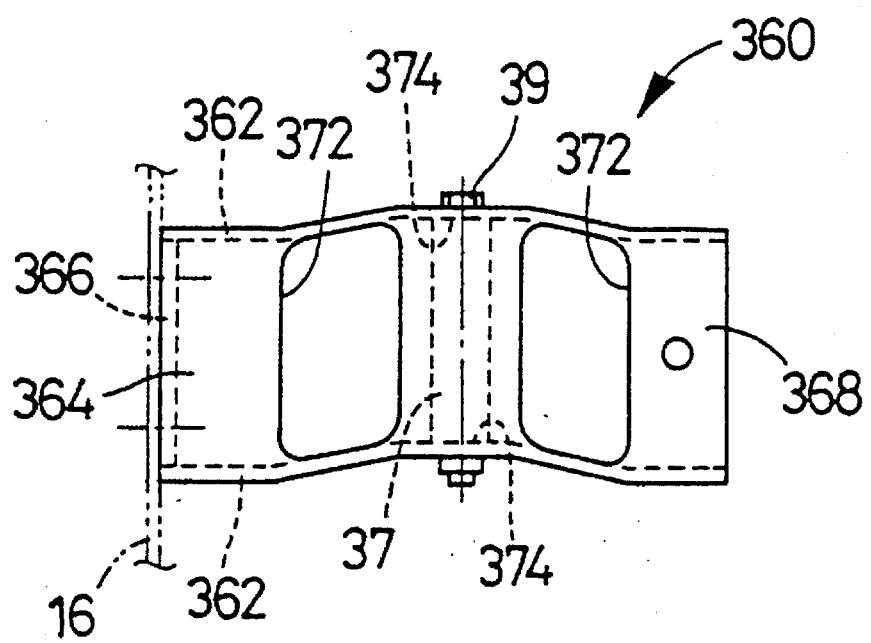
FIGS. 24(a) and 24(b) are plan views for explaining a change in the shape of a pedal bracket of the brake pedal device of the embodiment of FIG. 23 before and after application of an external force to the vehicle.
Figure 24:
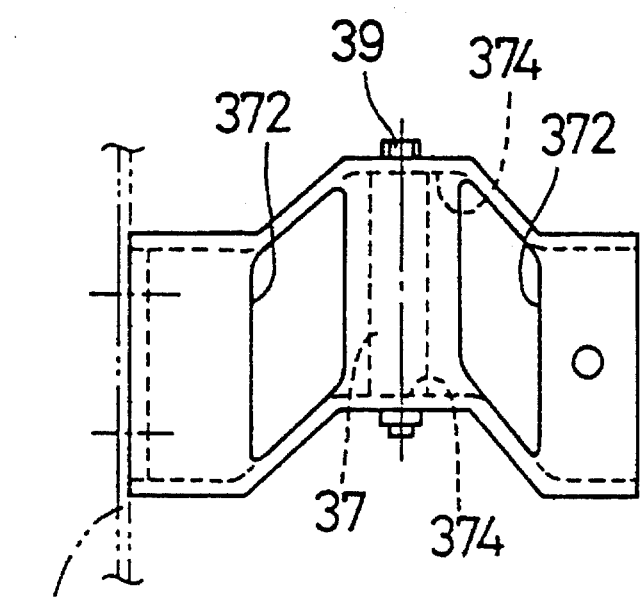

For the brake pedal 30 to be moved in the rightward direction upon application of an external force to the vehicle, the pedal bracket which pivotally support the brake pedal 30 may be constructed as shown in FIG. 24(*a*), for example, so that the pedal bracket is deformable as shown in FIG. 24(*b*) upon application of the external force to the vehicle, for example.

The pedal bracket 340 shown in FIG. 24(a) has a pair of side plates 362 which extend in parallel in the longitudinal direction of the vehicle, and an upper plate 364 connecting the side plates 362. A front fixing plate 366 and a rear fixing plate 368 are attached to the front and rear end portions of the side plates 362, respectively. The front and rear fixing plates 346, 348 are fixed to the dash panel 16 and the reinforcement member 34, respectively. The pair of side plates 342, upper plate 364 and rear fixing plate 368 are formed as a one-piece body from a single steel plate.

The side plates 362 pivotally support the boss portion 37 of the brake pedal 30 at an intermediate portion thereof as seen in the longitudinal direction. On the other hand, the upper plate 364 has two holes 372 on the opposite sides of the boss portion 37. Each hole 372 extends up to the inner surfaces of the side plates 362. The side plates 362 have pedal attaching portions 374 which are located between the two holes 372 as seen in the longitudinal direction. The side plates 362 before deformation thereof prior to the application of an external force to the vehicle are formed such that the pedal attaching portions 374 and the adjacent portions corresponding to the holes 372 are slightly offset or bent from the planes of the side plates 362 in the direction away from the steering column centerline, as indicated in FIG. 24(a). This offset facilitates buckling of the side plates 362 at the pedal attaching portions 374 in the direction away from the steering column centerline upon application of the force to the vehicle, as indicated in FIG. 24(b).

In the pedal bracket 360 of FIG. 24(a), therefore, the pedal attaching portions 374 of the side plates 362 are relatively easily translated in parallel with each other in the direction away from the steering column centerline, with a result of a linear or translating movement of the brake pedal 30 as a whole in the above direction, when an external force is applied to the vehicle.

In the present embodiment, the holes 372 constitute means for establishing suitable strength distribution of the pedal bracket 370, for permitting a rightward movement of the pedal attaching portions 374 of the side plates 362 upon application of an external force to the vehicle, for thereby permitting a rightward movement of the boss portion 37 of the brake pedal 30. Each hole 372 may be either a rectangular hole as shown in FIGS. 24(a) and 24(b), or an elliptical or circular.

In the pedal bracket 360 of FIGS. 24(a) and 24(b), the side plates 362 and the upper plate 364 are shaped or configured to permit and facilitate rightward translation of the boss portion 37 of the brake pedal 30 upon application of the external force to the vehicle. However, suitable means separate from the side plates and upper plate may be provided to achieve a similar result.

For instance, the pedal bracket may be designed as generally indicated at 380 in FIG. 25(a). This pedal bracket 380 has a pair of side plates 380 which are connected to each other by a rear fixing plate 384 only, so that the side plates 382 are easily deformable in the rightward direction upon application of an external force to the vehicle, more specifically, so that intermediate pedal attaching portions 386 of the side plates 382 may be translated in the rightward direction of the vehicle while maintaining the original parallelism, as indicated in FIG. 25(b).

Described in detail, one of the side plates 382 which is remote from the steering column centerline is provided at its outer surface with a separate displacement/force converting member 388. This converting member 388 has four parallel straight bends 390 which define five segments 390 that are arranged in the longitudinal direction. These five segments includes a front end segment 392 secured to the front end portion of the side plate 382 in question (hereinafter referred to as "remote side plate 382") and a rear end segment 394 secured to the rear end portion of the side plate 382. These front and rear end segments 392, 294 are secured to the side plate 382 by suitable means such as spot welding or any other welding, or bolts or any other fasteners.

The converting member 388 is also secured to the stepped bolt 39 used to pivotally support the boss portion 37 to the remote side plates 382. That is, a nut 398 is screwed on the externally threaded end portion of the bolt 39 which extends through the remote side plate 382. The five segments indicated above of the converting member 388 also include a center segment 396 through which the threaded end portion of the bolt 39 extends and which is tightened by and between the nut 398 and another nut 400 screwed on the threaded end portion of the bolt 39 which extends beyond the center segment 396. With the displacement/force converting member 388 thus secured to the remote side plate 382, the converting member 388 and the remote side plate 382 cooperate to define a trapezoid space therebetween which has an upper side corresponding to the center segment 396 and a lower side corresponding to the remote side plate 382. In other words, the converting member 388 is bent to partially define the trapezoid space indicated above, so that the member 388 is necessarily deformed in the direction away from the steering column centerline upon application of an external force to the vehicle. The five segments also include two slant segments 402 on the opposite sides of the center segment 396. These slant segments 402 and the center segment 396 are provided with suitable a suitable reinforcing member such as a rib or flange, so as to assure bending of the member 388 at the bends 390, namely, to prevent bending of the member 388 at points within the center and slant segments 396, 402 upon application of the force to the vehicle.

Upon application of the force to the vehicle, the displacement/force converting member 388 is displaced in the direction away from the steering column centerline, and a force which acts on the center segment 396 in the rightward direction at this time acts on the boss portion 37 of the brake pedal 30. Thus, the backward displacement of the dash panel 16 toward the rear fixing portion 384 as indicated by an arrow in FIG. 25(b) is converted by the converting member 388 into the rightward displacement of the boss portion 37. In other words, the force acting on the converting member 388 in the backward direction of the vehicle is converted into the force acting on the boss portion 37 in the rightward direction of the vehicle. With this function of the converting member 388, the side plates 382 are easily deformable at the pedal attaching portions 386 so as to be displaced in the direction away from the steering column centerline, whereby the brake pedal 30 can be linearly displaced or translated in the rightward direction of the vehicle.

In the present embodiment of FIGS. 25(a) and 25(b), too, the pedal attaching portions 386 are slightly translated backwards upon application of an external force to the vehicle, but the operator's knee is moved rightwards away from the steering device 22.

While the displacement/force converting member 388 is disposed outside the pair of side plates 382 in the pedal brackets 380 of FIG. 25(a), the force converting member may be disposed inside the pair of side plates.

The above modification is exemplified as a pedal bracket 420 shown in FIG. 26(a). This pedal bracket 420 has a displacement/force converting member 424 disposed within a pair of side plates 422. The five segments of the converting member 424 includes a center segment 426 which is sandwiched and fixed by and between the boss portion 37 and the side plate 422 remote from the steering column centerline, and a front end and a rear end segment 428, 430 which are fixed to the front and rear end portions of the inner surface of the side plate 422 nearer to the steering column centerline.

Figure 26:
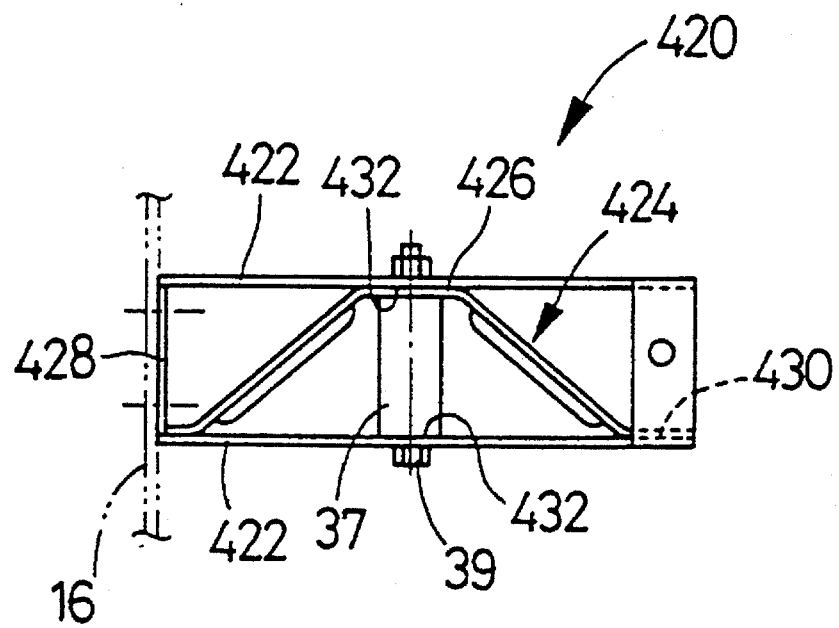
FIGS. 26(a) and 26(b) are plan views for explaining a change in the shape of a pedal bracket of a brake pedal device according to a still further embodiment of the invention before and after application of an external force to the vehicle.
Figure 26:
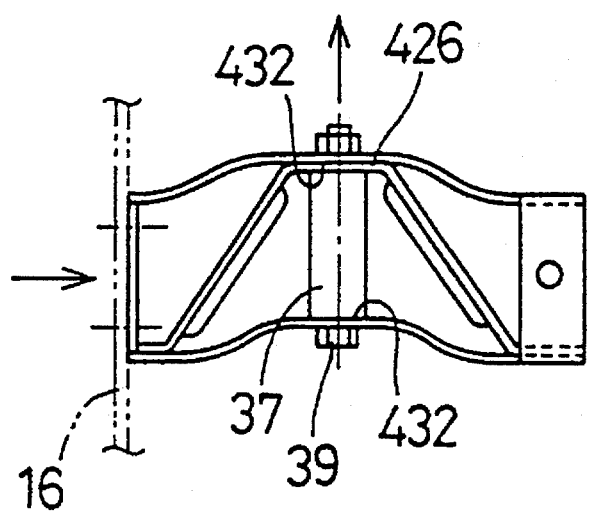

Like the preceding embodiment, the present embodiment of FIG. 26(*a*) is adapted such that the center segment 426 of the force converting member 424 is displaced in the direction away from the steering column centerline, and a force acting on the center segment 426 in the rightward direction of the vehicle acts on the boss portion 37 of the brake pedal 30 in the rightward direction, when an external force is applied to the vehicle. As a result, the pair of side plates 422 is deformed at a pair of pedal attaching portions 432 thereof in the direction away from the steering column centerline, whereby the brake pedal 30 as a whole is linearly displaced in the rightward direction of the vehicle.

Figure 25:
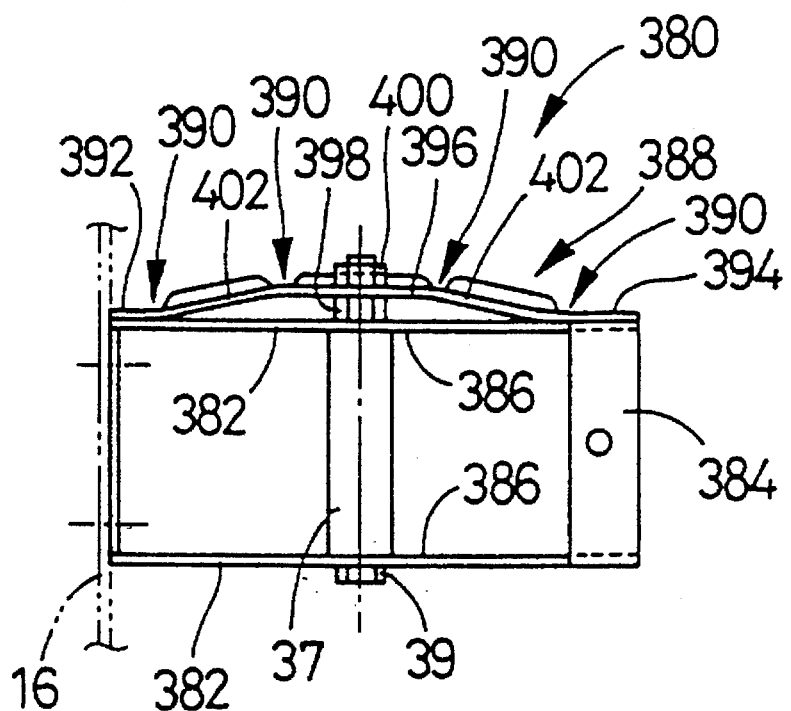
FIGS. 25(a) and 25(b) are plan views for explaining a change in the shape of a pedal bracket of a brake pedal device according to a further embodiment of the invention before and after application of an external force to the vehicle.
Figure 25:
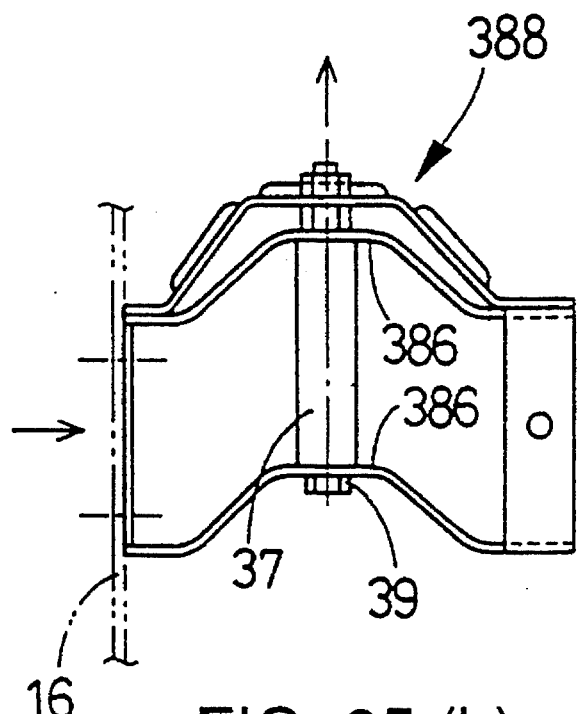

While the pedal brackets of FIGS. 24–26 are adapted to permit a rightward movement of the brake pedal 30 as a whole for moving the operator's leg away from the steering device 22, the operator's leg may be protected by moving the operator's foot in the transverse direction of the vehicle by moving the pedal pad 42 in the transverse direction.

Figure 27:
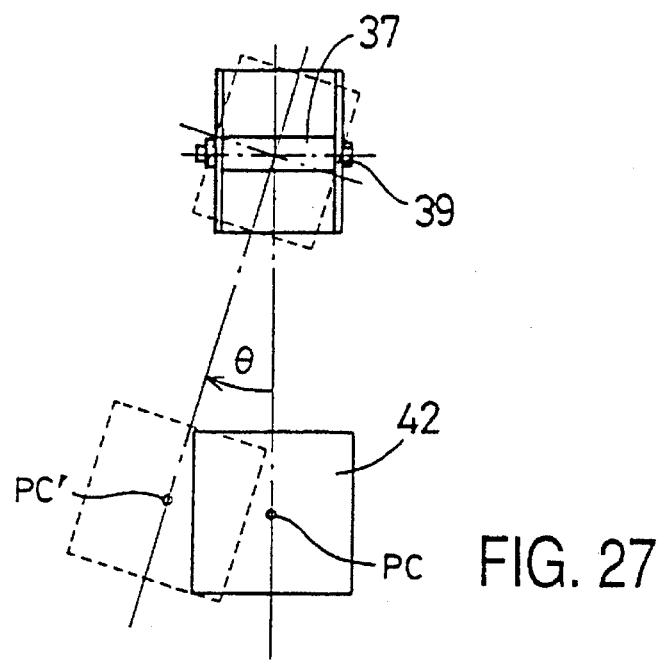
FIG. 27 is a rear view of a brake pedal device according to a yet further embodiment of the invention.

For instance, the pedal bracket may be adapted so that upon application of an external force to the vehicle, the brake pedal is pivoted about the boss portion 37 in the vertical plane parallel to the boss portion 37, to thereby move the operator's foot depressing the pedal pad 42, in the leftward direction of the vehicle, as indicated in FIG. 27 which shows the brake pedal and the pedal bracket as seen from the operator's seat. This arrangement causes a movement of the operator's leg such that the toe of the foot points a position to the right of the steering device 22, while the operator's knee is lightly moved rightwards away from the steering device 22.

One example of the pedal bracket adapted to permit the movement of the brake pedal 30 as described above is shown in FIG. 29. This pedal bracket, generally indicated at 440 in the figure, has a pair of side plates 442 extending in the longitudinal direction of the vehicle. A connecting plate 444 having a horizontal surface is fixed to the front end portions of the side plates 442, and a rear fixing plate 466 having a horizontal surface is fixed to the rear end portions of the side plates 442. The pedal bracket 440 is fixed to the reinforcement member 34 at the rear fixing plate 446. The side plates 442, connecting plate 444 and rear fixing pate 446 are formed as a one-piece body from a single steel plate. For fixing the pedal bracket 440 to the dash panel 16, a front fixing plate 448 having a vertical surface is fixed to the front end faces of the side plates 442. Another connecting plate 450 having a vertical surface is fixed to the rear end faces of the side plates 442. The connecting plate 444 and the front fixing plate 448 prevent an increase in the distance between the front end portions of the side plates 442, while the rear fixing plate 446 and the connecting plate 450 prevent an increase in the distance between the rear end portions of the side plates 442, upon application of an external force to the vehicle.

The side plates 442 pivotally support the boss portion 37 at longitudinally intermediate pedal attaching portions 451. Two displacement/force converting members 452 are fixed to the inner surfaces of the side plates 442, and located above and below the pedal attaching portions 451, respectively. Each converting member 452 is identical in shape and function with the converting member 424 shown in FIG. 26. Like the converting member 424, the converting members 452 have suitable reinforcing means such as ribs and beads on their slant segments.

Figure 29:
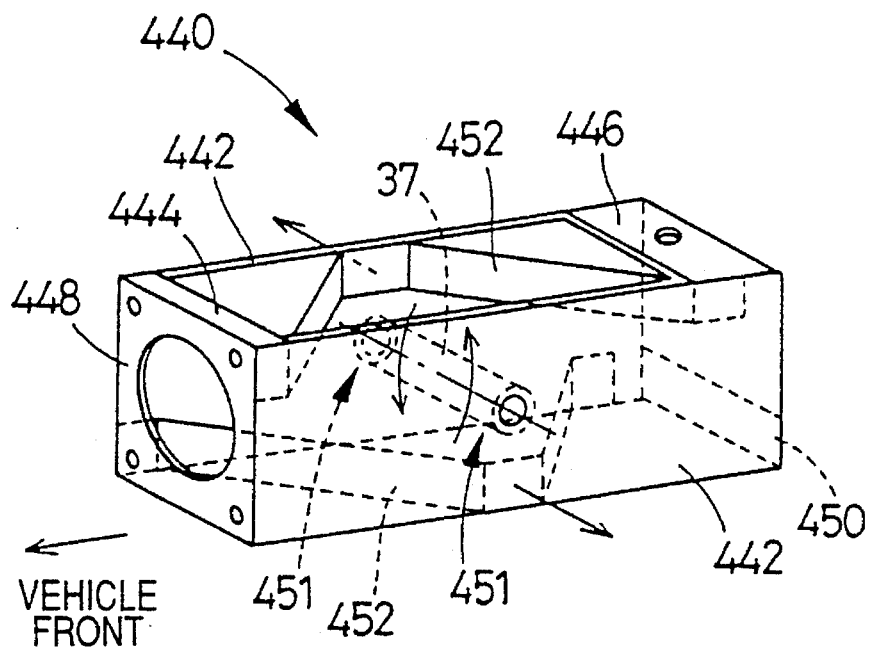
FIG. 29 is a perspective view of a pedal bracket of the brake pedal device of the embodiment of FIG. 27.

When the front fixing plate 448 is displaced toward the rear fixing plate 446 due to an external force applied to the vehicle, the upper converting member 452 receives a force which acts to increase the distance between the side plates 442. However, the fixing plates 448, 446 and the connecting plates 444, 450 function to prevent the increase in the distances between the front end portions and between the rear end portions of the two side plates 442. Accordingly, the side plate 442 remote from the steering column centerline (upper side plate 442 as seen in FIG. 29) is displaced at its longitudinally central portion in the direction away from the steering column centerline, while the side plate 442 nearer to the steering column centerline (lower side plate 442 as seen in FIG. 29) is displaced at its longitudinally central portion in the direction toward the steering column centerline. As a result, the pedal attaching portions 451 of the side plates 442 are rotated in the counterclockwise direction as indicated in FIG. 29, about an axially central portion of the boss portion 37 of the brake pedal 30 as indicated in FIG. 27, while maintaining their parallelism. Thus, the brake pedal 30 is pivoted about the axially central position of the boss portion 37.

Figure 30:
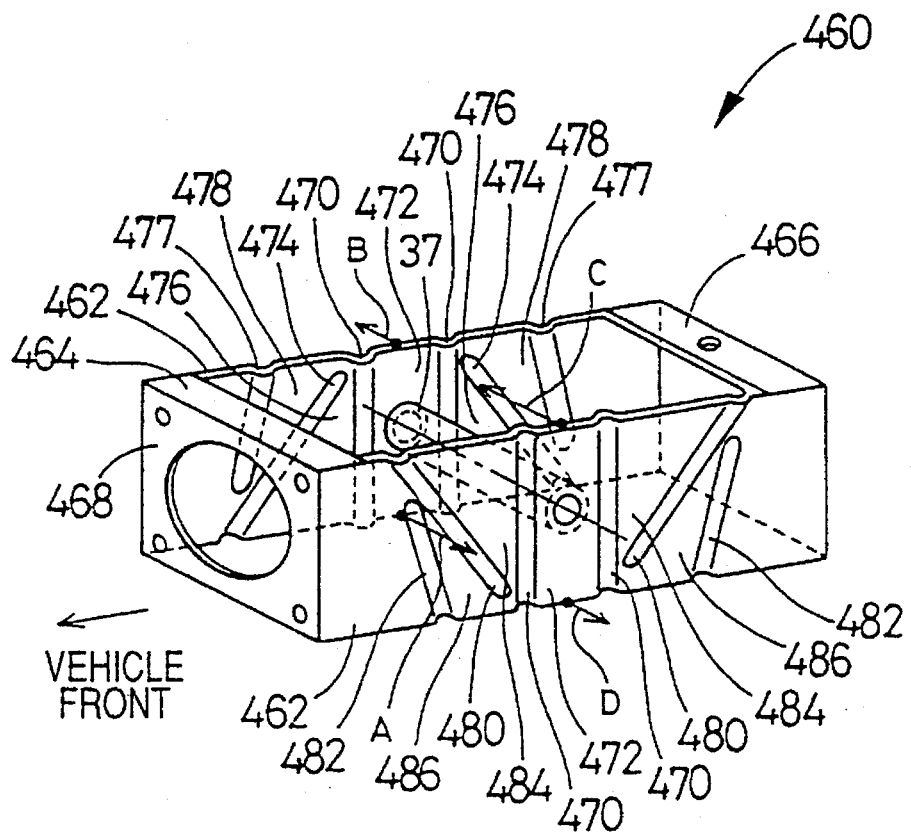
FIG. 30 is a perspective view of a pedal bracket of a brake pedal device according to a yet further embodiment of the invention.

Another form of the pedal bracket adapted to permit a pivotal movement of the brake pedal 30 about the boss portion 37 is shown generally at 460 in FIG. 30. Like the pedal bracket 440 of FIG. 29, this pedal bracket 460 has a pair of side plates 462, a connecting plate 464 and a rear fixing plate 466, which are formed as a one-piece body from a single steel plate. In addition, a front fixing plate 468 which is formed separately from the one-piece body indicated above is fixed to the front end portions of the side plates 462. Like the pedal bracket 440 of FIG. 29, the pedal bracket 460 is also provided with displacement/force converting means. However, this converting means is structurally different from the converting members 452 used in the pedal bracket 440. While the converting members 452 of FIG. 29 are separate from the side plates 442, the converting means provided in the pedal bracket 460 takes the form of beads as provided in the pedal bracket 340 of FIG. 21, which beads are formed on the side plates 462 for establishing suitable strength distribution of the side plates 462, that is, for establishing suitable bending characteristics of the side plates 462 upon application of an external force to the vehicle.

Each side plate 462 has a pair of vertically extending parallel center beads 470 located on the opposite sides of the pedal attaching point at which the boss portion 37 is pivotably supported. The center beads 470 formed on the two side plates 462 protrude inwardly of the pedal bracket 460, as seen in the transverse cross section. The two center beads 470 on each side plate 462 define a center segment 472 therebetween.

Each side plate 462 also have two additional beads on each of the front and rear sides side of the center segment 472 between the two center beads 470. These additional beads are formed so as to cause the center segment 472 to be displaced in a manner as described below upon application of an external force to the vehicle. That is, the additional beads are provided to cause a pivotal displacement of the center segment 472 of the side plate 462 remote from the steering column centerline, about the pedal attaching point, while maintaining its flatness, such that the upper end portion of the center segment 472 is displaced away from the steering column centerline while the lower end portion of the center segment 472 is displaced toward the steering column centerline, and such that the amount of displacement of the lower end portion of the center segment 472 is larger than that of the upper end portion. Further, the additional beads are provided to cause a pivotal displacement of the center segment 472 of the side plate nearer to the steering column centerline, about the pedal attaching point, while maintaining its flatness, such that the upper end portion of the center segment 472 is displaced toward the steering column centerline while the lower end portion is displaced away from the steering column centerline, and such that the amount of displacement of the upper end portion is larger than that of the lower end portion.

Described in detail, the side plate 462 remote from the steering column centerline (hereinafter referred to as "remote side plate 462") has two intermediate inclined beads 474 on the front and rear sides of the center segment 472 defined by the two parallel intermediate beads 470. Each intermediate inclined bead 474 extends from the upper end from the adjacent intermediate bead 470 and protrudes outwardly of the pedal bracket 460, as seen in the transverse cross section. Each pair of the adjacent center bead 470 and intermediate inclined bead 474 on the remote side plate 462 defines a triangular segment 476, which is bent inwardly of the pedal bracket 460 as indicated by arrow A in FIG. 30, upon application of an external force to the vehicle.

The remote side plate 462 further has two outer inclined beads 477 each of which is located on one sides of the adjacent intermediate inclined bead 474 remote from the center segment 472. Each outer inclined bead 477 extends from the lower end portion of the adjacent intermediate inclined bead 474 and protrudes inwardly of the pedal bracket 460, as seen in the transverse cross section. Each pair of the adjacent intermediate and outer inclined beads 474, 477 defines a triangular segment 478, which is bent outwardly of the pedal bracket 460 as indicated by arrow B in FIG. 30, upon application of the force to the vehicle. Since the distance between the lower ends of the adjacent center and intermediate inclined beads 470, 474 is made larger than the distance between the upper ends of the adjacent center and outer inclined beads 470, 477, the amount of displacement of the lower end portion of the center segment 472 due to the force applied to the vehicle is made larger than that of the upper end portion.

While the displacement/force converting means or strength adjusting means of the remote side plate 462 has been described, the same strength adjusting means is provided on the side plate 462 nearer to the steering column centerline (hereinafter referred to as "nearer side plate 462"). Namely, the nearer side plate 462 has a pair of intermediate inclined beads 480 on the opposite sides of the center segment 462, and a pair of outer inclined beads 482 adjacent to the intermediate inclined beads 480. Each pair of the adjacent center bead 470 and intermediate inclined bead 480 defines a triangular segment 480, which is bent inwardly of the pedal bracket 460 as indicated by arrow C in FIG. 30, upon application of an external force to the vehicle. Further, each pair of the adjacent intermediate and outer inclined beads 480, 482 defines a triangular segment 486, which is bent outwardly of the pedal bracket 460 as indicated by arrow D in FIG. 30, upon application of the force to the vehicle.

While the several embodiments of the brake pedal device or pedal bracket of the present invention wherein the brake pedal 30 as a whole is pivoted or rotated upon application of an external force to the vehicle have been described above, some embodiments wherein only the pedal pad 42 is pivoted will be described.

Figure 31:
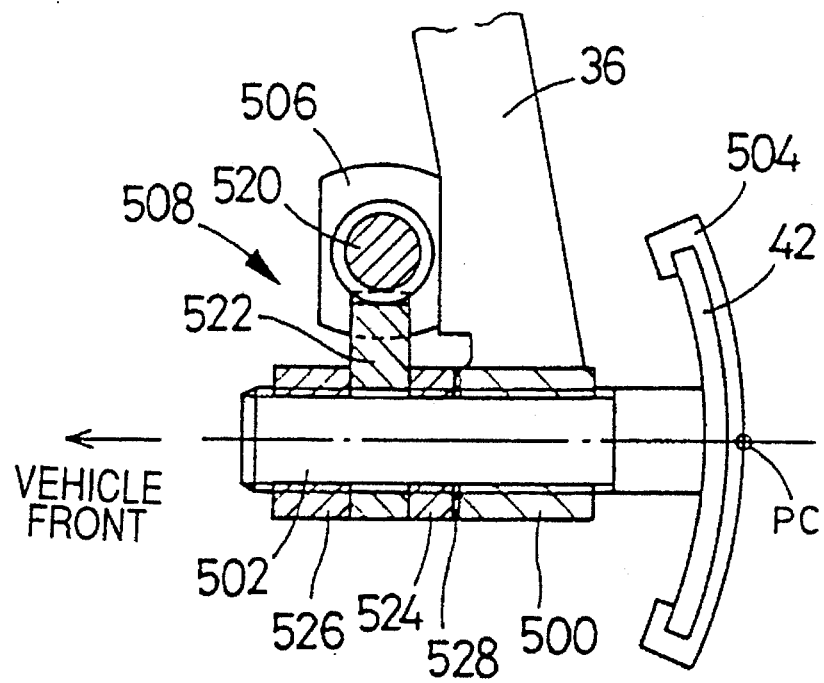
FIG. 31 is a side elevational view partly in cross section of a brake pedal pad of a brake pedal device according to another embodiment of the invention and environmental structures surrounding the brake pedal pad.
Figure 32:
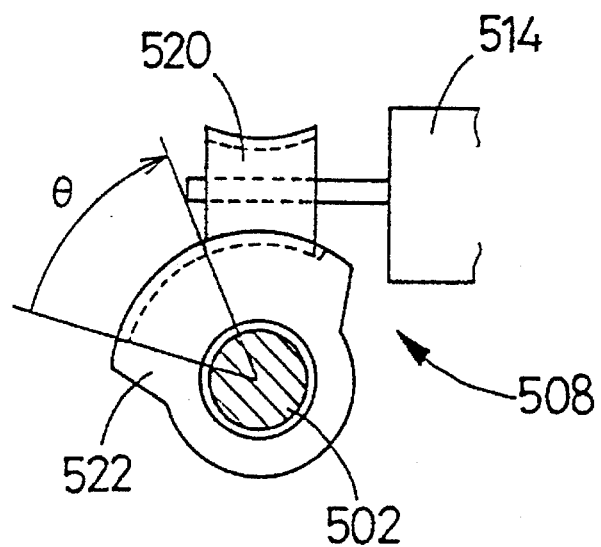
FIG. 32 is a rear view of a rotating mechanism for the brake pedal pad in the brake pedal device of FIG. 31.

In one of these embodiments, an internally threaded member 500 is fixed to the lower end portion of the lever portion 36 of the brake pedal 30, as shown in FIG. 31. The threaded member 500 is disposed so as to extend in the longitudinal or running direction of the vehicle. An externally threaded member 502 is screwed on the internally threaded member 500 such that the two threaded members 500, 502 are rotatable relative to each other. The pedal pad 42 is fixed to the rear end portion of the externally threaded member 502. In the present embodiment, the center point PC of the operating surface of the pedal pad 42 is located on the centerline of the externally threaded member 502, and the pedal pad 42 is pivotable about the center point PC and the centerline of the threaded member 502. The operating surface of the pedal pad 42 is covered by a pad cover 504 formed of a synthetic resin or rubber material. The externally threaded member 502 is linked at a front end portion thereof with a drive device 506 through a transmission mechanism 508. The drive device 508 is attached to the lever portion 36. FIG. 32 shows the drive device 506, transmission mechanism 508 and externally threaded member 502, as seen from the operator's seat of the vehicle.

Figure 33:
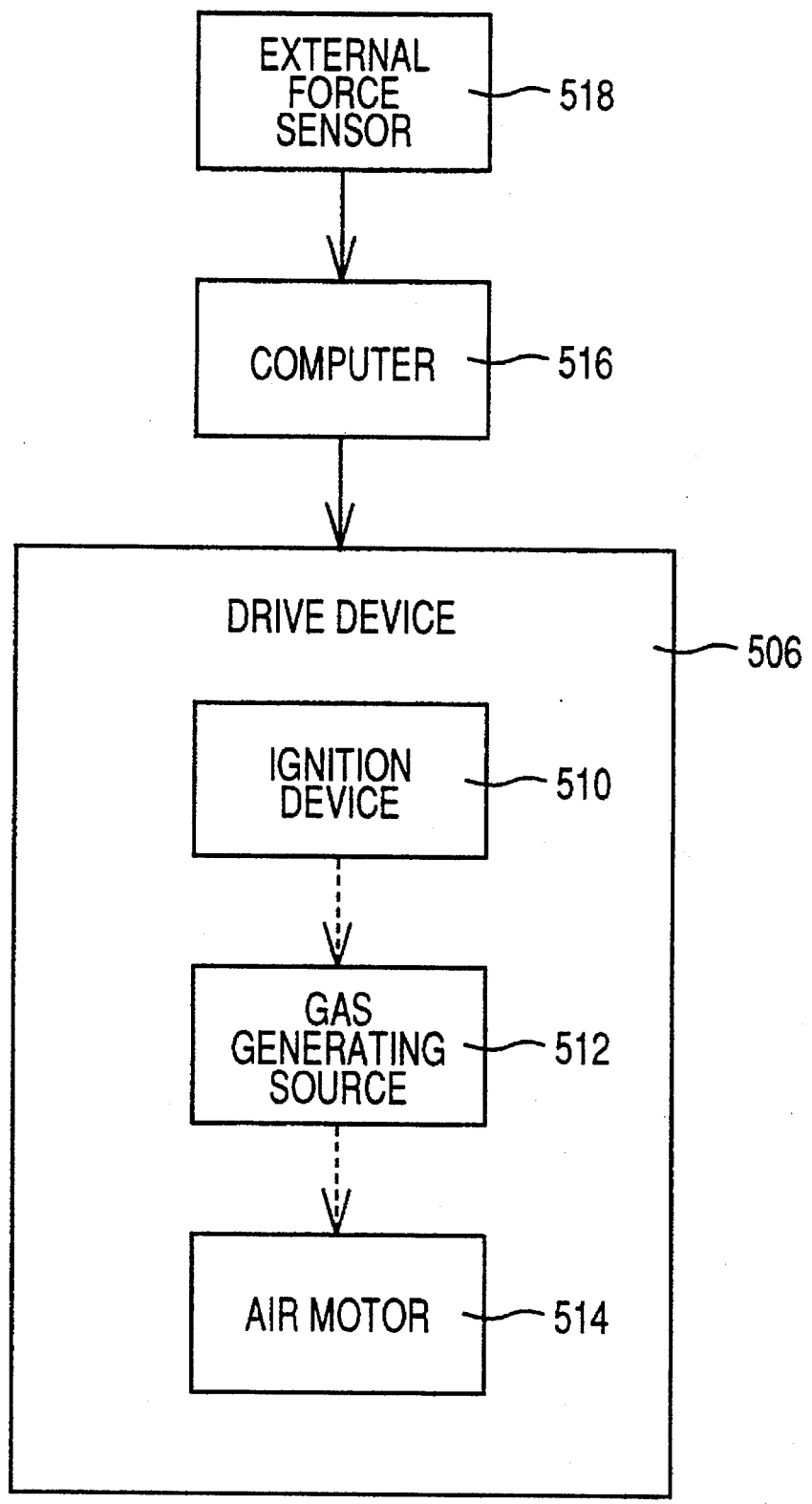
FIG. 33 is a block diagram indicating an electrical control arrangement for operating the rotating mechanism in the embodiment of FIG. 31.

The drive device 506 is of an inflating type including an ignition device 510, a gas generating source 512 ignited by the ignition device 510 to generate a gas, and an air motor 152 rotated by an energy of the generated gas, as indicated in FIG. 33. The drive device 506 is of the same type as used in a pre-tension device of a seat belt apparatus for a motor vehicle. The ignition device 510 is provided with a filament and an igniting material, and is controlled by a controller in the form of a computer 516, which operates in response to a signal received from an external force sensor 518. The sensor 158 is of a cantilever type adapted to detect a deceleration value o the vehicle to thereby detect the external force applied to the vehicle.

Although the computer 516 and the external force sensor 518 may be provided exclusively for the brake pedal 30, these elements 516, 518 may be utilized for an air bag device or seat belt pre-tension device if provided on the vehicle.

As shown in FIG. 32, the transmission mechanism 508 includes a worm gear 520 rotated with the air motor 154, and a pinion gear 522 which rotates with the externally threaded member 502 and which meshes with the worm gear 520. A rotary motion of the air motor 514 is converted into a rotary motion of the externally threaded member 502. The pinion gear 522 is fixed to the externally threaded member 502 such that a ring nut 524 and a lock nut 526 screwed on the threaded member 502 cooperate to fasten the pinion gear 522 therebetween. A spacer 528 made of a synthetic resin is interposed between the ring nut 524 and the corresponding end face of the internally threaded member 500. A range of rotation angle of the pinion gear 522 is determined by an angular range over which the teeth are formed on the pinion gear 522. The worm gear 520 normally engages a leading end portion of the pinion gear 522 as indicated in FIG. 32. When the air motor 514 is operated upon application of an external force to the vehicle, the pinion gear 522 is rotated in the clockwise direction as seen in FIG. 32, until a trailing end portion of the pinion gear 522 comes into meshing engagement with the worm gear 520. The trailing end portion of the pinion gear 522 functions as a stop. Consequently, the worm gear 520 engages with the trailing end portion of the pinion gear 522 during application of the external force to the vehicle.

Figure 34:
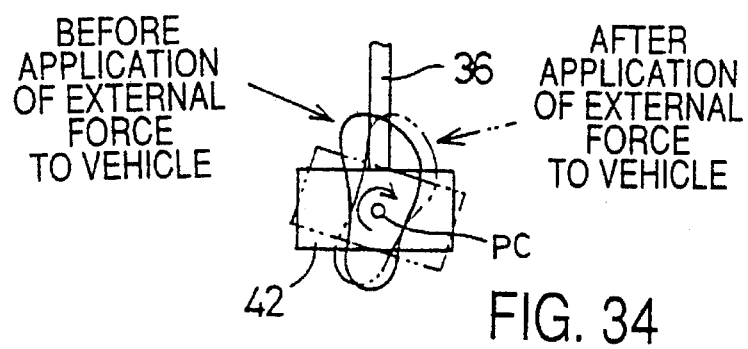
FIG. 34 is a rear view for explaining rotation of the brake pedal pad in the embodiment of FIG. 31 upon application of an external force to the vehicle.

In the present embodiment, the computer 516 activates the drive device 506 to temporarily operate the air motor 514 when the external force sensor 158 detects an external force applied to the vehicle and when a predetermined condition of motor operation timing is satisfied. Consequently, the pedal pad 42 is rotated about the center point PC and the centerline of the threaded member 502 in the clockwise direction as seen in FIG. 34. As a result, the operator's right foot is rotated such that the toe is moved away from the steering device 22, and the operator's right leg as a whole is moved away from the steering device 22.

In the present embodiment, the condition of the motor operation timing can be set as desired. In the preceding embodiments wherein the pedal bracket are deformed to cause the brake pedal 30 to be displaced, the brake pedal 30 may not be displaced at a suitable timing if the deformation of the pedal bracket to permit the displacement of the brake pedal requires a considerable time. In the present embodiment, however, the moment at which the pedal pad 42 is rotated with respect to the moment of application of the external force to the vehicle can be easily determined as needed, so as to minimize the degree of contact of the operator's leg with the steering device 22.

The present embodiment has a further advantage that since the pedal pad 42 is not linearly displaced or translated in the transverse direction of the vehicle upon application of the external force to the vehicle, a possibility of separation of the operator's right foot from the pedal pad 42 due to slipping of the foot on the pedal pad surface during the transverse linear displacement of the foot can be reduced.

Figure 35:
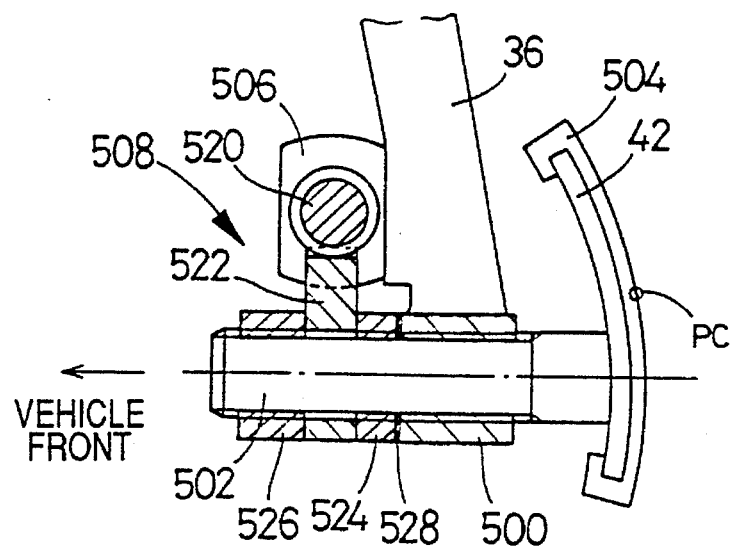
FIG. 35 is a side elevational view partly in cross section of a brake pedal pad of a brake pedal device according to yet another embodiment of the invention and environmental structures surrounding the brake pedal pad.
Figure 36:
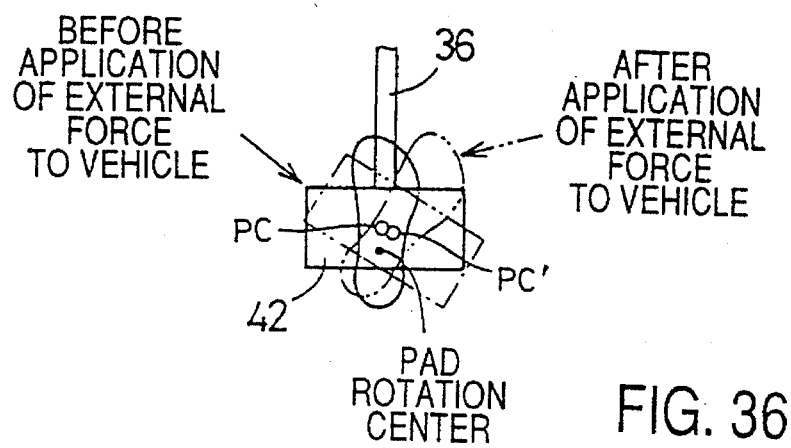
FIG. 36 is a rear view explaining rotation of the brake pedal pad in the embodiment of FIG. 35 upon application of an external force to the vehicle.

Although the above embodiment of FIGS. 31 and 32 is adapted to pivot or rotate the pedal pad 42 about the centerline of the threaded members 500, 502 which is aligned with the pedal pad center point PC, the pedal pad 42 may be rotated about a point which is located below the center point PC, as indicated in FIG. 35. In this case, the pedal pad 42 and the operator's right foot are rotated as indicated in FIG. 36 upon application of an external force to the vehicle, while the operator's right foot is displaced in an almost right direction of the vehicle with a rightward movement of the center point PC to point PC'. In the present embodiment, therefore, the operator's right leg is displaced away from the steering device 22 as a result of the rightward translation as well as the rotating movement of the right foot.

While the pedal pad 42 of the brake pedal 30 is rotated at a relatively high speed by the air motor in the above embodiments of FIGS. 31–36, an electric motor may be employed to rotate the pedal pad 42 at a high speed.

All of the preceding embodiments described above are adapted to reduce the degree of contact of the operator's leg with the steering device 22 by rotating (pivoting) the pedal pad 42 or displacing the pedal pad 42 in the rightward direction of the vehicle, there will be described further different embodiments of the pedal device according to the present invention.

If the lever portion 36 as a whole of the brake pedal 30 is displaced in a direction almost parallel to the downward direction of the vehicle upon application of an external force to the vehicle, the pedal pad 42 is displaced downward, and the operator's leg depressing the pedal pad 42 is accordingly displaced away from the steering device 22.

Figure 37:
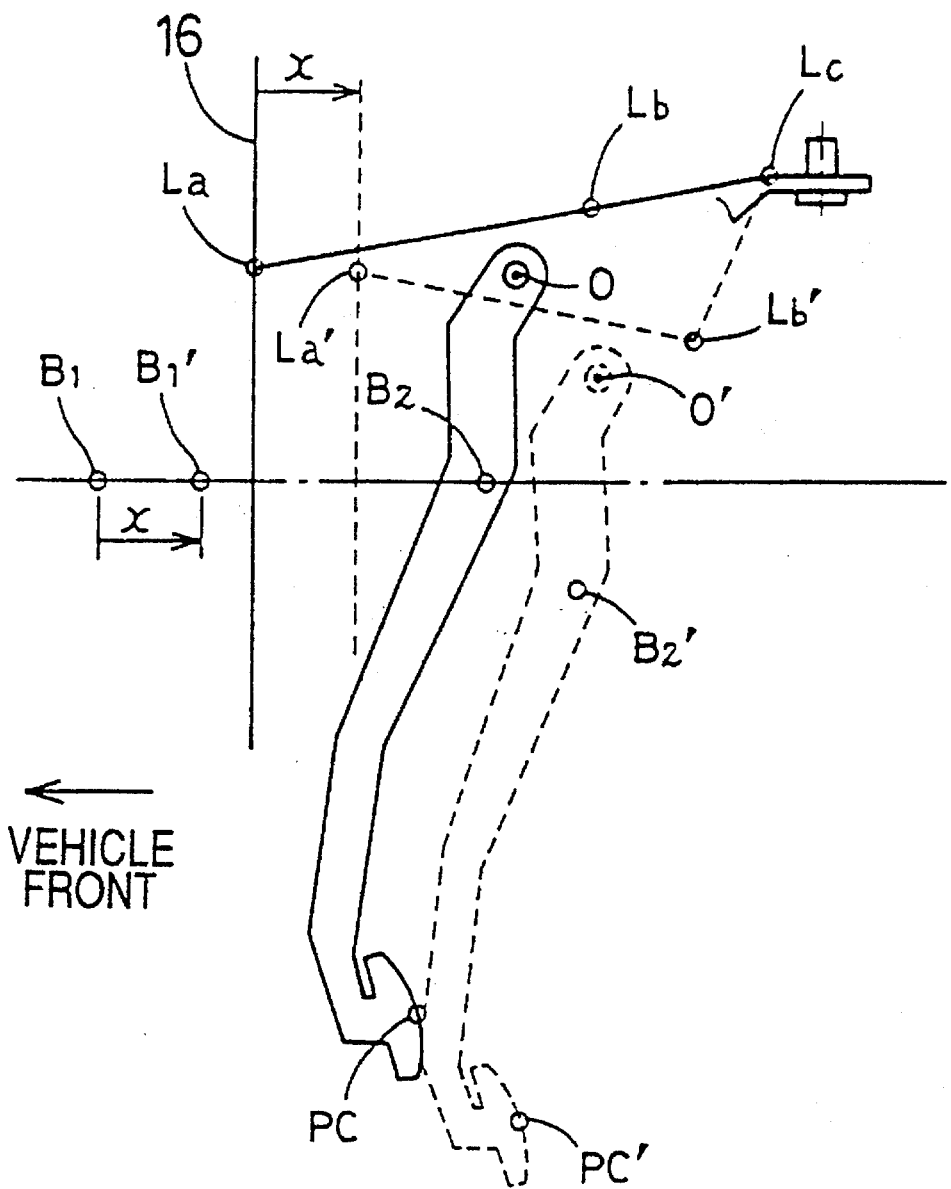
FIG. 37 is a side elevational view for explaining displacement of a brake pedal of a brake pedal device according to still another embodiment of the invention upon application of an external force to the vehicle.
Figure 38:
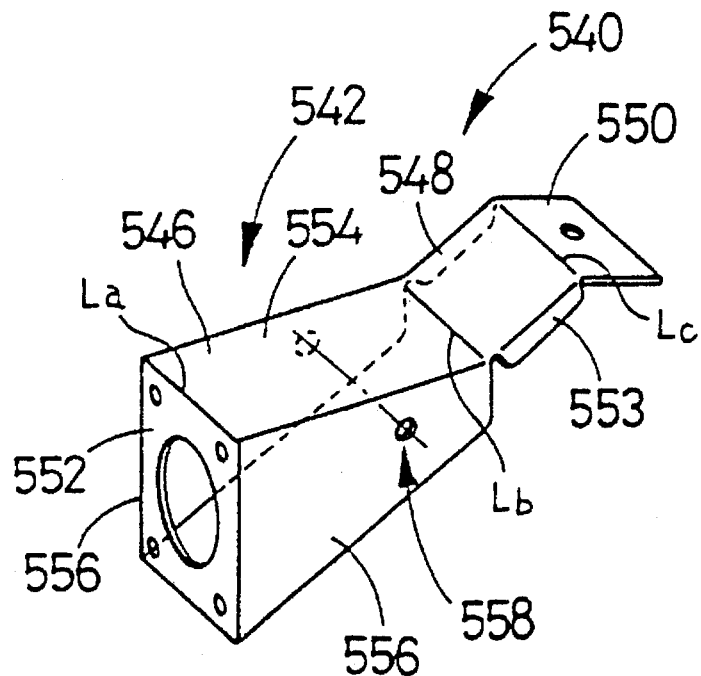
FIG. 38 is a perspective view of a pedal bracket of the brake pedal device of the embodiment of FIG. 37.
Figure 39:
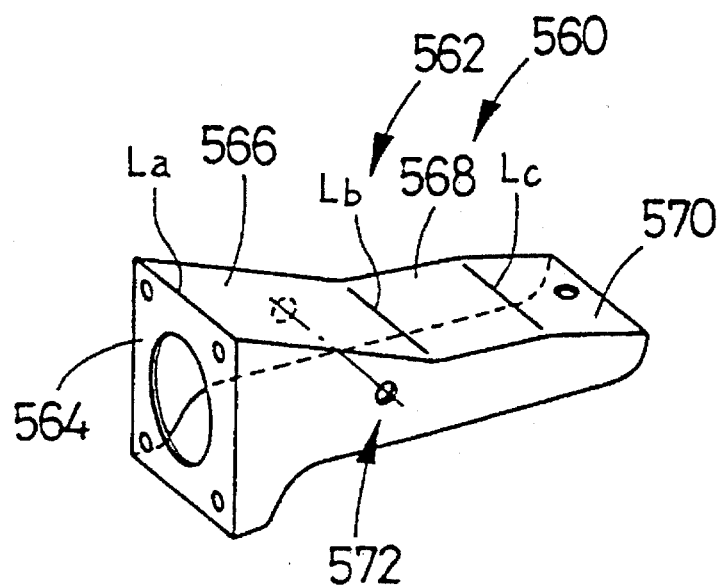
FIG. 39 is a perspective view of a pedal bracket of a brake pedal device according to a further embodiment of the invention.

To permit the lever portion 36 to be displaced as indicated above, the pedal bracket may be designed so as to be deformed as indicated in FIG. 37 upon application of the force to the vehicle. In FIGS. 37–39, "La", "Lb" and "Lc" represent lines on the pedal bracket, which lines extend parallel to the transverse direction of the vehicles prior to the application of an external force to the vehicle. The line La is located on the upper surface of the pedal bracket and near the point of attachment of the pedal bracket to the dash panel 16, and the line Lb is located on the upper surface of the pedal bracket and at a longitudinally intermediate position of the pedal bracket. The line Lc is located on the upper surface of the pedal bracket and near the point of attachment of the pedal bracket to the reinforcement member 34. Upon application of the external force to the vehicle, the line La is translated to La' in the backward direction of the vehicle, while the line Lb is displaced to Lb' in the backward and downward directions as a result of the backward translation of the line La to La' and a pivotal displacement of the portion between the lines La and Lb in the clockwise direction about the line La. The line Lc remains at substantially the same position. Since the pivot axis O of the brake pedal 30 is located near the line Lb, the pivot axis O is displaced together with the line Lb in the backward and downward directions of the vehicle, whereby the center point PC of the pedal pad 42 is displaced to point PC'.

To permit the deformation of the pedal bracket, it may be designed as shown in FIGS. 38 through 46. There will be described in detail the pedal brackets of FIGS. 38–46.

Figure 28:
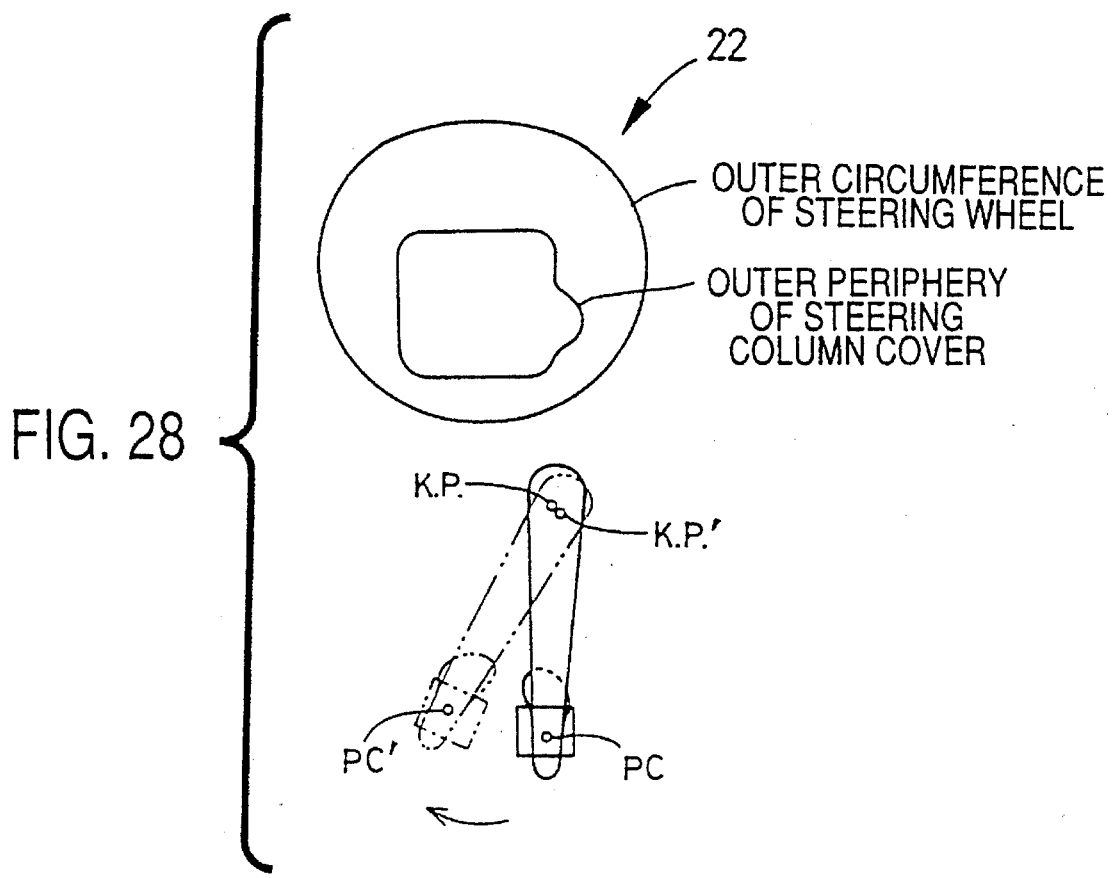
FIG. 28 is a rear view for explaining a principle of control of a displacement path of the operator's leg in the embodiment of FIG. 27.

The pedal bracket shown generally at 540 in FIG. 38 has a main frame 542 extending in the longitudinal direction of the vehicle. The main frame 542 includes three segments arranged in the longitudinal direction of the vehicle, that is, a front segment 546, a center segment 548 and a rear segment 550 arranged in the order of description in the direction from the front toward the rear of the vehicle. The front segment 546 is generally C-shaped in transverse cross section and open downwards of the vehicle, and is generally elongate in the longitudinal direction of the vehicle. The center segment 548 is a generally plate-like part extending from the front segment 546 in the backward direction of the vehicle. The rear segment 550 is also a plate-like part extending from the center segment 548 in the backward direction. Since there is no reinforcing means such as a flange at the connection between the center and rear segments 548, 550, the bending strength of the main frame 542 is made lower locally at the connection of the center and rear segments 548, 550, so that the main frame 542 easily buckles between the center and rear segments 548, 550 upon application of an external force to the vehicle. Further, the reinforcement member 34 does not lie on a straight line along which a load is transferred through the front segment 546 as seen side elevation of the main frame 542. That is, the front segment 546 is offset downwards of the vehicle with respect to the reinforcement member 34, so that the front and center segments 546, 548 are pivoted clockwise and counterclockwise, respectively, as viewed in FIG. 28, when the main frame 542 is deformed due to an external force applied to the vehicle.

A separate front fixing plate 552 is fixed to the front end of the front segment 546, so that the main frame 542 is fixed to the dash panel 16 at the front fixing plate 552. The main frame 542 is fixed to the reinforcement member 34 at the rear segment 550, which functions as a rear fixing portion of the pedal bracket 540.

In this pedal bracket 540, a backward movement of the dash panel 16 due to the force applied to the vehicle causes the front segment 546 to be displaced toward the rear segment 550. At this time, a force acts on the center segment 548 so as to pivot the same counterclockwise about the lines Lb and Lc, while maintaining its flatness owing to the provision of reinforcing means 553 in the form of flanges, whereby a moment acts on the front segment 546 in the clockwise direction as seen in FIG. 38. Since the front segment 546 is more likely to buckle on its lower side than on its upper side, a pair of side plates 556 of the front segment 546 buckle at their lower end portions, with the line Lb being moved clockwise along an arc about the line La, while an upper plate 554 of the front segment 546 maintains its flatness. As a result, a pedal attaching portion 558 of the pedal bracket 540 is pivoted clockwise as seen in FIG. 38 about the line La.

Each side plate 556 may be formed with a radial array of two or more beads, a single bead, or a sectorial hole, to facilitate the buckling of the side plate 556 due to a force applied to the vehicle. The beads of the radial array have substantially the same width and are formed so as to extend radially in the downward direction of the vehicle. The single bead has a width which gradually increases in the downward direction of the vehicle. The sectorial hole has a width which gradually increases in the downward direction.

The pedal bracket shown generally at 560 in FIG. 39 consists of a main frame 562 which is substantially C-shaped in cross section and extends in the longitudinal direction of the vehicle, and a front fixing plate 565 fixed to the front end of the main frame 562. Like the main frame 542 shown in FIG. 39, the main frame 562 has a front segment 566, a center segment 568 and a rear segment 570, which are defined by the lines Lb and Lc. The main frame 562 has a reduced modulus of section at a position corresponding to the line Lb. When the front fixing plate 564 is displaced toward the rear segment 570 functioning as a rear fixing portion, due to a force applied to the vehicle, the front segment 566 is pivoted clockwise as seen in FIG. 39 about the line La, and the center segment 568 is pivoted counter-clockwise about the line Lc, whereby a pedal attaching portion 572 of the pedal bracket 560 is pivoted clockwise as seen in FIG. 39 about the line La.

Although the pedal brackets 540, 560 of FIGS. 38 and 39 are both held fixed to the reinforcement member 34, these brackets 540, 560 may be adapted to come into contact with the reinforcement member 34 or any other stationary member only when the vehicle receives an external force. Examples of this modification are illustrated in FIGS. 40 and 41.

Figure 40:
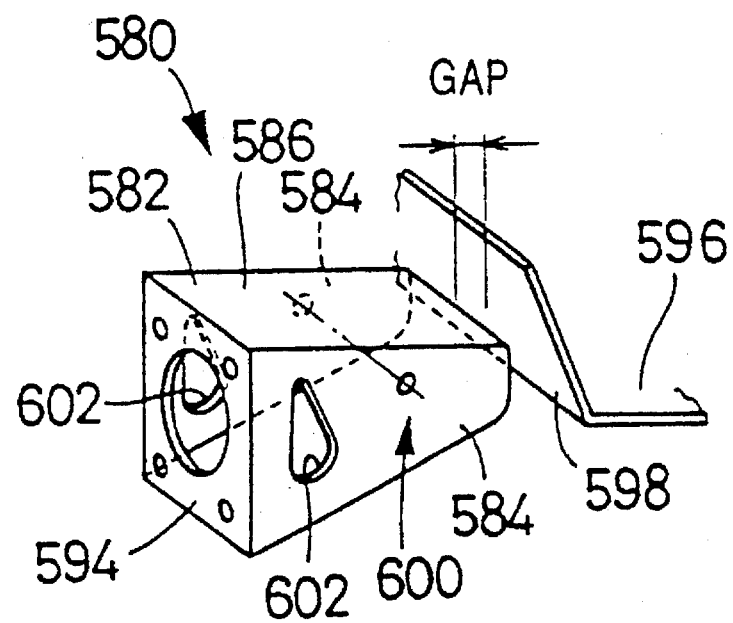
FIG. 40 is a perspective view of a pedal bracket of a brake pedal device according to another embodiment of the invention.

A pedal bracket 580 shown in FIG. 40 consists of a main frame 582 which is equivalent to the front segment 546 of the pedal bracket 540 of FIG. 38. The main frame 582 is a member which is formed from a single steel plate and is C-shaped in cross section, having a pair of side plates 584 and an upper plate 586 which connects the side plates 584. A front fixing plate 594 is fixed to the front end of the main frame 582. The main frame 582 is disposed such that the rear end portion is opposed to and held spaced part from a stationary member 596 which is secured to the reinforcement member 34 and which is not displaceable upon application of an external force to the vehicle. The stationary member 596 is a plate member which extends in the transverse direction of the vehicle and includes a front inclined portion having an inclined surface 598 inclined with respect to the horizontal and vertical planes. The rear end of the main frame 582 is normally held apart apart from the inclined surface 598, but is brought into contact with the inclined surface 598 when the force is applied to the vehicle. According to this arrangement, the main frame 582 receives a moment from the stationary member 596 upon application of the force to the vehicle, so that the main frame 582 is pivoted clockwise as seen in FIG. 40 by the received moment. Thus, the main frame 582 is displaced backwards while being forced downwards at its rear end portion by the inclined surface 598 of the stationary member 596, whereby buckling occurs in the lower part of a front portion of the main frame 582 in front of a pedal attaching portion 600, so that the pivot axis O of the brake pedal 30 is displaced to O' backwards and downwards as indicated in FIG. 37.

Each of two side plates 584 of the main frame 584 has a sectorial hole 602 formed in front of the pedal attaching portion 600. The hole 602 has a width which gradually increases in the downward direction of the vehicle. With this sectorial hole 602, the main frame 582 easily buckles at its lower end portion upon application of an external force to the vehicle. However, the hole 602 may be eliminated.

Figure 41:
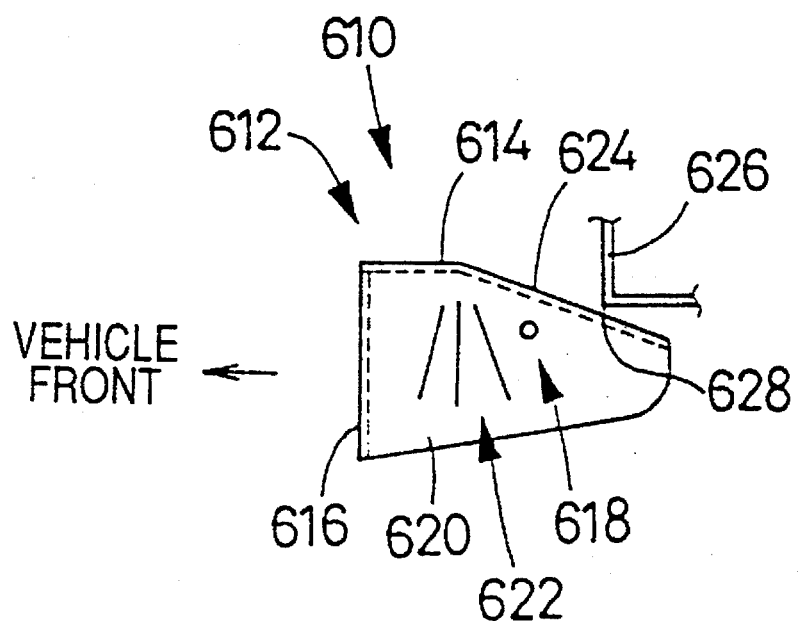
FIG. 41 is a die elevational view of a pedal bracket of a brake pedal device according to another embodiment of the invention.

Like the pedal bracket 580 of FIG. 40, a pedal bracket 610 shown in FIG. 41 is adapted to come into contact with a stationary member when a force is applied to the vehicle. While the pedal bracket 580 of FIG. 40 is adapted to engage the stationary member at its rear end portion, the pedal bracket 610 is adapted to engage the stationary member at its intermediate portion.

The pedal bracket 610 of FIG. 41 has a main frame 612 similar to the main frame 582 of the pedal bracket 580 of FIG. 40. However, an upper plate 614 connecting side plates 620 of the main frame 612 is bent. Namely, the upper plate 614 has a front portion which extends from a front fixing plate 616 in the horizontal direction (longitudinal direction of the vehicle), and a rear portion which extends from the rear end of the front portion in the backward direction and which is inclined in the downward direction. Each of the side plates 620 is formed with a radial array of three beads 622 in a portion thereof corresponding to the bend of the upper plate 614. The three beads 622 have the same width and are arranged to extend radially such that the distances between the adjacent beads 622 increase in the downward direction. This radial array of beads 622 facilitates buckling of the main frame 612 at its lower end portion. The beads 622 may be eliminated.

The rear portion of the upper plate 614 has an inclined surface 624. The main frame 612 is disposed such that the inclined surface 624 is normally held apart from and opposed to a stationary member 626. The stationary member 626 is a plate member which extends in the transverse direction of the vehicle and which is bent at right angles as seen in the side elevational view of FIG. 41. Thus, the upper surface 624 of the main frame 612 is normally held apart from a corner portion 628 of the stationary member 626, so that the upper surface 624 is brought into contact with the corner portion 628 of the stationary member 626 when the vehicle receives an external force. At this time, the main frame 612 receives from the stationary member 626 a moment which causes a clockwise pivotal movement of the main frame 612 as seen in FIG. 41, whereby the main frame 612 is displaced backwards with its rear end portion being forced downwards by the corner portion 628. Consequently, the main frame 626 buckles at the lower part of a portion in front of a pedal attaching portion 618, so that the pivot axis 0 of the brake pedal 30 is displaced to O' in the backward and downward direction as indicated in FIG. 37.

Figure 42:
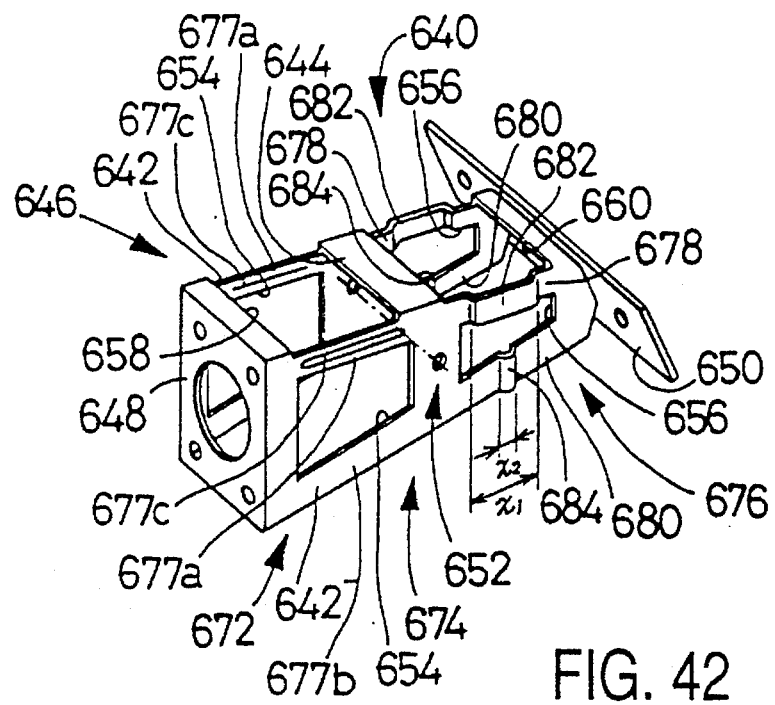
FIG. 42 is a perspective view of a pedal bracket of a brake pedal device according to a further embodiment of the invention.

A pedal bracket 640 shown in FIG. 42 has a main frame 646 with a pair of side plates 642 and an upper plate 644 connecting the side plates 642. The main frame 646 is disposed so as to extend in a direction substantially parallel to the longitudinal direction of the vehicle. The main frame 646 is formed as a one-piece body from a single steel plate. A front fixing plate 648 is fixed to the front end of the main frame 646, while a rear fixing plate 650 is fixed to the rear end of the main frame 646. The front fixing plate 648 is substantially perpendicular to the direction of extension of the main frame 646, while the rear fixing plate 650 is inclined relative to the main frame 646 such that the front end of the rear fixing plate 650 is located in front of the rear end as seen in the longitudinal direction of the vehicle. The main frame 646 is held fixed at its rear fixing plate 650 to the reinforcement member 34.

Each side plate 642 of the main frame 646 has two holes 654, 656 formed on the front and rear sides of a pedal attaching portion 652, respectively. The upper plate 644 has two holes 658, 660 corresponding to the holes 654, 656. The main frame 646 is divided by these holes 654, 656, 658, 660 into three segments arranged in the longitudinal direction of the vehicle, namely, a front segment 672 in front of the pedal attaching portion 652, a center segment 674 including the pedal attaching portion 652, and a rear segment 676 at the rear of the pedal attaching portion 652.

The front segment 672 of each side plate 642 includes a pair of strip portions 677a, 677b extending in the longitudinal direction of the vehicle. The upper strip portion 677a has a bead 677c formed so as to extend in the longitudinal direction of the vehicle, so that the upper strip portion 677a has higher buckling strength or resistance than the lower strip portion 677b. In other words, the lower strip portion 677b functions as a low-strength portion of the pedal bracket 640. To increase the strength of the upper strip portion 677a, a flange may be formed along a longitudinal edge of the upper strip portion 677a, in place of or in addition to the bead 677c.

The rear segment 676 of each side plate 642 includes a pair of strip portions 678, 680 extending in the longitudinal direction of the vehicle. The upper strip portion 678 has a bead 682 which extends in the vertical direction of the vehicle with a width ×1, while the lower strip portion 780 has a bead 684 which extends in the vertical direction with a width ×2 larger than the width ×1. Thus, the upper strip portion 678 functions as a low-strength portion of the pedal bracket 640, which easily buckles in a large amount and accordingly contracts in the longitudinal direction due to an external force applied to the vehicle, and the lower strip portion 680 is easily bent at the bead 684 due to the force.

Upon application of the force to the vehicle, the pedal bracket 640 is deformed as described below.

Figure 44:
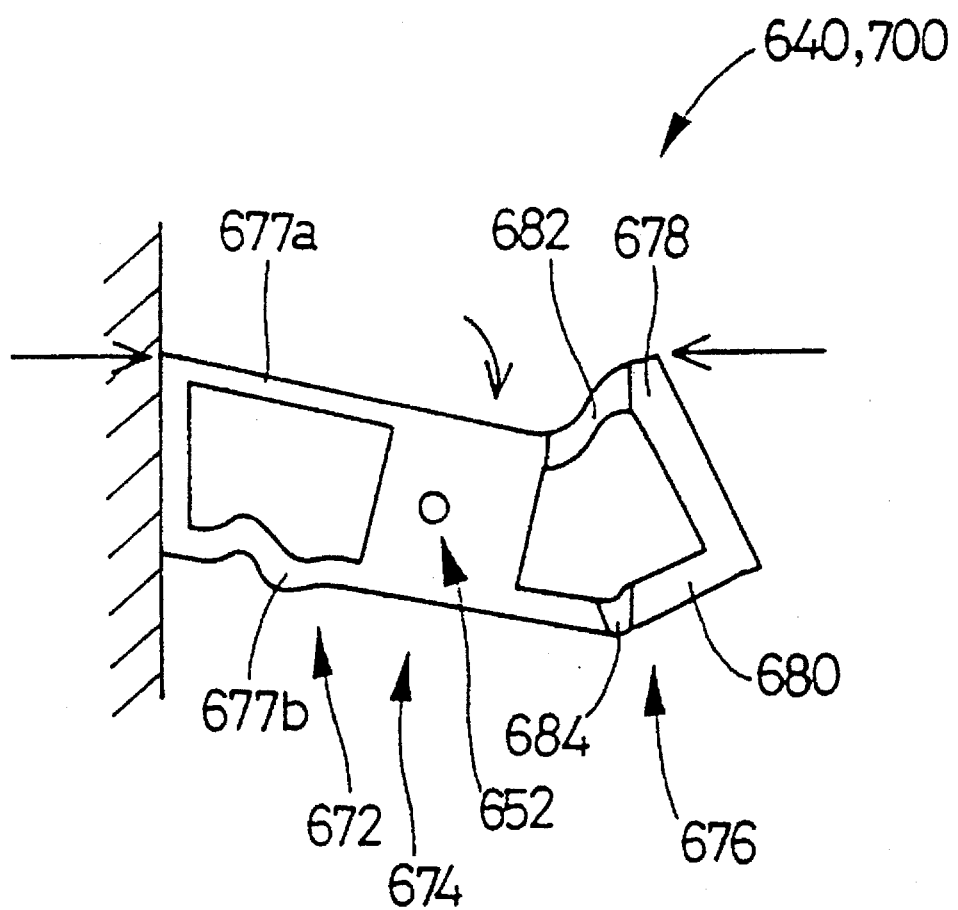
FIG. 44 is a side elevational view schematically explaining deformation of the pedal brackets of the embodiments of FIGS. 42 and 43 upon application of an external force to the vehicle.

As described above, the strength of the lower strip portion 677b of the front segment 672 is made lower than that of the upper strip portion 677a, and therefore the front segment 672 buckles at the lower strip portion 677b as indicated in FIG. 44 when the vehicle receives an external force. Contrary to the front segment 672, the rear segment 676 buckles at the upper strip portion 678 as also indicated in FIG. 44, since the strength of the upper strip portion 678 is made lower than the lower strip portion 680. Further, the lower strip portion 680 is easily bent about the bead 684 in a vertical plane parallel to the longitudinal direction of the vehicle. As a result, the pedal attaching portion 652 is displaced downwards, causing the lever portion 36 of the brake pedal 30 to be displaced downwards.

Figure 43:
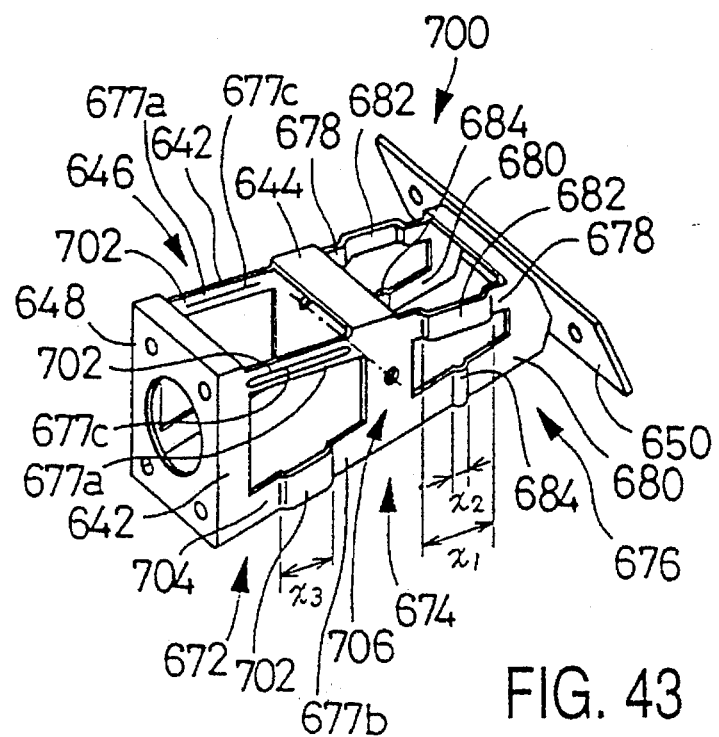
FIG. 43 is a perspective view of a pedal bracket of a brake pedal device according to another embodiment of the invention.

Referring to FIG. 43, there is shown another pedal bracket 700, which is basically similar in configuration to the pedal bracket 640 of FIG. 42. However, the lower strip portion 677b of the front segment 672 of the pedal bracket 700 has a vertically extending bead 702, and is therefore more likely to buckle than the lower strip portion 677b of the pedal bracket 640.

Still another form of pedal bracket will be explained.

Figure 45:
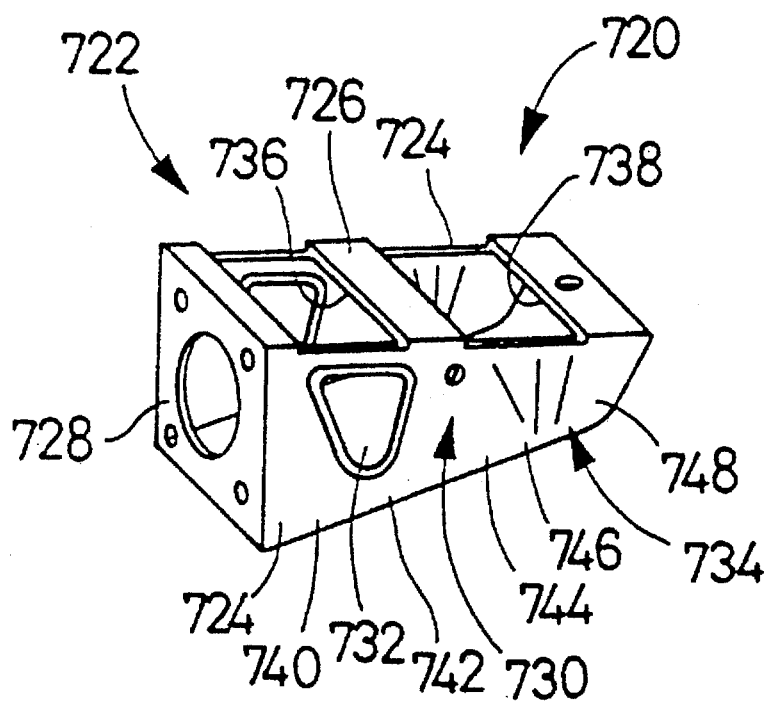
FIG. 45 is a perspective view of a pedal bracket of a brake pedal device according to yet another embodiment of the invention.

A pedal bracket 720 shown in FIG. 45 has a main frame 722 which is substantially C-shaped in cross section and extends in the longitudinal direction of the vehicle. The main frame 722 has a pair of side plates 724 and an upper plate 726 connecting the side plates 724, and is formed as a one-piece body from a single steel plate. A front fixing plate 728 is fixed to the front end of the main frame 722. Each side plate 724 has two low-strength portions on the front and rear sides of a pedal attaching portion 730. Described more specifically, the front low-strength portion has a sectorial bead 732 having a width which increases in the upward direction, while the rear low-strength portion has a radial array of three beads 734 which have the same width and which are formed to extend radially such that the distance between the adjacent beads 734 increases in the upward direction. The upper plate 726 has two holes 736, 738 which correspond to the bead 732 and the bead array 734, respectively. The main frame 722 has five segments 740, 742, 744, 746 and 748 which are arranged in in the longitudinal direction of the vehicle.

The first segment 740 is adjacent to the front fixing plate 728, and is substantially C-shaped in cross section consisting of a front portion of the upper plate 726 and generally trapezoidal front portions of the side plates 724.

The second segment 742 is rearwardly adjacent to the first segment 740, and consists of generally inverted-trapezoidal portions of the side plates 724 partly defined by the sectorial bead 732. This second segment 742 does not include any portion of the upper plate 726.

The third segment 744 is rearwardly adjacent to the second segment 742, and is substantially C-shaped in cross section consisting of an intermediate portion of the upper plate 726 and generally trapezoidal portions of the side plates 724 which provide the pedal attaching portion 730 at which the boss portion 37 of the brake pedal 30 is attached to the pedal bracket 720.

The fourth segment 746 is rearwardly adjacent to the third segment 744, and consists of generally inverted-trapezoidal portions of the side plates 724 which include the radial array of three beads 734. The third segment 746 does not include any portion of the upper plate 726.

The fifth segment 748 is rearwardly adjacent to the fourth segment 746, and is substantially C-shaped in cross section consisting of a rear portion of the upper plate 726 at which the pedal bracket 700 is fixed to the reinforcement member 34, and generally trapezoidal portions of the side plates 724.

The pedal bracket 720 can be schematically represented by a view in FIG. 46(a). In this view, a first segment s1 has a normal trapezoidal shape (which may be replaced by a normal equilateral triangular shape), and a second segment s2 has an inverted equilateral triangular shape (which may be replaced by an inverted trapezoidal shape). A third segment s3 has a normal trapezoidal shape (which may be replaced by a normal equilateral triangular shape), and a fourth segment s4 has an inverted equilateral triangular shape (which may be replaced by an inverted trapezoidal shape), while a fifth segment s5 has a normal trapezoidal shape (which may be replaced by a normal equilateral triangular shape).

Of these five segments s1–s5, the second and fourth segments s2, s4 are most likely to buckle. Therefore, these segments s2, s4 are considered to almost completely collapse upon application of an external force to the vehicle, whereby these second and fourth segments s2, s4 will not appear in substance on the deformed pedal brackets 720. Further, while the fifth segment s5 is inhibited from being displaced backwards toward the reinforcement member 34, the fifth segment s5 is permitted to deform. Upon application of the external force to the vehicle, the dash panel 16 may be displaced backwards while it is inclined with respect to the vertical plane, but the front fixing plate 728 fixed to the dash panel 16 remains substantially unchanged in its vertical position.

Therefore, the pedal bracket 720 schematically represented in FIG. 46(a) is considered to deform as indicated in FIG. 46(b), upon application of the force to the vehicle, whereby the pivot axis O of the brake pedal 30 is displaced backwards and downwards to O' as indicated in FIG. 37.

The sectorial bead 32 may be replaced by a radial array of beads which have the same width, or a sectorial hole 760 having the same shape as the bead 32. The hole 760 may be replaced by a plurality of holes.

Figure 46:
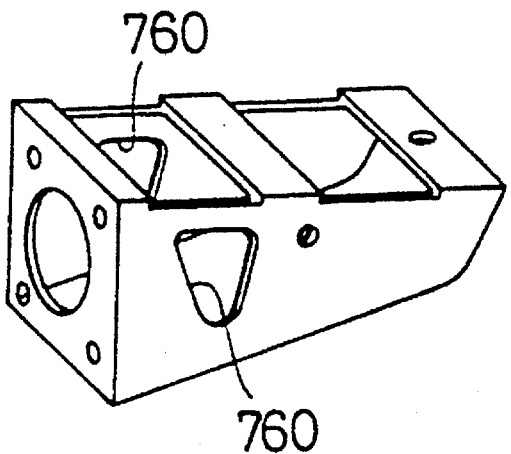
FIG. 46 is a perspective view of a pedal bracket of a brake pedal device of still another embodiment of the invention.

The radial array of three beads 734 may be replaced by a single sectorial bead having a width which gradually increases in the upward direction. The bead array 734 may be eliminated as indicated in FIG. 46.

It is noted that the pedal brackets shown in FIGS. 38 through 46 are all adapted such that a load which the pedal bracket receives from the dash panel 16 upon application of an external force to the vehicle is not entirely transferred to the reinforcement member 34, but is transferred thereto after damping by means of buckling and bending of the pedal bracket in the vertical plane parallel to the longitudinal direction of the vehicle. This arrangement assures increased capability of the pedal bracket to absorb the displacement of the dash panel 16 and the force received from the dash panel 16 upon application of the force to the vehicle, while permitting the pedal bracket to have an increased strength or rigidity for supporting the steering device.

It is also noted that each of the pedal brackets of FIGS. 38–46 does not have a portion designed to positively permit backward translation due to a force applied to the vehicle, between its front fixing portion at which the pedal bracket is attached to the dash panel 16 and its pedal attaching portion at which the boss portion 37 of the brake pedal 30 is pivotally attached to the pedal bracket. Namely, the pedal bracket is not designed to positively permit substantially equal amounts of backward displacement on the upper and lower sides at its portion between the front fixing portion and the pedal attaching portion when the force is applied to the vehicle. Therefore, that portion has a relatively high strength to a tensile force which acts on the pedal attaching portion of the pedal bracket in the longitudinal direction of the vehicle when the brake pedal 30 is depressed by the vehicle operator. Thus, the pedal bracket is protected from undesirable elongation at its portion between the front fixing portion and the pedal attaching portion during operation of the brake pedal 30. This arrangement enables the vehicle operator to recognize that the brake pedal 30 is supported with high rigidity and stability. On the other hand, the pedal brackets of FIGS. 38–46 are designed to positively permit displacement and deformation between the pedal attaching portion and the rear fixing portion (at which the pedal bracket is fixed to the reinforcement member 34), so as to absorb the backward displacement of the dash panel upon application of the external force to the vehicle. Thus, these pedal brackets assure increased rigidity and stability to support the brake pedal 30 during normal operation of the vehicle, while at the same time assuring high capability of absorbing the displacement of the dash panel 16 upon application of the external force to the vehicle.

Further embodiments of the present invention will be described by reference to FIGS. 48–51.

The embodiments which have been described above referring to FIGS. 37–47 are adapted to displace the lever portion 36 as a whole in the downward direction of the vehicle, to thereby restrict a movement of the operator's leg toward the steering device 22, upon application of an external force to the vehicle. Contrary to these embodiments of FIGS. 37–47, the embodiments of FIGS. 48–51 are adapted to displace the boss portion 37 of the brake pedal 30 in the upward direction of the vehicle, that is, in the direction that causes the operator's leg to move toward the steering device 22, while at the same time displacing the pedal pad 42 in the forward direction of the vehicle to a position as far as possible from the operator, for thereby eventually restricting a movement of the operator's leg toward the steering device 22.

Figure 48:
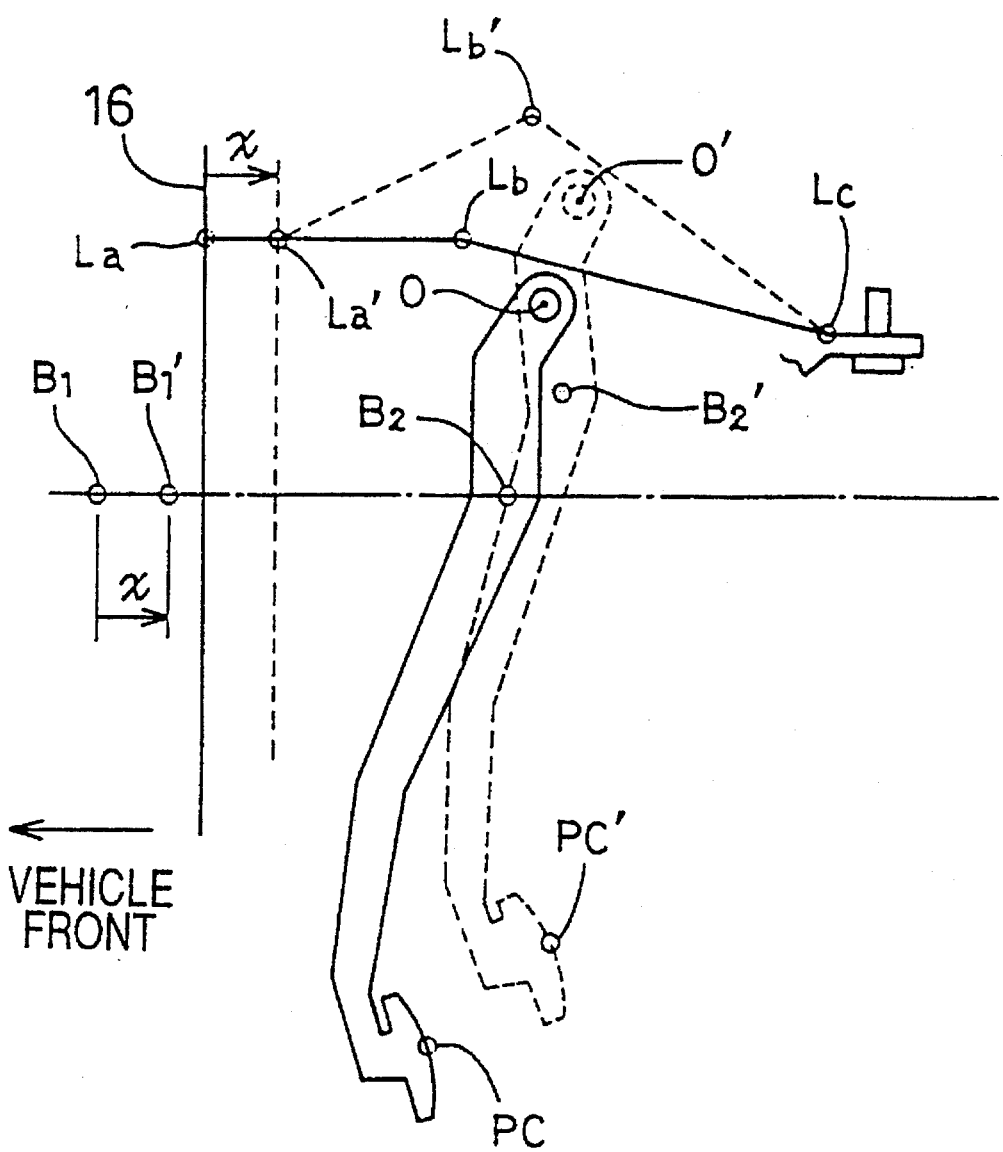
FIG. 48 is a side elevational view for explaining displacement of a brake pedal in a further embodiment of the invention.

To permit the displacements of the boss portion 37 and pedal pad 42 of the brake pedal 30 as described above, the pedal bracket may be designed so as to be deformed as indicated in FIG. 48 upon application of an external force to the vehicle. In FIG. 48, "La", "Lb" and "Lc" represent the same lines as explained above with respect to FIGS. 37–39. Upon application of the external force to the vehicle, the line La is translated to La' in the backward direction of the vehicle, while the line Lb is displaced to Lb' in the backward and upward directions as a result of the backward translation of the line La to La' and a pivotal displacement of the portion between the lines Lb and Lc in the clockwise direction about the line Lc. The line Lc remains at substantially the same position.

The pedal bracket is divided by the lines La, Lb and Lc into three segments, namely, a front segment, a center segment and a rear segment which are arranged in the order of description in the longitudinal direction of the vehicle from the front toward the rear. Upon application of an external force to the vehicle, the rear segment undergoes substantially no deformation, and the center segment is pivoted about the line Lc while substantially maintaining its configuration, causing the front segment to pivot about the line La in the counterclockwise direction. Since the boss portion 37 of the brake pedal 30 is attached to the center segment, the pivot axis O is displaced together with the center segment, that is, displaced to O' in the backward and upward directions of the vehicle, together with the line Lb, whereby the pedal pad center point Pc is displaced to PC' as indicated in FIG. 48.

Some examples of the pedal bracket adapted to be displaced or deformed as described above are illustrated in FIGS. 49 through 51. These pedal brackets will be described in detail.

A pedal bracket 780 shown in FIG. 49(a) has a main frame 786 which is substantially C-shaped in cross section consisting of a pair of side plates 782 and an upper plate 784 connecting the side plates 782. A front fixing plate 788 is fixed to the main frame 786.

The main frame 786 has three segments arranged in the longitudinal direction of the vehicle, namely, a front segment 790 which extends from the front fixing plate 788 substantially at right angles thereto, a center segment 794 which is rearwardly adjacent to the front segment 790 and which includes a pedal attaching portion 792, and a rear segment 789 which is rearwardly adjacent to the center segment 794 and which extends backwards in the form of a plate which functions as a rear fixing portion at which the pedal bracket 780 is fixed to the reinforcement member 34.

On a portion of the upper plate 784 which belongs to the front segment 790, there are formed a pair of beads 800, 802 extending in the transverse direction of the vehicle. These beads 800, 802 are provided to facilitate buckling of the front segment 790 upon application of an external force to the vehicle. A portion of each side plate 782 which belongs to the front segment 790 has a slit 804 which has a longitudinal portion extending in the longitudinal direction of the vehicle and opposite end portions extending vertically up to the corresponding ends of the two beads 800, 802. The slits 804 formed in the side plates 782 facilitate buckling of the side plates 782 at their portions in the front segment 790, when the external force is applied to the vehicle. Further, a portion of the upper plate 784 between the two beads 800, 802 in the front segment 790 is provided at its transverse opposite ends with respective flanges 806, which function to prevent substantial deformation of that portion of the upper plate 784 due to the force applied to the vehicle, to thereby effectively convert the force received from the dash panel 16 into a force for pivoting the center segment 794 in the clockwise direction as seen in FIG. 49(a).

In the pedal bracket 780 constructed as described above, the front segment 790 is pivoted in the counterclockwise direction as seen in FIG. 49(b) about the front bead 800 as the line La, with the rear bead 802 as the line Lb being displaced to Lb', as indicated in FIG. 48, when the external force is applied to the vehicle. At the same time, the center segment 794 is pivoted in the clockwise direction about the line Lc located at the connection between the center and rear segments 792, 794, as indicated in FIGS. 48 and 49(b). As a result, the pedal attaching portion 792 is pivoted clockwise about the line Lc.

Figure 50:
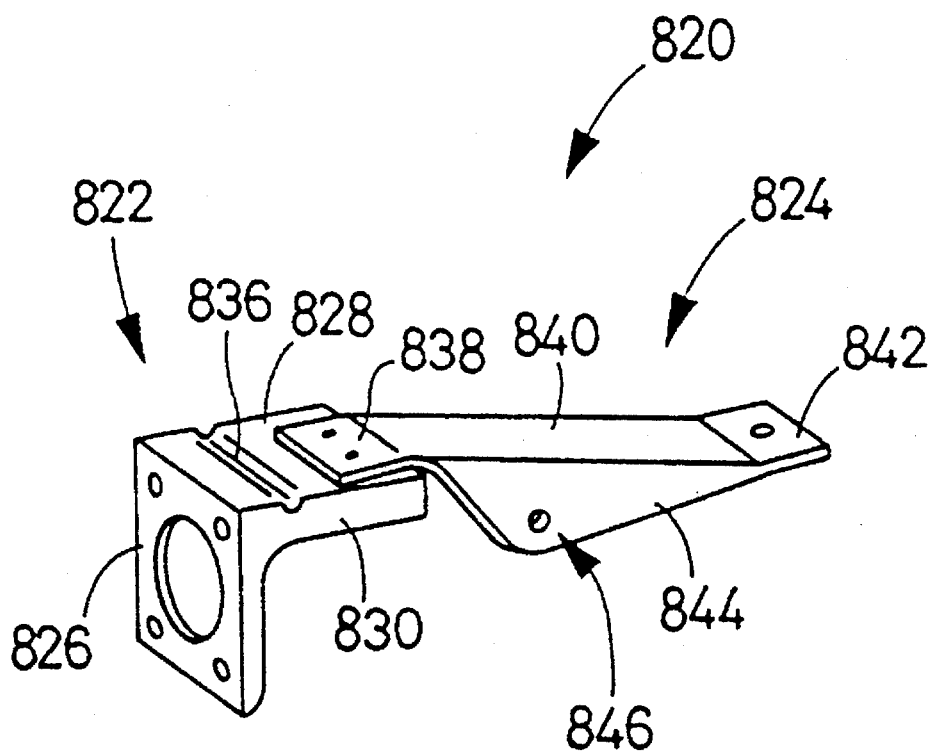
FIG. 50 is a perspective view of a pedal bracket of a brake pedal device according to another embodiment of the invention.
Figure 51:
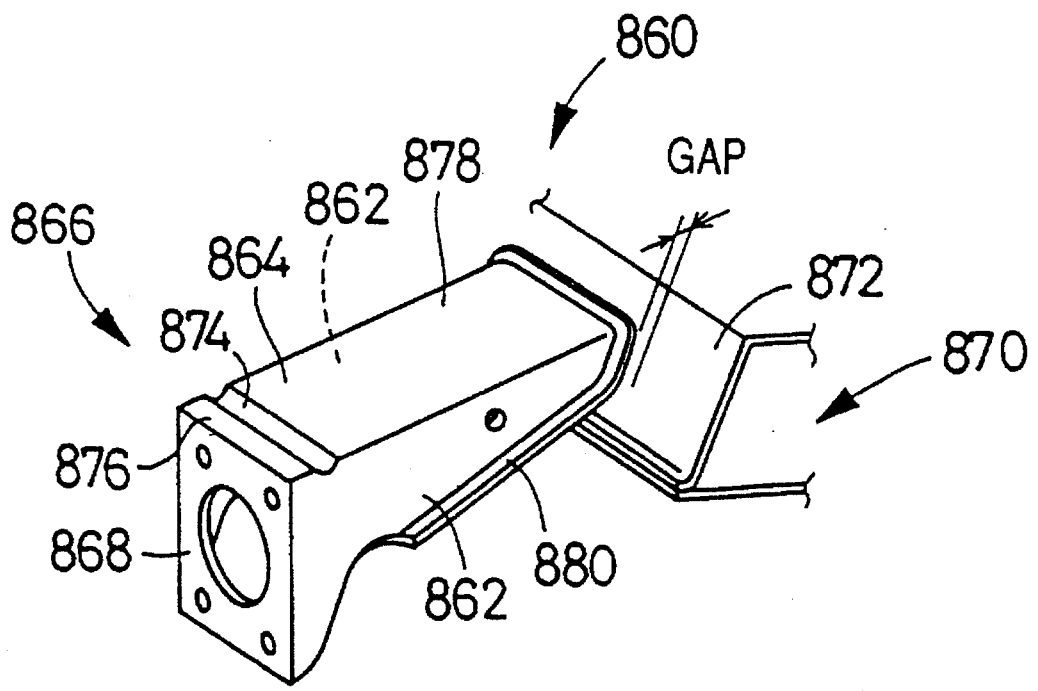
FIGS. 51(a) and 51(b) are perspective views for explaining deformation of a pedal bracket in a brake pedal device according to a further embodiment of the invention.
Figure 51:
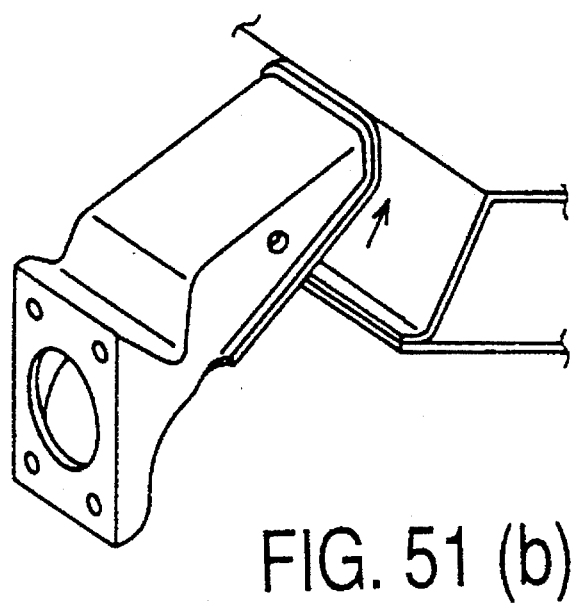

A pedal bracket 820 shown in FIG. 50 has a front frame 822 and a rear frame 824 which are connected to each other by welding or other fastening means. The front frame 822 consists of a front fixing plate 826, an upper plate 828 which extends backwards from the upper end of the front fixing plate 826 substantially at right angles thereto, and a pair of flanges 830 formed at the transverse opposite ends of the upper plate 828.

The upper plate 828 has one bead 836 formed to extend in the transverse direction of the vehicle. The bead 836 protrudes in the direction in which the flanges 830 extends from the upper plate 828. The bead 836 functions to reduce bending strength of the front frame 822 at a local portion thereof corresponding to the bead 836, for thereby facilitating buckling of the front frame 822 at the bead 836 upon application of an external force to the vehicle.

On the other hand, the rear frame 824 has a front end fixing portion 838 fixed to the front frame 822, an intermediate portion 840 at which the boss portion 37 is attached to the pedal bracket 820, and a rear end portion 842 at which the pedal bracket 820 is fixed to the reinforcement member 34. Each of the front and rear end portions 838, 842 takes the form of a plate, while the intermediate portion 840 is provided at its transverse opposite ends with a pair of side plates 844. The rear frame 824 has a reduced bending strength at the connection between the front end portion 838 and the intermediate portion 840 and at the connection between the intermediate portion 840 and the rear end portion 842, so that the rear frame 824 easily buckles at those connections upon application of the external force to the vehicle. The side plates 844 function to pivotally support the boss portion 37 of the brake pedal 30.

When the vehicle receives an external force, a rear one of the two portions of the front frame 822 on the front and rear sides of the bead 836 is pivoted counterclockwise as seen in FIG. 50 about the bead 836, while the rear frame 824 is pivoted clockwise about the connection between the intermediate and rear end portions 940, 842, whereby a pedal attaching portion 846 in the intermediate portion 840 is pivoted clockwise as seen in FIG. 50 about the connection between the intermediate and rear end portions 840, 842 of the rear frame 824.

Figure 49:
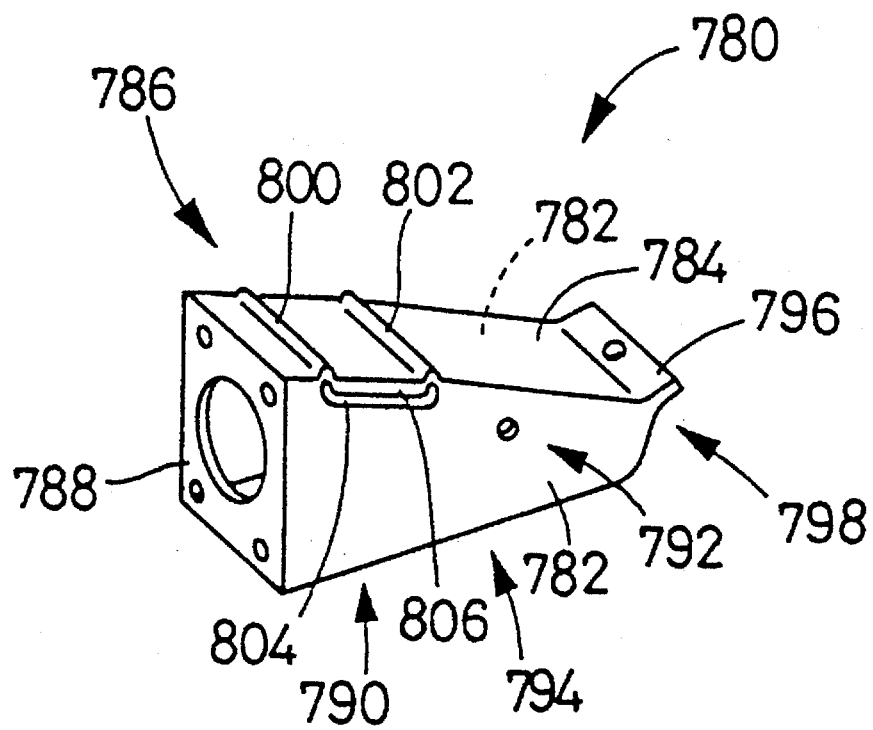
FIGS. 49(a) and 49(b) are perspective views for explaining deformation of a pedal bracket in the brake pedal device of the embodiment of FIG. 48.
Figure 49:
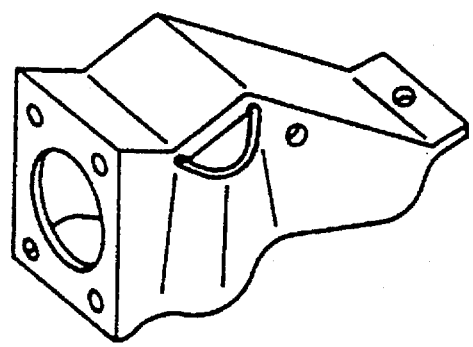

Although the pedal brackets 780, 820 of FIGS. 49 and 50 are held fixed to the reinforcement member 34, the pedal bracket may be adapted to come into contact with the reinforcement member 34 or other stationary member only when the external force is applied to the vehicle. An example of this type of pedal bracket is illustrated in FIG. 51(a).

This pedal bracket 860 shown in FIG. 51(a) has a main frame 866 consisting of a pair of side plates 862 and an upper plate 864 connecting the side plates 862. A front fixing plate 868 is fixed to the front end of the main frame 866 such that the main frame 866 extends backwards from the front fixing plate 868 substantially at right angles thereto. The main frame 866 is disposed such that the rear end of the main frame 866 is spaced apart from and opposed to an inclined surface 872 of a stationary member 870. The stationary member 870 is a box-like structure which extends in the transverse direction of the vehicle and which undergoes substantially no displacement in the backward direction of the vehicle upon application of an external force to the vehicle. The inclined surface 872 is a flat surface inclined such that the upper end is located backwards of the lower end in the longitudinal direction of the vehicle. When the force is applied to the vehicle, the rear end portion of the main frame 866 is brought into contact with the inclined surface 872.

The upper plate 864 has a bead 874 formed in an intermediate portion thereof so as to extend in the transverse direction of the vehicle. The main frame 866 has two segments on the opposite sides of this bead 874, that is a front segment 876 and a rear segment 878. Each side plate 862 is provided with a flange 880 formed along a portion of its exposed edge in the rear segment 878. However, no flange is provided along the exposed lower edge of the side plate 862 in the front segment 876. The side plate 862 has a reduced height dimension at a local portion thereof corresponding to the bead 874. Thus, the main frame 866 has a reduced bending strength at a local portion thereof corresponding to the bead 874, so that upon application of an external force to the vehicle the main frame 866 buckles at that local portion, and the rear segment 878 is pivoted counterclockwise as seen in FIG. 51(b) about the local portion corresponding to the bead 874, without substantial deformation of the rear segment 878.

In the present pedal bracket 860 of FIG. 51(a), the rear end portion of the main frame 866 is brought into contact with the inclined surface 872 of the stationary member 870, and is displaced upwards by the inclined surface 872, as shown in FIG. 51(b), when the external force is received by the vehicle. Consequently, the rear segment 878 is pivoted counterclockwise about the local portion corresponding to the bead 874, without substantially deformation of the rear segment 878, whereby the pedal attaching portion is pivoted counterclockwise.

While the brake pedal devices according to the embodiments which have been described are adapted to be used on a motor vehicle wherein the brake booster 46 is disposed within the engine room 14 as shown in FIG. 1, the principle of the present invention is equally applicable to a brake pedal device for use on a motor vehicle wherein the brake booster 46 is disposed within the passenger compartment 15.

Figure 52:
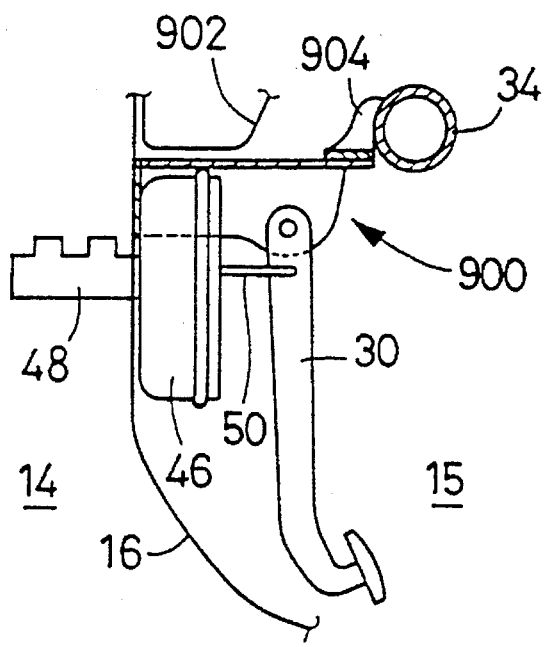
FIG. 52 is a side elevational view of a brake pedal device according to a further embodiment of the invention and environmental structures surrounding the brake pedal device.
Figure 53:
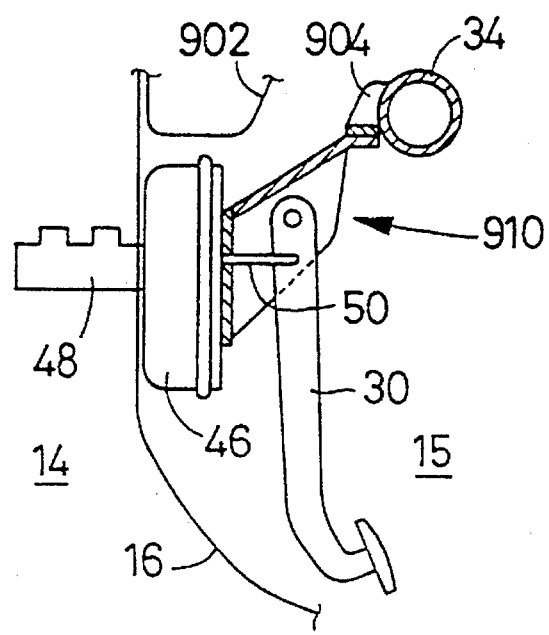
FIG. 53 is a side elevational view of a brake pedal device according to another embodiment of the invention and environmental structures surrounding the brake pedal device.

In the above case, a pedal bracket 900 shown in FIG. 52 or a pedal bracket 910 shown in FIG. 53 may be used, for example. The pedal bracket 900 is adapted such that the brake booster 46 disposed in the passenger compartment 15 and attached to the rear surface of the dash panel 16 is positioned between the front portions of the side plates of the pedal bracket 900 as seen in the transverse direction of the vehicle, as shown in FIG. 52. The pedal bracket 910 is adapted such that the brake booster 46 disposed within the passenger compartment 15 is attached at its rear surface (from which the push rod 50 extends backwards) to the front end portions of the side plates of the pedal bracket 910. In FIGS. 52 and 53, reference numerals 902 and 904 denote a cowl top and a bracket 904 fixed to the reinforcement member 34.

While the present invention has been described above with certain degrees of particularity in its presently preferred embodiments, it is to be understood that the invention may be embodied with various changes, modifications and improvements, which may occur to those skilled in the art, without departing from the spirit and scope of the invention defined in the following claims.

Since the various embodiments have been described using a large number of reference numerals, the reference numerals inserted in the claims are limited to those representing the elements of typical species of the embodiments.

What is claimed is:

1. A pedal device for a vehicle having a body, a passenger compartment and a steering device disposed within the passenger compartment, said pedal device being disposed within said passenger compartment and including (a) a pedal bracket attached to said body, and (b) a pedal pivotally supported by said pedal bracket and having at a lower end thereof a pedal pad to be depressed by a foot an operator of the vehicle, wherein the improvement comprises:

a pedal pad displacing mechanism for permitting, upon application of an external force to the vehicle, said pedal pad to be displaced such that a leg of the operator whose foot is depressing said pedal pad is moved in a direction away from said steering device.

2. A pedal device according to claim 1, wherein said pedal bracket contacts two members of said body at least upon application of said external force to the vehicle, said two members being moved relative to each other due to said external force, said pedal pad displacing mechanism displacing said pedal as a whole by means of deformation of said pedal bracket due to a relative movement of said two members upon application of said external force to the vehicle.

3. A pedal device according to claim 2, wherein said pedal bracket extends in a longitudinal direction of the vehicle, and includes a front end portion fixed to one of said two members which is displaced in a backward direction of the vehicle due to said external force, and a rear end portion which contacts the other of said two members at least upon application of said external force to the vehicle and whose amount of backward displacement due to said external force is smaller than an amount of backward displacement of said one of said two members.

4. A pedal device according to claim 2, wherein said pedal pad displacing mechanism includes means for reducing a bending strength of a local portion of said pedal bracket, and thereby facilitating deformation of said local portion upon application of said external force to the vehicle.

5. A pedal device according to claim 1, wherein said pedal pad displacing mechanism includes means for permitting a rotary movement of said pedal pad upon application of said external force to the vehicle.

6. A pedal device according to claim 5, wherein said pedal pad displacing mechanism includes means for permitting, upon application of said external force to the vehicle, a pivotal movement of said pedal as a whole about a substantially vertical straight line passing a point of said pedal bracket at which said pedal is pivotally supported by said pedal bracket, said pivotal movement causing an operating surface of said pedal pad to be rotated so as to face in a direction away from said steering device.

7. A pedal device according to claim 5, wherein said pedal pad displacing mechanism includes means for permitting, upon application of said external force to the vehicle, a pivotal movement of said pedal as a whole about a substantially vertical straight line passing a center point of an operating surface of said pedal pad, said pivotal movement causing said operating surface to be rotated so as to face in a direction away from said steering device.

8. A pedal device according to claim 5, wherein said pedal pad displacing mechanism includes means for permitting, upon application of said external force to the vehicle, a pivotal movement of said pedal as a whole about a straight line substantially parallel to a straight line normal to an operating surface of said pedal pad, said pivotal movement causing a toe of said foot depressing said operating surface to point in a direction away from said steering device.

9. A pedal device according to claim 1, wherein said pedal pad displacing mechanism includes means for permitting a linear displacement of said pedal pad upon application of said external force to the vehicle.

10. A pedal device according to claim 9, wherein said means for permitting a linear displacement of said pedal pad permits said pedal pad to be displaced in one of rightward and leftward directions of the vehicle which causes said pedal pad to be moved away from said steering device.

11. A pedal device according to claim 9, wherein said means for permitting a linear displacement of said pedal pad permits said pedal pad to be displaced in a forward direction of the vehicle.

12. A pedal device according to claim 9, wherein said means for permitting a linear displacement of said pedal pad permits said pedal pad to be displaced in a downward direction of the vehicle.

13. A pedal device according to claim 1, wherein said pedal includes a lever portion pivotally connected at one end thereof to said pedal bracket, said pedal pad being connected to the other end of said lever portion such that said pedal pad is displaceable relative to said lever portion, said pedal pad displacing mechanism including an external force sensor for detecting said external force applied to the vehicle, a drive device for displacing said pedal pad relative to said lever portion, and a controller for activating said drive device to displace said pedal pad relative to said lever portion.

14. A pedal device according to claim 13, wherein said external force sensor comprises means for detecting deceleration of the vehicle to thereby detect said external force applied to the vehicle.

15. A pedal device according to claim 13, wherein said drive device includes:

an ignition device activated by said controller;

a gas generating source ignited by said ignition device to generate a gas;

an actuator operated by said gas; and a transmission mechanism for transmitting a motion of said actuator to said pedal pad.

16. A pedal device according to claim 13, wherein said drive device includes an electric motor activated by said controller, and a transmission mechanism for transmitting a motion of said electric motor to said pedal pad.

* * * * *